(12) United States Patent
Kasai

(10) Patent No.: US 12,391,036 B2
(45) Date of Patent: Aug. 19, 2025

(54) OUTPUT DEVICE, OUTPUT SYSTEM, AND OUTPUT METHOD

(71) Applicant: Tadashi Kasai, Kanagawa (JP)

(72) Inventor: Tadashi Kasai, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 41 days.

(21) Appl. No.: 18/518,767

(22) Filed: Nov. 24, 2023

(65) Prior Publication Data

US 2024/0173968 A1 May 30, 2024

(30) Foreign Application Priority Data

Nov. 28, 2022 (JP) .................................. 2022-189545

(51) Int. Cl.
*B41J 2/045* (2006.01)
*B65H 37/04* (2006.01)
*G06F 3/12* (2006.01)

(52) U.S. Cl.
CPC ....... *B41J 2/04541* (2013.01); *B41J 2/04586* (2013.01); *B65H 37/04* (2013.01); *G06F 3/1204* (2013.01); *G06F 3/1208* (2013.01); *G06F 3/1254* (2013.01); *B65H 2301/1635* (2013.01)

(58) Field of Classification Search
None
See application file for complete search history.

(56) References Cited

U.S. PATENT DOCUMENTS

| | | | | |
|---|---|---|---|---|
| 6,088,568 A | * | 7/2000 | Ohtani | G03G 15/6582 |
| | | | | 399/408 |
| 6,185,010 B1 | * | 2/2001 | Watanabe | H04N 1/00384 |
| | | | | 361/600 |
| 6,718,378 B1 | * | 4/2004 | Machida | H04L 43/00 |
| | | | | 709/224 |
| 2006/0029435 A1 | | 2/2006 | Kasai et al. | |
| 2007/0057426 A1 | * | 3/2007 | Tao | G03G 15/6582 |
| | | | | 270/58.09 |
| 2007/0253720 A1 | | 11/2007 | Kasai | |
| 2009/0074439 A1 | | 3/2009 | Kasai | |
| 2010/0028053 A1 | | 2/2010 | Kasai | |
| 2010/0254724 A1 | | 10/2010 | Kasai | |
| 2012/0063819 A1 | | 3/2012 | Kasai et al. | |
| 2013/0101303 A1 | | 4/2013 | Kasai et al. | |
| 2015/0050033 A1 | | 2/2015 | Kasai et al. | |
| 2015/0205237 A1 | | 7/2015 | Kasai et al. | |
| 2016/0139537 A1 | | 5/2016 | Kasai et al. | |
| 2016/0313668 A1 | | 10/2016 | Kasai et al. | |
| 2024/0173968 A1 | * | 5/2024 | Kasai | G06F 3/1208 |

FOREIGN PATENT DOCUMENTS

JP        H10-236720 A       9/1998

\* cited by examiner

*Primary Examiner* — Helen Zong
(74) *Attorney, Agent, or Firm* — IPUSA, PLLC

(57) ABSTRACT

An output device communicably connected with a post-processing apparatus for executing post-processing on an output product output from the output device, the output device includes circuitry to receive a processing setting pattern that is determined in accordance with an output condition of the output product and corresponding to an operation to be performed by the post-processing apparatus, the output condition, and image data of an image to be formed on the output product and control output of the image data using the post-processing apparatus based on the processing setting pattern and the output condition.

16 Claims, 41 Drawing Sheets

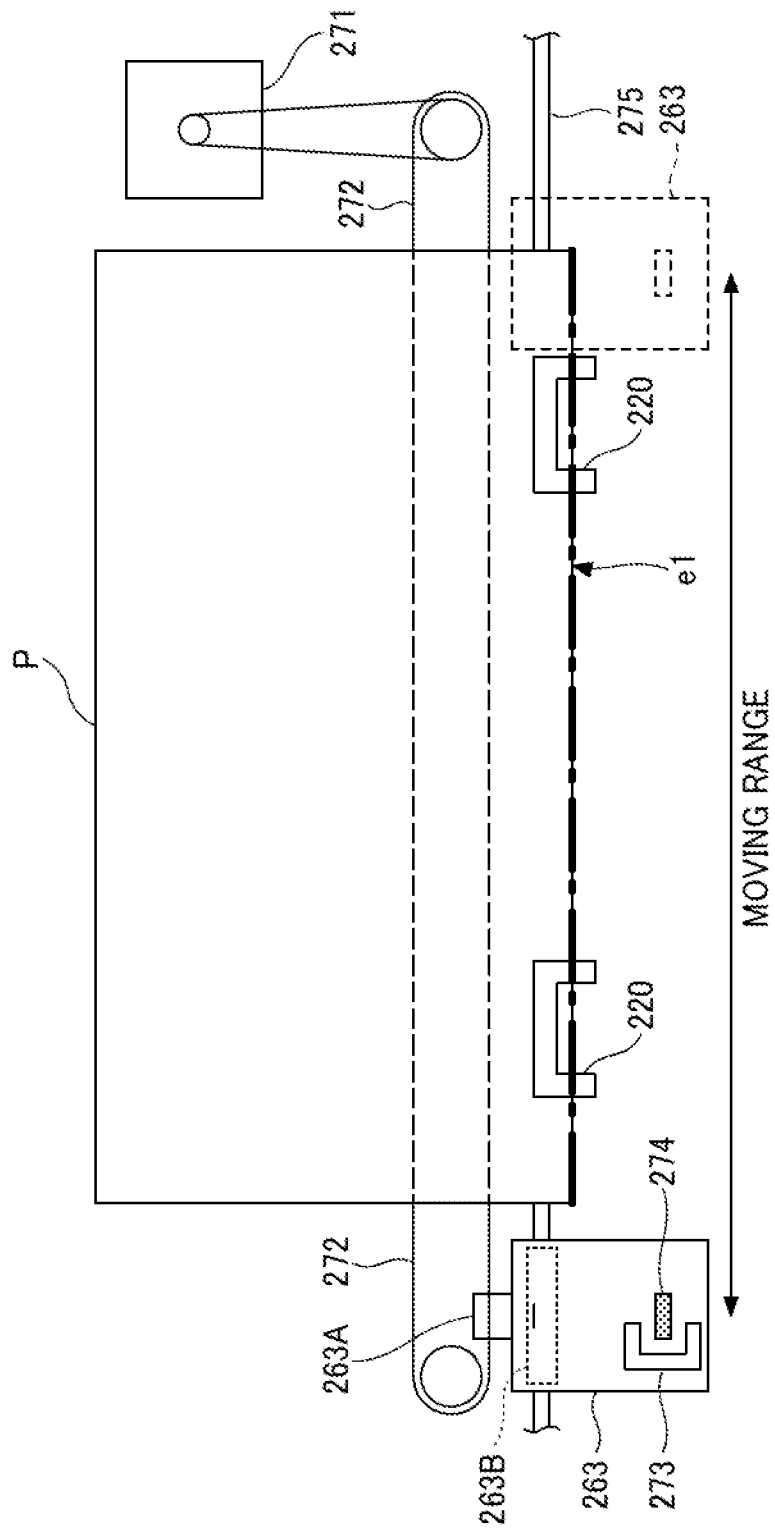

FIG. 11A

| PRINT SETTING | | | | PROCESSING SETTING PATTERN |
|---|---|---|---|---|
| SHEET FEEDING DIRECTION | SINGLE-SIDED/ DOUBLE-SIDED | UPPER LEFT/ UPPER RIGHT | LONG-EDGE/ SHORT-EDGE | |
| LONG-EDGE FEED | SINGLE-SIDED | UPPER LEFT | - | 180° ROTATION: OFF<br>FRONT FACE UP: OFF<br>DOCUMENT DIRECTION: - |
| LONG-EDGE FEED | SINGLE-SIDED | UPPER RIGHT | - | 180° ROTATION: ON<br>FRONT FACE UP: ON<br>DOCUMENT DIRECTION: - |
| LONG-EDGE FEED | DOUBLE-SIDED | UPPER LEFT | LONG-EDGE | 180° ROTATION<br>  FIRST FACE ON<br>  SECOND FACE OFF<br>FRONT FACE UP: OFF<br>DOCUMENT DIRECTION: - |
| LONG-EDGE FEED | DOUBLE-SIDED | UPPER LEFT | SHORT-EDGE | 180° ROTATION<br>  FIRST FACE ON<br>  SECOND FACE ON<br>FRONT FACE UP: OFF<br>DOCUMENT DIRECTION: - |
| LONG-EDGE FEED | DOUBLE-SIDED | UPPER RIGHT | LONG-EDGE | 180° ROTATION<br>  FIRST FACE ON<br>  SECOND FACE OFF<br>FRONT FACE UP: ON<br>DOCUMENT DIRECTION: - |
| LONG-EDGE FEED | DOUBLE-SIDED | UPPER RIGHT | SHORT-EDGE | 180° ROTATION<br>  FIRST FACE ON<br>  SECOND FACE ON<br>FRONT FACE UP: ON<br>DOCUMENT DIRECTION: - |

FIG. 11B

| PRINT SETTING | | | | PROCESSING SETTING PATTERN |
|---|---|---|---|---|
| SHEET FEEDING DIRECTION | SINGLE-SIDED/ DOUBLE-SIDED | UPPER LEFT/ UPPER RIGHT | LONG-EDGE/ SHORT-EDGE | |
| SHORT-EDGE FEED | SINGLE-SIDED | UPPER LEFT | – | 180° ROTATION: OFF<br>FRONT FACE UP: ON<br>DOCUMENT DIRECTION: LANDSCAPE |
| SHORT-EDGE FEED | SINGLE-SIDED | UPPER RIGHT | – | 180° ROTATION: OFF<br>FRONT FACE UP: OFF<br>DOCUMENT DIRECTION: LANDSCAPE |
| SHORT-EDGE FEED | DOUBLE-SIDED | UPPER LEFT | LONG-EDGE | 180° ROTATION<br>  FIRST FACE OFF<br>  SECOND FACE OFF<br>FRONT FACE UP: ON<br>DOCUMENT DIRECTION: LANDSCAPE |
| SHORT-EDGE FEED | DOUBLE-SIDED | UPPER LEFT | SHORT-EDGE | 180° ROTATION<br>  FIRST FACE OFF<br>  SECOND FACE ON<br>FRONT FACE UP: ON<br>DOCUMENT DIRECTION: LANDSCAPE |
| SHORT-EDGE FEED | DOUBLE-SIDED | UPPER RIGHT | LONG-EDGE | 180° ROTATION<br>  FIRST FACE OFF<br>  SECOND FACE OFF<br>FRONT FACE UP: OFF<br>DOCUMENT DIRECTION: LANDSCAPE |
| SHORT-EDGE FEED | DOUBLE-SIDED | UPPER RIGHT | SHORT-EDGE | 180° ROTATION<br>  FIRST FACE OFF<br>  SECOND FACE ON<br>FRONT FACE UP: OFF<br>DOCUMENT DIRECTION: LANDSCAPE |

FIG. 12

| SHEET FEEDING DIRECTION | SINGLE-SIDED/ DOUBLE-SIDED | UPPER LEFT/ UPPER RIGHT | LONG-EDGE/ SHORT-EDGE | MINIMUM AMOUNT OF OPERATION |
|---|---|---|---|---|
| LONG-EDGE FEED | SINGLE-SIDED | UPPER LEFT | LONG-EDGE | a |
| LONG-EDGE FEED | SINGLE-SIDED | UPPER LEFT | SHORT-EDGE | b |
| LONG-EDGE FEED | SINGLE-SIDED | UPPER RIGHT | LONG-EDGE | c |
| LONG-EDGE FEED | SINGLE-SIDED | UPPER RIGHT | SHORT-EDGE | d |
| LONG-EDGE FEED | DOUBLE-SIDED | UPPER LEFT | LONG-EDGE | e |
| LONG-EDGE FEED | DOUBLE-SIDED | UPPER LEFT | SHORT-EDGE | f |
| LONG-EDGE FEED | DOUBLE-SIDED | UPPER RIGHT | LONG-EDGE | g |
| LONG-EDGE FEED | DOUBLE-SIDED | UPPER RIGHT | SHORT-EDGE | h |
| SHORT-EDGE FEED | SINGLE-SIDED | UPPER LEFT | LONG-EDGE | i |
| SHORT-EDGE FEED | SINGLE-SIDED | UPPER LEFT | SHORT-EDGE | j |
| SHORT-EDGE FEED | SINGLE-SIDED | UPPER RIGHT | LONG-EDGE | k |
| SHORT-EDGE FEED | SINGLE-SIDED | UPPER RIGHT | SHORT-EDGE | l |
| SHORT-EDGE FEED | DOUBLE-SIDED | UPPER LEFT | LONG-EDGE | m |
| SHORT-EDGE FEED | DOUBLE-SIDED | UPPER LEFT | SHORT-EDGE | n |
| SHORT-EDGE FEED | DOUBLE-SIDED | UPPER RIGHT | LONG-EDGE | o |
| SHORT-EDGE FEED | DOUBLE-SIDED | UPPER RIGHT | SHORT-EDGE | p |

FIG. 13

| JOB ID | FILE NAME | DATE AND TIME | PRINT SETTING | AMOUNT OF OPERATION OF STAPLER |
|---|---|---|---|---|
| JOB 1 | abc.docs | 20xx/01/23 10:10 | LONG-EDGE FEED, SINGLE-SIDED, UPPER LEFT, LONG-EDGE BINDING | A |
| JOB 2 | def.docs | 20xx/01/23 10:20 | LONG-EDGE FEED, DOUBLE-SIDED, UPPER LEFT, LONG-EDGE BINDING | B |
| JOB 3 | ghi.docs | 20xx/01/23 11:00 | SHORT-EDGE FEED, DOUBLE-SIDED, UPPER RIGHT, SHORT-EDGE BINDING | C |
| ... | ... | ... | ... | ... |

Tabs: FAVORITE | BASIC | SHEET FEED/EJECT | FIN-ISHING | LAYOUT/EDIT | LETTER/STAMP | COVER/CHAPTER | IMAGE QUALITY ADJUST | OTHERS

CURRENT SETTING

- PRINTING METHOD (J): NORMAL PRINTING | MODIFY (M) | USER CODE SETTING (U)...
- DOCUMENT SIZE (D): A4(210 × 297 mm)
- SHEET SIZE (P): SAME AS DOCUMENT
- IRREGULAR SIZE (C)...
- SHEET FEED TRAY (T): AUTO TRAY SELECTION
- COLOR MODE (O): ● COLOR
- AGGREGATION IN ONE PAGE (L): ☐ OFF
- STAPLING (S): ON

NUMBER OF COPIES (C): (1 TO 999) — 301

DOCUMENT ORIENTATION: ● PORTRAIT (P)   ○ LANDSCAPE (L)

SHEET TYPE (P): ① PLAIN PAPER/RECYCLED PAPER

DOUBLE-SIDED (2): OFF

BOOKBINDING (B): OFF — 302

303 — STAPLER OPERATION MINIMUM MODE

DOCUMENT SIZE: A4(210 × 297mm)
SHEET SIZE: SAME AS DOCUMENT
MAGNIFICATION: FIT TO SHEET

- REGISTER IN FAVORITE SETTING (R)
- CHECK TRAY SETTING (C)
- SETTING CONTENTS LIST (S)...

RESET ALL THE SETTINGS (R) | RESET SETTING IN THE TAB (R)

OK | CANCEL | APPLY (A) | HELP

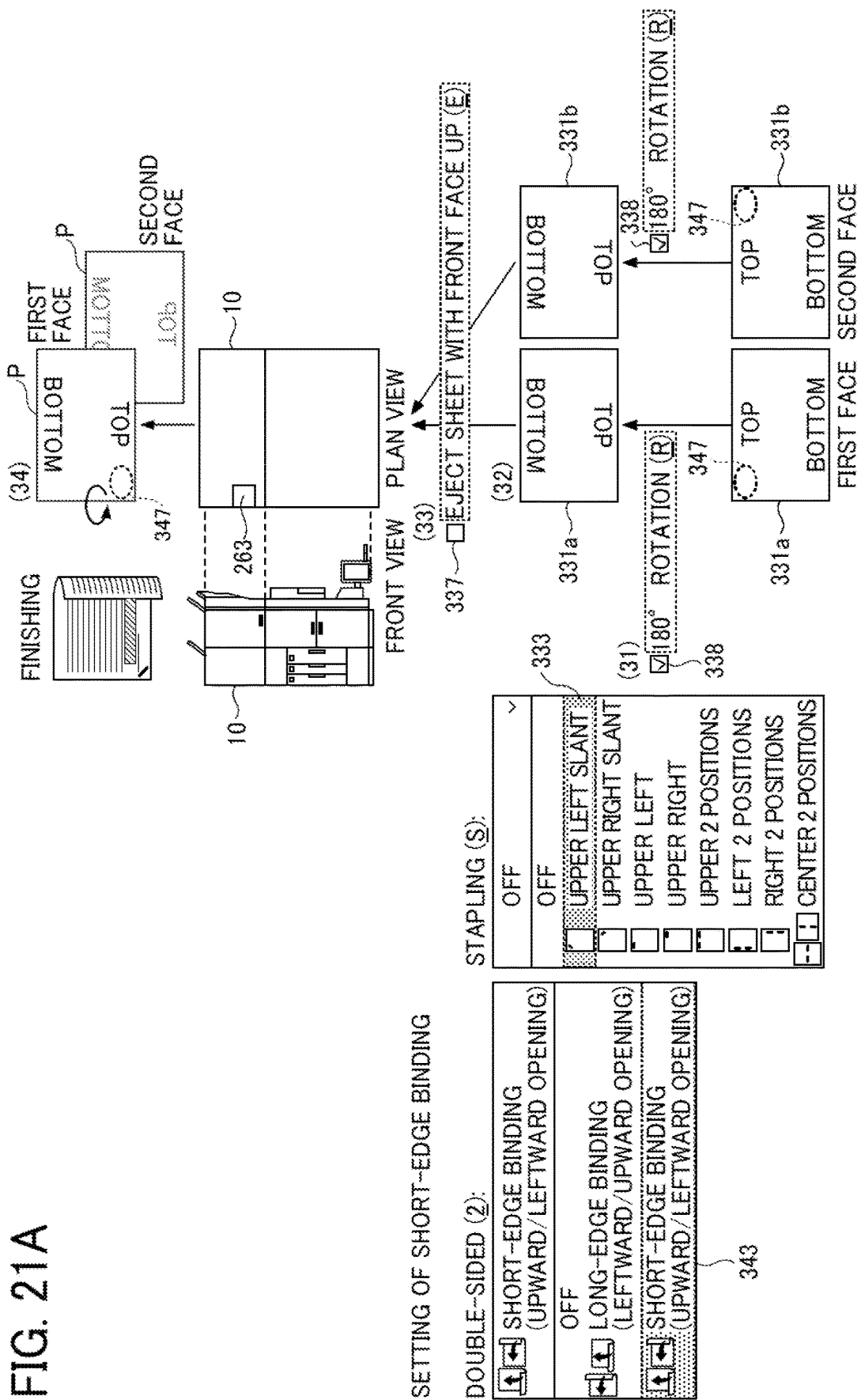

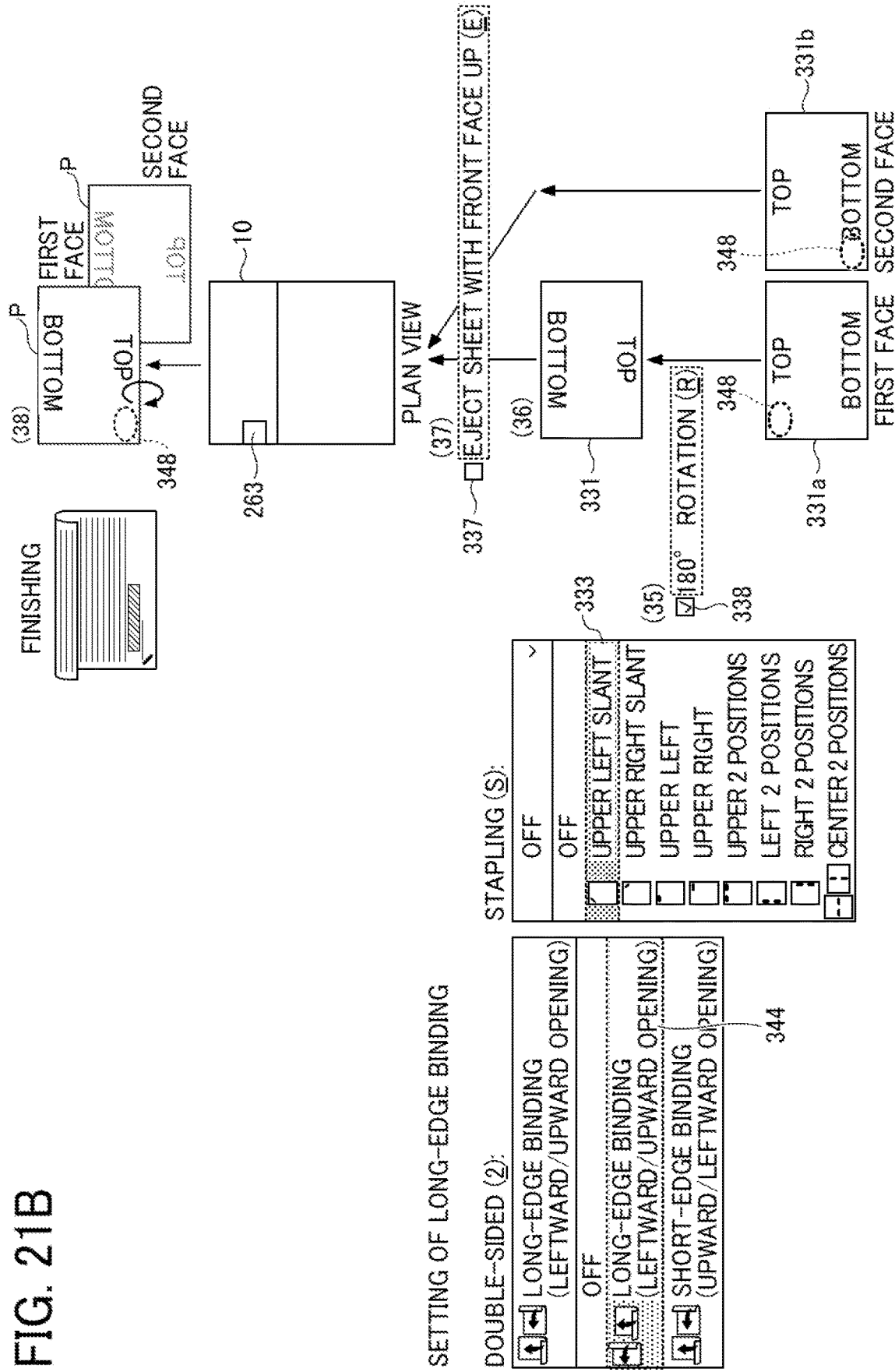

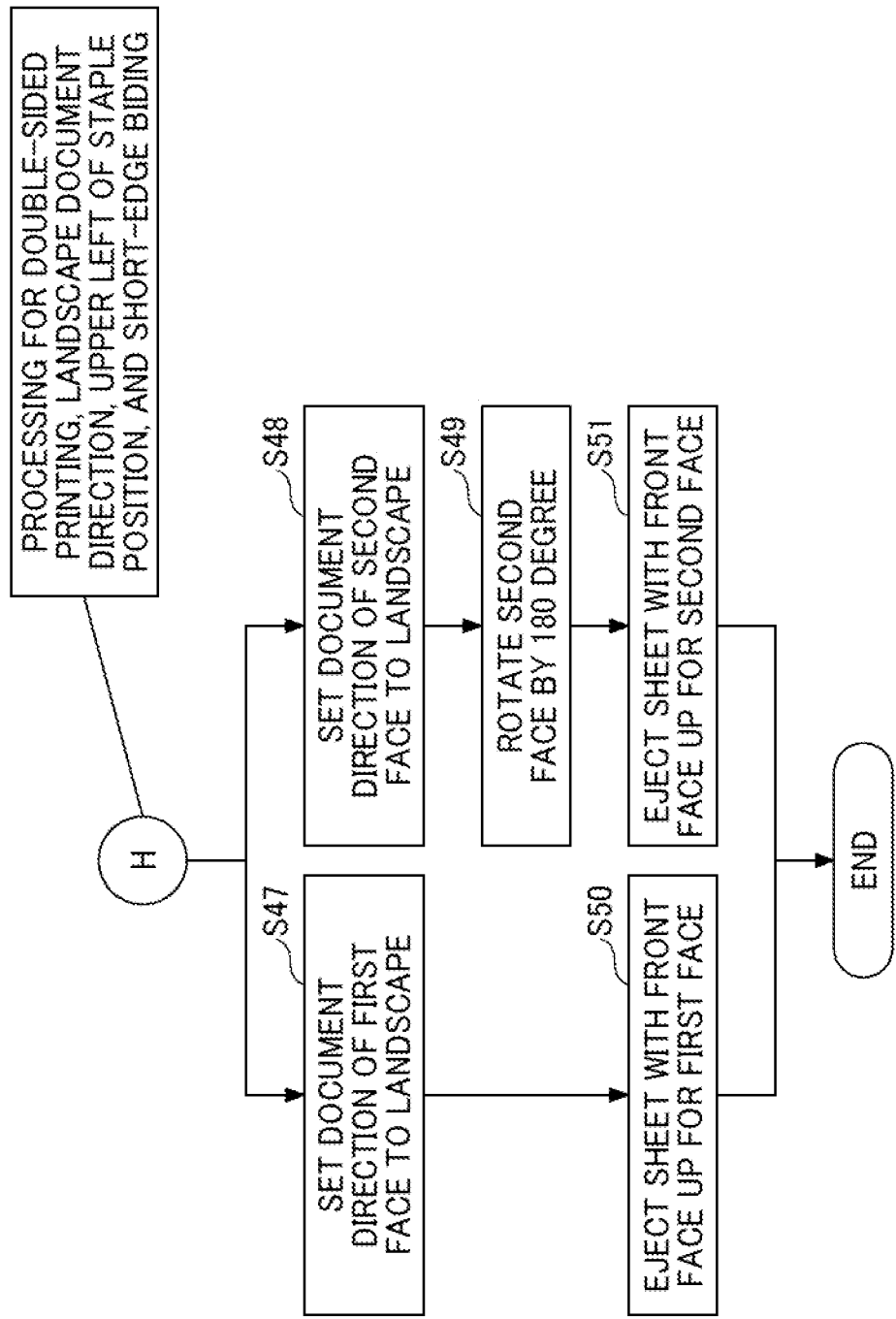

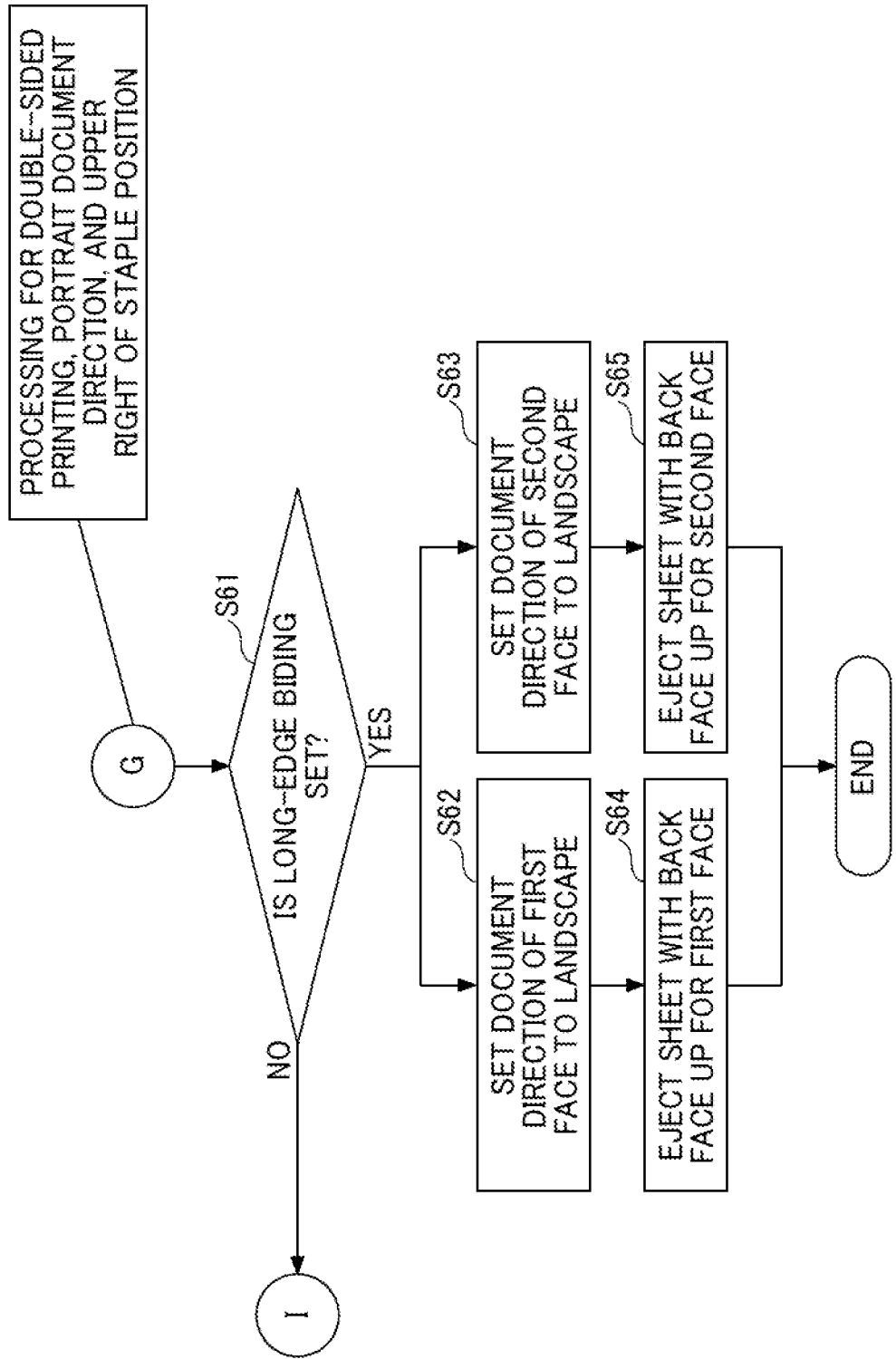

OUTPUT DEVICE, OUTPUT SYSTEM, AND OUTPUT METHOD

CROSS-REFERENCE TO RELATED APPLICATIONS

This patent application is based on and claims priority pursuant to 35 U.S.C. § 119(a) to Japanese Patent Application No. 2022-189545, filed on Nov. 28, 2022, in the Japan Patent Office, the entire disclosure of which is hereby incorporated by reference herein.

BACKGROUND

Technical Field

Embodiments of the present disclosure relate to an output device, an output system, and an output method.

Related Art

Some output devices that output output products such as sheets of paper on which images are printed based on image data are equipped with a post-processing apparatus such as a stapler that binds the output products. Since the stapler involves various mechanical operations, the stapler is designed to satisfy a certain degree of durability. However, for example, when an operator instructs the stapler to staple output products whose number exceeds a specified number of sheets, the durability in design may be reduced.

For this reason, some techniques of restricting the use of the stapler in ways that affect the durability of the stapler are known. For example, a technique for canceling the setting of the stapling when the number of printed sheets of a print job set for the stapling exceeds the specified number of sheets.

SUMMARY

In one aspect, an output device communicably connected with a post-processing apparatus for executing post-processing on an output product output from the output device, the output device includes circuitry to receive a processing setting pattern that is determined in accordance with an output condition of the output product and corresponding to an operation to be performed by the post-processing apparatus, the output condition, and image data of an image to be formed on the output product and control output of the image data using the post-processing apparatus based on the processing setting pattern and the output condition.

In another aspect, an output system includes a communication terminal including first circuitry, an output device communicably connected with the post-processing apparatus, the output device including second circuitry to output an output product having an image that is formed based on image data received from the communication terminal, and a post-processing apparatus to execute post-processing on the output product. The first circuitry of the communication terminal is to execute a printer driver to receive an output condition of the output product via a screen, determine a processing setting pattern corresponding to an operation to be performed by the post-processing apparatus according to the output condition, and transmit the processing setting pattern, the output condition, and the image data to be output to the output device. The second circuitry of the output device is to receive the processing setting pattern, the output condition, and the image data of the image to be formed on the output product and control output of the image data using the post-processing apparatus based on the processing setting pattern and the output condition.

In another aspect, an output method performed by a communication terminal that executes a printer driver includes receiving an output condition of an output product via a screen, determining a processing setting pattern corresponding to an operation to be performed on the output product by a post-processing apparatus according to the output condition, and transmitting, to an output device, the processing setting pattern, the output condition, and image data of an image to be formed on the output product.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein:

FIG. 4 is a diagram illustrating moving devices for moving a stapler that serves as a binding device of a post-processing apparatus according to an embodiment of the present disclosure;

FIG. 11A is a diagram illustrating a table of processing setting patterns stored in a processing setting pattern storage unit according to an embodiment of the present disclosure;

FIG. 11B is a diagram illustrating another table of processing setting patterns stored in a processing setting pattern storage unit according to an embodiment of the present disclosure;

FIG. 12 is a diagram illustrating a table of minimum amounts of operation stored in a minimum amount-of-operation storage unit according to an embodiment of the present disclosure;

FIG. 13 is a diagram illustrating a table of print job information stored in a print job storage unit according to an embodiment of the present disclosure;

FIG. 14 is a diagram illustrating a print setting screen displayed by a printer driver according to an embodiment of the present disclosure;

FIG. 21A is a diagram illustrating a processing setting pattern in the case of a long-edge feed of a sheet feeding direction, double-sided printing, a staple position at an upper left, and short-edge biding, according to an embodiment of the present disclosure;

FIG. 21B is a diagram illustrating a processing setting pattern in the case of a long-edge feed of a sheet feeding direction, double-sided printing, a staple position at an upper left, and long-edge biding, according to an embodiment of the present disclosure;

FIG. 24B is a flowchart of the processing in which a setting change unit changes a print setting according to the processing setting pattern of FIG. 23B, according to an embodiment of the present disclosure;

FIG. 26A is a flowchart of the processing in which a setting change unit changes a print setting according to the processing setting pattern of FIG. 25A, according to an embodiment of the present disclosure;

Figure 1A:
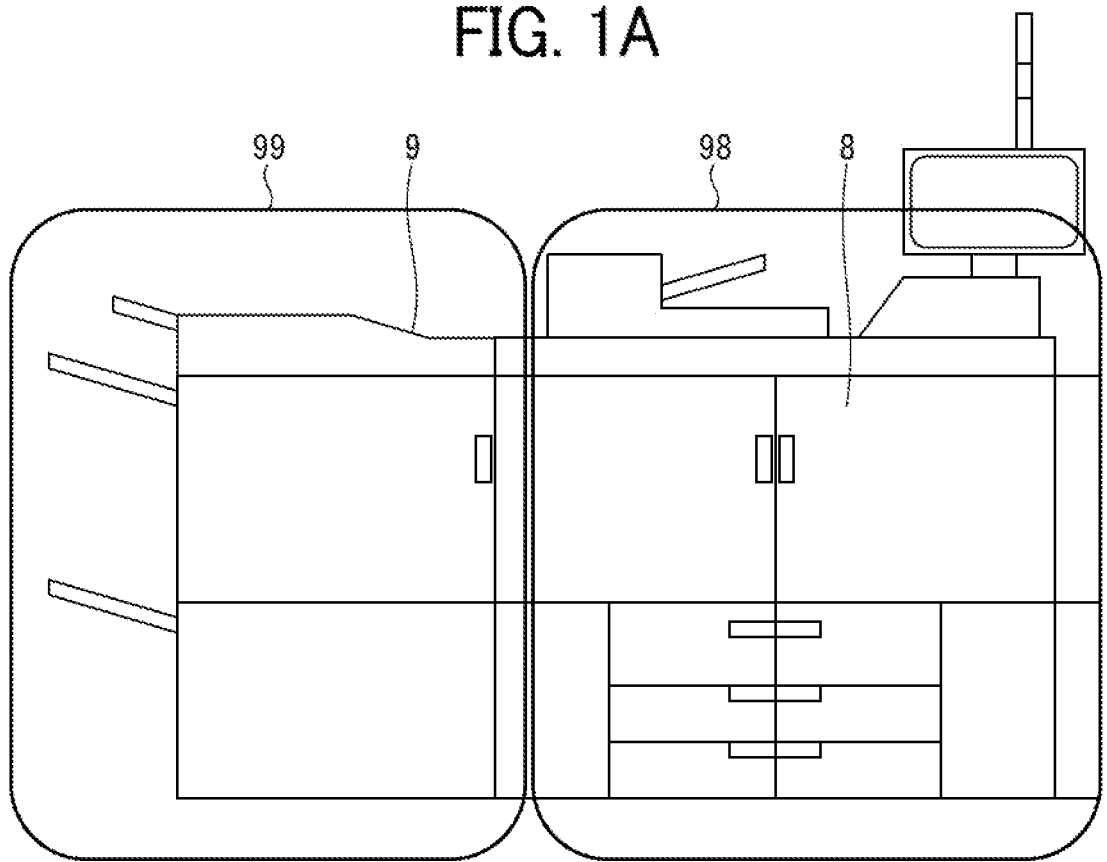
FIG. 1A is an external view of an image forming system according to an embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

An output device and an output method performed by the output device according to embodiments of the present disclosure are described below with reference to the drawings.

From a global perspective, there are various ways in which operators use the output device. Those operators sometimes operate the output device to staple sheets having a thickness exceeding the original specification of the output device or output products whose number exceeds the specified number of sheets. Those operators often operate the output device to execute the stapling at positions that cause the amount of operation of a stapler to be increased. Such improper use of the output device may reduce the durability of the stapler. In other words, although the output device can execute such somewhat unreasonable stapling beyond the original specification of the output device, the durability of the output device is adversely affected. Even when a failure occurs earlier than expected because of the reduction of the durability caused by improper use by the operators, such a failure may lead to, for example, dissatisfaction with the output device.

For this reason, for example, the following measures are considered to deal with such operators who use the output device improperly.
- A. To increase the durability of the stapler.
- B. To provide warning guidance at the time of use (or prior to use).
- C. To set a limit for improper use.

However, the measure "A" leads to a cost increase, and the majority of operators do not expect that level of specification. The measures "B" and "C" are to impose uniform restrictions, even if the restrictions are temporarily set. Accordingly, the measures "B" and "C" are not preferable for the operators who are caused to use the output device in such ways only several times a year or once a few years.

According to the present embodiment, the current durability of the output device is not necessarily to be changed significantly. For example, a printer driver automatically changes a print setting so that the load on the stapler is minimized. In other words, the printer driver changes the print setting for changing the orientation (upward or downward) of the front face of a sheet at the time of sheet ejection or rotating image data so that the moving range of the stapler is minimized. Thus, the load on the stapler is reduced when the output device performs a print job that involves stapling to be executed by the stapler. In this way, the durability of the stapler is prevented from being decreased without imposing uniform restrictions on the operators.

The output product is a medium output by the output device. In the present embodiment, the output product is a sheet material such as a sheet of paper or a sheet of film. In a case where the output device is an image forming apparatus such as a printer, an image representing image data is printed on the output product.

A post-processing apparatus is an apparatus that executes some sort of post-processing on the output product. The post-processing includes, for example, stapling, punching, and bookbinding.

The amount of operation of a processing apparatus is the amount of movement of the post-processing apparatus to exhibit the functions of the post-processing apparatus. Accordingly, the amount of operation may include any one or more of parallel movement, rotation, the number of times of processing, and the load during a single operation. The amount of operation of the processing apparatus described above affects the durability of the post-processing apparatus that executes, for example, the stapling. As the amount of operation increases, the number of factors that cause a failure or require a replacement of the post-processing apparatus increases. In other words, as the amount of operation increases, the time between failures or replacements becomes shorter, or the occurrence ratio of a failure or a replacement increases.

An output condition is a setting that determines how the output product is to be output. The output condition may be set by an operator or the initial values of the output condition may be predetermined. The output condition is referred to as a print setting in the case of a printing apparatus. In the present embodiment, the output condition includes items for determining a processing setting pattern.

The processing setting pattern is a print setting that allows the amount of operation of the post-processing apparatus to be reduced. The processing setting pattern is determined in accordance with the output condition. The expression "corresponding to the operation of the post-processing apparatus" means that the post-processing apparatus operates in accordance with a particular setting set in the processing setting pattern.

First, the structure of the stapler is described below with reference to FIGS. 1A to 6.

FIG. 1A is an external view of an image forming system according to an embodiment of the present disclosure.

In FIG. 1A, the portion surrounded by a frame line 99 is a post-processing apparatus 9, and the portion surrounded by a frame line 98 is an image forming apparatus 8. The image forming apparatus 8 and the post-processing apparatus 9 are described in detail below. The drawings described below are merely given by way of example for the sake of description of a stapler.

Figure 1B:
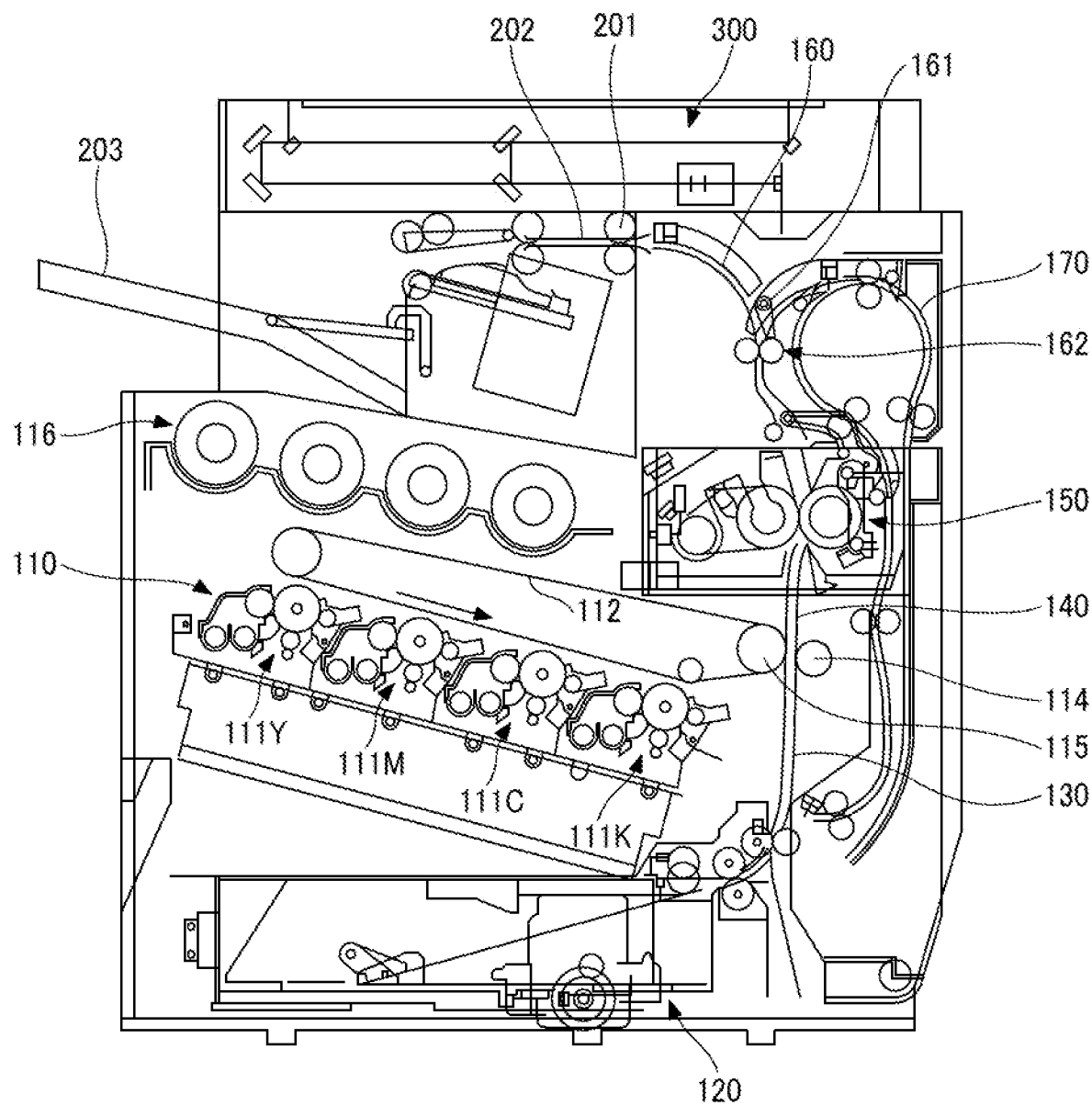
FIG. 1B is a schematic diagram illustrating a configuration of an image forming apparatus according to an embodiment of the present disclosure.

FIG. 1B is a schematic diagram illustrating a configuration of the image forming apparatus 8 according to an embodiment of the present disclosure.

The image forming apparatus 8 is a tandem color image forming apparatus employing an indirect transfer method using an intermediate transferor. An image forming device 110 that serves as a toner image forming device is arranged substantially at the center of the image forming apparatus 8. The image forming device 110 includes image forming stations 111Y, 111M, 111C, and 111K (suffixes Y, M, C, and K are omitted as appropriate in the following description) for four colors (Y: yellow, M: magenta, C: cyan, and K: black) arranged in a predetermined direction. The image forming apparatus 8 includes a sheet feeder 120 and a sheet conveyance path (vertical conveyance path) 130. The sheet feeder 120 is disposed below the image forming device 110 and serves as a recording medium feed device. The sheet conveyance path 130 conveys a sheet as a recording medium picked up by the sheet feeder 120 to a secondary transfer device 140 and a fixing device 150. Further, the image forming apparatus 8 includes a branch sheet ejection path 160 and a duplex sheet conveyance path 170. The branch sheet ejection path 160 conveys the sheet on which an image (toner image) is fixed toward the post-processing apparatus 9. The duplex sheet conveyance path 170 inverts the sheet whose first face (front face) the image is formed on so that another image is formed on the second face (back face).

The image forming device 110 includes photoconductor drums that serve as image bearers for the respective colors Y, M, C, and K of the image forming stations 111. The image forming device 110 includes a charging unit, a developing unit, a primary transfer unit, a cleaning unit, and an electric-charge removing unit along the outer periphery of each of the photoconductor drums. The charging unit serves as a charging device. The developing unit serves as a developing device. The electric-charge removing unit serves as an electric-charge removing unit. The image forming device 110 includes optical writing units that serve as exposure devices and an intermediate transfer belt 112 that serves as an intermediate transferor. The optical writing units are disposed below the image forming stations 111, and form electrostatic latent images by irradiating the photoconductor drums with light for each color based on image data. The intermediate transfer belt 112 is disposed above the image forming stations 111, and the image (toner image) formed on each photoconductor drum is transferred by the primary transfer unit.

The intermediate transfer belt 112 is rotatably supported by support rollers. A support roller 114 that is one of the support rollers faces a secondary transfer roller 115 via the intermediate transfer belt 112 in the secondary transfer device 140. In the secondary transfer device 140, the image (toner image) on the intermediate transfer belt 112 is secondarily transferred onto a sheet. Above the intermediate transfer belt 112, replaceable toner containers 116 are disposed.

The image forming process performed by the image forming apparatus configured as described above (such as the tandem color image forming apparatus employing an indirect transfer method) is known and is not related to the gist of the present disclosure directly. Accordingly, a detailed description thereof is omitted.

The sheet on which the fixing processing is executed in the fixing device 150 is conveyed by a conveyance roller 162, and the conveyance direction of the sheet is switched by the conveyance path switching section 161. Thus, the sheet on which the fixing processing is executed is conveyed to the branch sheet ejection path 160 or the duplex sheet conveyance path 170.

Figure 2:
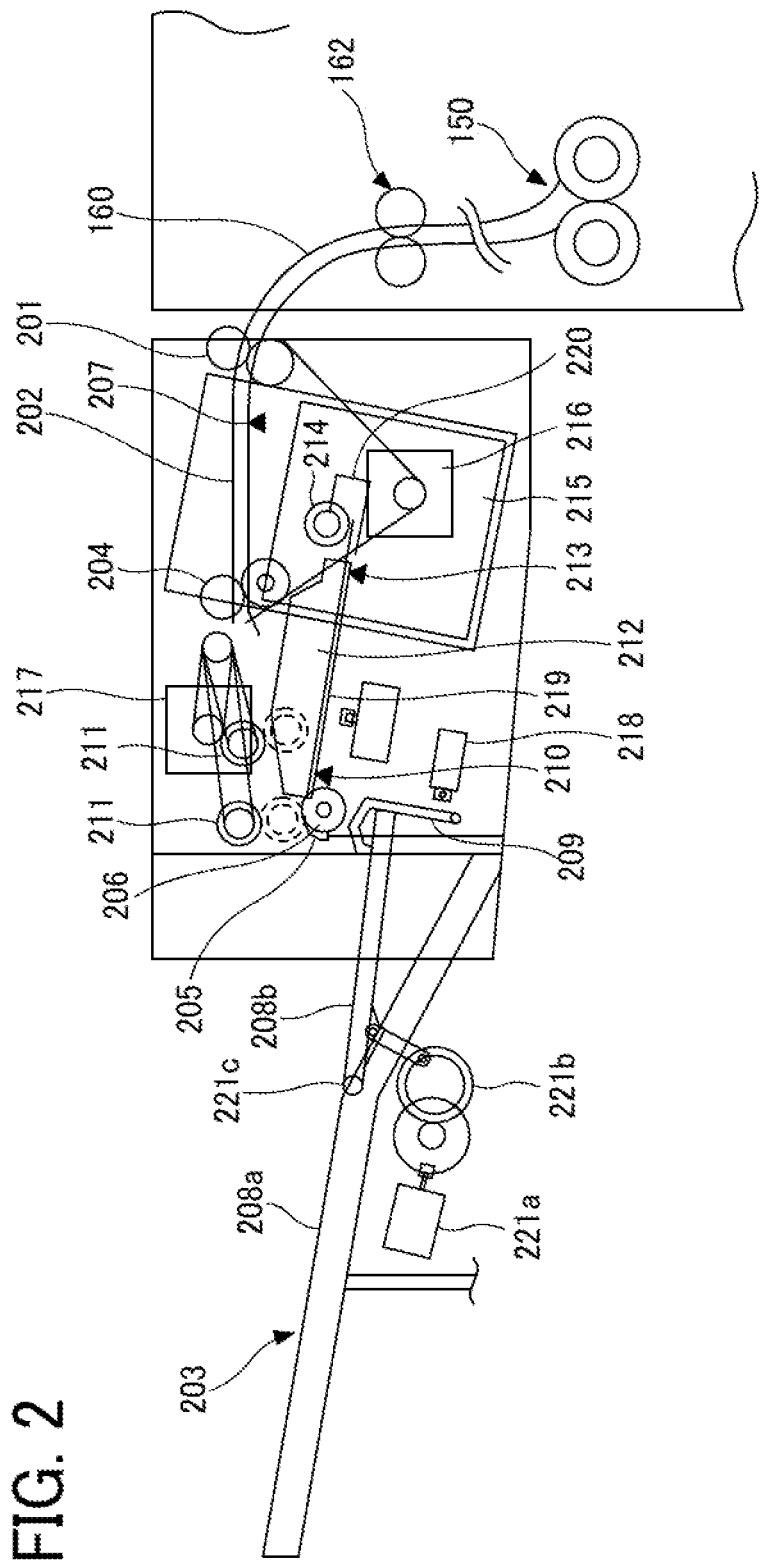
FIG. 2 is a schematic diagram illustrating the internal structure of a post-processing apparatus that is a part of an image forming system and the structure around the post-processing apparatus, according to an embodiment of the present disclosure.

FIG. 2 is a schematic diagram illustrating the internal structure of the post-processing apparatus 9 that is a part of the image forming system and the structure around the post-processing apparatus 9, according to an embodiment of the present disclosure. The post-processing apparatus 9 includes, in order from the upstream side in the sheet conveyance direction, an entrance roller pair 201, a sheet ejection conveyance path 202, a shift sheet ejection roller pair 204, and a staple tray 219. Further, the post-processing apparatus 9 includes, in order toward the downstream side in the sheet conveyance direction, a tapping roller 211, a trailing end reference fence 220, jogger fences 212, a sheet ejection roller 206, a sheet ejection guide plate 205, and a sheet ejection tray 203. In other words, the sheet receiving section of the post-processing apparatus 9 is provided with the entrance roller pair 201 that receives a sheet conveyed from the branch sheet ejection path 160 of the image forming apparatus 8. The sheet received by the entrance roller pair 201 is conveyed toward the shift sheet ejection roller pair 204 via the sheet ejection conveyance path 202. The shift sheet ejection roller pair 204 has a function of shifting a sheet to the sheet ejection tray 203 for ejection. The entrance roller pair 201 and the shift sheet ejection roller pair 204 are rotationally driven by an entrance motor 216 that is a stepping motor as a driving source. Thus, the sheet is conveyed along the sheet ejection conveyance path 202.

The sheet ejection conveyance path 202 is provided with an entrance sensor 207 that serves as a sheet detecting device. The entrance sensor 207 detects the leading end and the trailing end of the sheet conveyed along the sheet ejection conveyance path 202. The timing of the sheet processing is controlled by the detection timing of the end edge and the trailing end of the sheet and the number of driving steps of the entrance motor 216 that is a stepping motor and a sheet ejection motor 217 to be described later.

At the end of the staple tray 219 near the sheet ejection roller 206, a jam sensor 210 is disposed. The jam sensor 210 that serves as a sheet jam detecting device detects a sheet jam. At the other end of the staple tray 219 near the trailing end reference fence 220, a sheet sensor 213 is disposed. The sheet sensor 213 detects a sheet on which the sheet processing is to be executed. Between the staple tray 219 and the trailing end reference fence 220, return rollers 214 are disposed. The return rollers 214 maintain a correct alignment of the sheet on which the sheet processing is to be executed in the conveyance direction of the sheet.

The tapping roller 211 is provided to be movable up and down between a position indicated by a solid line and a position indicated by a broken line in FIG. 2. The tapping rollers 211 are rotationally driven at a predetermined timing by the driving force of the sheet ejection motor 217 as a driving source.

The sheet ejection tray 203 includes a stationary portion 208a on the downstream side in the sheet ejection direction and a movable portion 208b near the main body of the post-processing apparatus 9. The movable portion 208b is coupled to a cam 221 that is rotationally driven by a direct current (DC) motor 221a as a drive source, and is controllable to swing around a swing shaft 221c. For example, when sheet bundles whose sheets are bound at the trailing end portions in the sheet ejection direction (the right end portion of the sheet ejection tray 203 in FIG. 2) are ejected, the trailing end portions of the sheet bundles in the sheet ejection direction may be bulky and warp upward. In this case, the DC motor 221a is driven to swing the movable portion 208b in the clockwise direction around the swing shaft 221c so as to lower the end of the movable portion 208b near the main body of the post-processing apparatus 9. Thus, even when the sheet bundles whose sheets are bound at the trailing end portions in the sheet ejection direction are ejected, the uppermost sheet of each of the sheet bundles is prevented from warping upward. The trailing end portions of the sheet bundles in the sheet ejection direction, which are ejected onto the movable portion 208b and placed near the main body of the post-processing apparatus 9, are kept being pressed with the leading end of a pressing lever 209 which is swung by a solenoid 218.

The post-processing apparatus 9 configured as described above executes predetermined processing such as binding processing on the sheets based on the sheet conveyance mode notified from the controller of the main body of the image forming apparatus 8, and ejects the sheets onto the sheet ejection tray 203. The "sheet conveyance mode" in the present embodiment includes a shift mode and a staple mode. In the shift mode, sheets are shifted to different positions in a direction orthogonal to the sheet conveyance direction to be sorted, and then ejected. In the staple mode, sheets are bound, and then ejected as a sheet bundle. However, the sheet conveyance mode is not limited thereto.

FIGS. 3A to 3D are diagrams each illustrating the processing to receive and align sheets in the staple mode of the post-processing apparatus 9 according to an embodiment of the present disclosure.

Figure 3B:
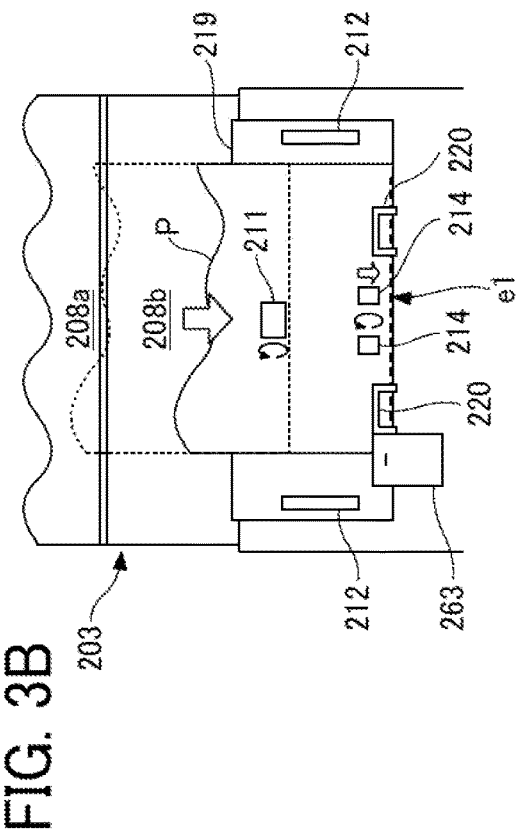
FIGS. 3A to 3D are diagrams each illustrating the processing to receive and align sheets in a staple mode of a post-processing apparatus according to an embodiment of the present disclosure.
Figure 3D:
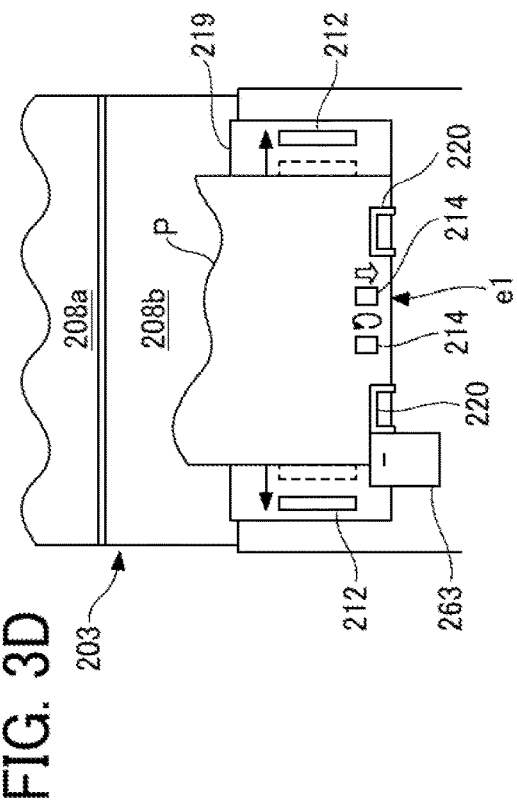
Figure 3A:
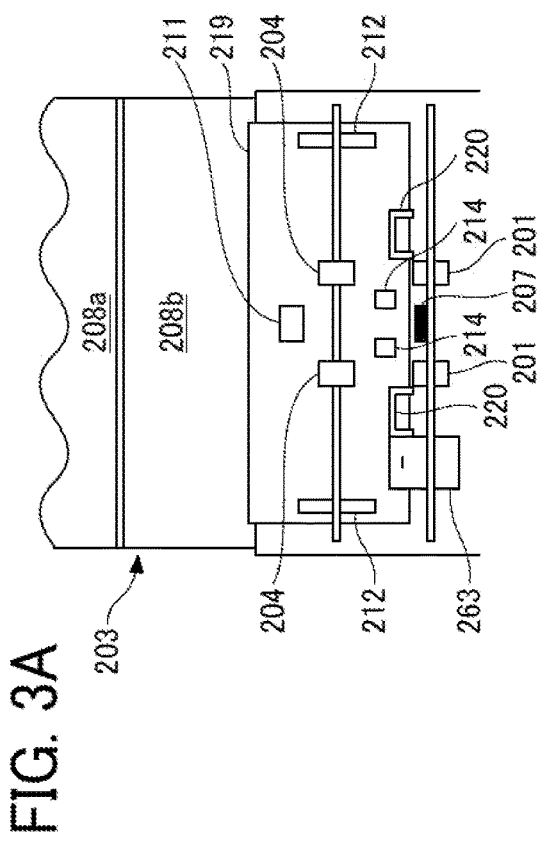

With reference to FIG. 3A, the staple tray 219, a stapler 263, and the main components around the staple tray 219 and the stapler 263 used in the staple mode, and the processing to receive and align sheets are described. In the present embodiment, the "staple mode" is a mode in which sheets are bound by the stapler 263 that serves as a binding processing device that binds sheets for each certain number of sheets at the time of sheet ejection, and the bundles of the bound sheets are ejected.

The tapping roller 211 is disposed between the shift sheet ejection roller pair 204 disposed at the most downstream of the sheet ejection conveyance path 202 illustrated in FIG. 2 and the sheet ejection guide plate disposed at the position immediately before the sheet is ejected onto the sheet ejection tray 203. The tapping roller 211 is driven in the vertical direction by the sheet ejection motor 217 that is, for example, a stepping motor. More specifically, the tapping roller 211 includes a lever portion and a roller portion. The lever portion moves up and down. The roller portion is rotationally driven by the sheet ejection motor 217 so as to convey the sheet in the direction opposite to the sheet conveyance direction (that is the left direction in FIG. 2).

At the time of sheet reception, as illustrated in FIG. 3B, the stapler 263 is moved to the standby position in advance and the jogger fences 212 are retracted to the sheet receiving positions. Then, a sheet P is received from the image forming apparatus 8. When the trailing end of the sheet P passes the shift sheet ejection roller pair 204, the tapping roller 211 is lowered, and the sheet P is pressed against the staple tray 219 by the roller portion of the tapping roller 211. Further, the roller portion of the tapping roller 211 is rotated to switch back the sheet P until an edge e1 at the trailing end of the sheet P contacts the trailing end reference fence 220. At this point, the roller portion of the tapping roller 211 is rotationally driven by the sheet ejection motor 217, and is driven together with the sheet ejection roller 206.

Figure 3C:
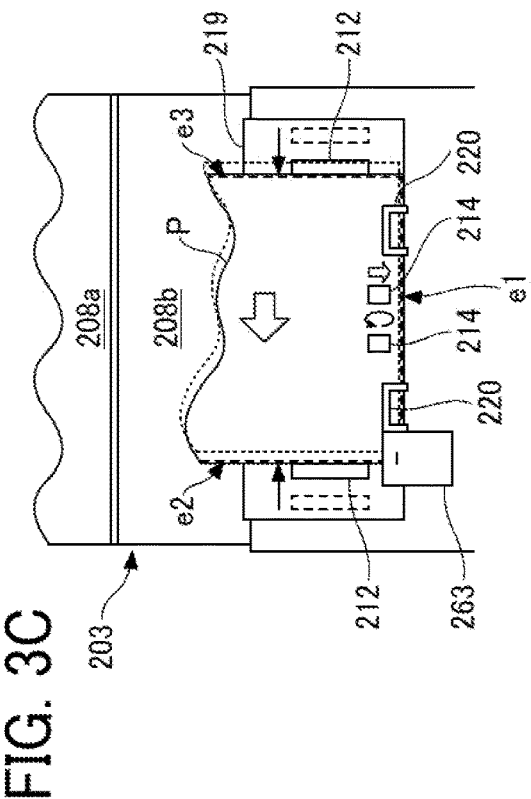

The jogger fences 212 are in a standby status at positions where the jogger fences 212 do not contact the sheet P being conveyed or the sheet P being switched back until the sheet P is completely switched back. When the sheet P is completely switched back, the tapping roller 211 is moved up, and the jogger fences 212 are moved in the sheet width direction as illustrated in FIG. 3C. Thus, the side faces of the jogger fences 212 contact edges e2 and e3 of the sheet P, and the sheet P is aligned with the reference position.

Each of the return rollers 214 is a sponge roller in which a sponge material 214b is provided on the outer periphery of a roller shaft 214a. The return rollers 214 are driven to rotate by the entrance motor 216 and come into contact with the sheet P stacked on the staple tray 219. By applying a conveyance force to the sheet P toward the trailing end reference fences 220, the return rollers 214 maintain a correct alignment of the sheet P in the sheet conveyance direction.

When the sheet P is completely aligned, as illustrated in FIG. 3D, the jogger fences 212 are retracted to positions where the jogger fences 212 do not contact the sheet P in preparation for receiving the next sheet.

Thereafter, the alignment and retraction are repeated. After the conveyance operation, the switchback operation, and the alignment processing of the designated number of sheets are completed, the sheets are bound by the stapler 263.

FIG. 4 is a diagram illustrating moving devices for moving the stapler 263 that serves as a binding device of the post-processing apparatus 9 according to an embodiment of the present disclosure.

The stapler 263 is driven, via a timing belt 272, by a stapler moving motor 271 that rotates in both forward and reverse directions. By the stapler moving motor 271 driving the stapler 263, the stapler 263 is configured to be movable in the sheet width direction along the guide shaft 275 in order to bind one or more positions (typically two positions) at the edge e1 of the sheet P. The stapler moving motor 271 and the timing belt 272 function as moving devices for the stapler 263, and the stapler 263 is movable over at least the entire width of the edge e1 supported by the trailing end reference fence 220. In the present embodiment, a guided portion 263B included in a part of the stapler 263 is configured to slide, for example, along the guide shaft 275. A driven portion 263A disposed at one end near the timing belt 272 of both ends of the stapler 263 with the guided portion 263B therebetween is fixed to the timing belt 272. A sensor feeler 274 as a detected portion, which will be described later, is disposed at the other end of the stapler 263.

A stapler home position sensor 273 (referred to as a "stapler HP sensor 273" in the following description) that serves as a standby position detection device that detects the standby position (home position) of the stapler 263 is disposed at one end (on the left side in FIG. 4) of the moving range of the stapler 263. The stapler 263 is provided with the sensor feeler 274 as a portion to be detected by the stapler HP sensor 273. When the stapler HP sensor 273 detects the sensor feeler 274 of the stapler 263, the standby position (home position) of the stapler 263 is detected. The control of moving the stapler 263 to a predetermined binding position in the width direction of the sheet P is performed based on the time point when the sensor feeler 274 passes through the detection portion of the stapler HP sensor 273. In other words, the detection is performed based on the time point when the sensor feeler 274 of the stapler 263 is no longer detected by the stapler HP sensor 273 after the stapler 263 starts moving. The stapler 263 is controlled to move by a predetermined target amount of movement after the sensor feeler 274 passes through the detection portion of the stapler HP sensor 273. In other words, after the stapler 263 starts moving and the sensor feeler 274 of the stapler 263 is no longer detected by the stapler HP sensor 273, the stapler 263 is controlled to move by the predetermined target amount of movement. As the movement of the stapler 263 is controlled as described above, the stapler 263 at the standby position is moved to the predetermined binding position in the width direction of the sheet P.

Figure 5:
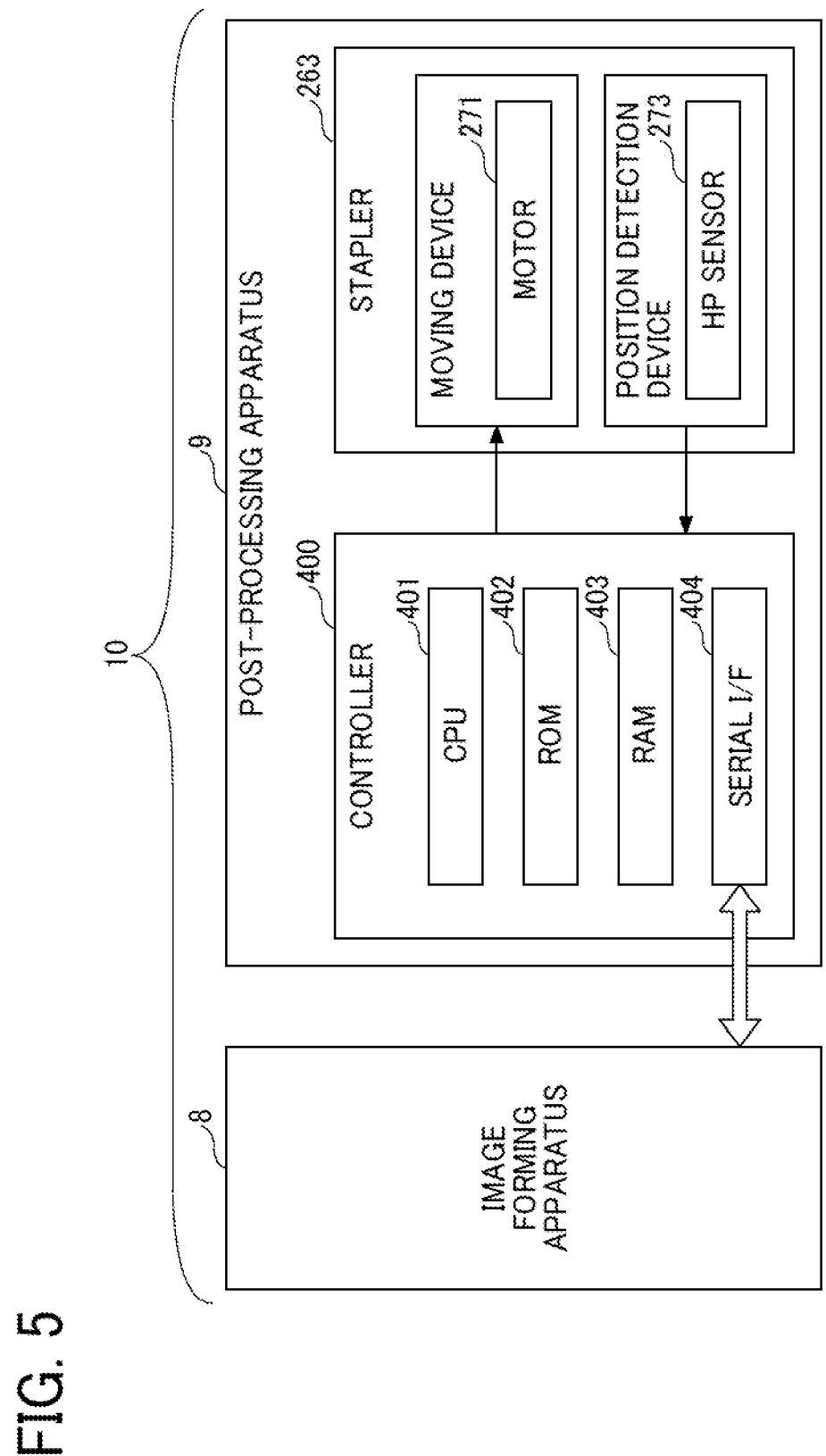
FIG. 5 is a block diagram illustrating a hardware configuration of a control system for controlling the movement of a stapler of a post-processing apparatus according to an embodiment of the present disclosure.

FIG. 5 is a block diagram illustrating a hardware configuration of a control system for controlling the movement of the stapler 263 of the post-processing apparatus 9 according to an embodiment of the present disclosure.

The post-processing apparatus 9 includes a controller 400 that serves as a controller. The controller 400 includes, for example, a central processing unit (CPU) 401, a read-only memory (ROM) 402, a random access memory (RAM) 403, and a serial interface (I/F) 404 as control devices. The program codes for the control are stored in the ROM 402. The CPU 401 loads the program codes onto the RAM 403, stores data used for the control in the RAM 403, and executes the control defined by the program codes using the RAM 403 as a work area. Thus, the movement of the stapler 263 is controlled.

The image forming apparatus 8 and the post-processing apparatus 9 are controlled so as to communicate with each other via the serial I/F 404. By this communication control, commands used for sheet processing such as sheet size information of a sheet to be passed through from the image forming apparatus 8 and an operation completion notification of the post-processing apparatus 9 are exchanged.

In the present embodiment, the RAM 403, for example, is used as a first memory that stores the amount of movement of the stapler 263 when the stapler 263 is moved at a predetermined moving speed (referred to as a "stapling position moving speed" in the following description) V1 for executing the binding processing. The RAM 403, for example, is also used as a second memory that stores the amount of movement of the stapler 263 when the stapler 263 is moved at a reference speed V2 to be described later, which is lower than the stapling position moving speed V1. In other words, the amount of movement of the stapler 263 when the stapler 263 is moved at the stapling position moving speed V1 and the amount of movement of the stapler 263 when the stapler 263 is moved at a reference speed V2 are stored in the storage areas set in the RAM 403. As a memory for storing the above-amounts of movement, in addition to the RAM 403, another built-in memory included in the controller 400, an external recording medium such as a detachable memory card or a universal serial bus (USB), or an external storage device such as a magnetic disk or an optical disk may be used. The CPU 401 also functions as a comparison device that compares the amounts of movement stored in the first memory and the second memory such as the RAM 403.

FIG. 6A to 6G are diagrams each illustrating behaviors of the stapler 263 when the stapler 263 is moved to a binding position at the stapling position moving speed V1 and the reference speed V2, according to an embodiment of the present disclosure.

Figure 6A:
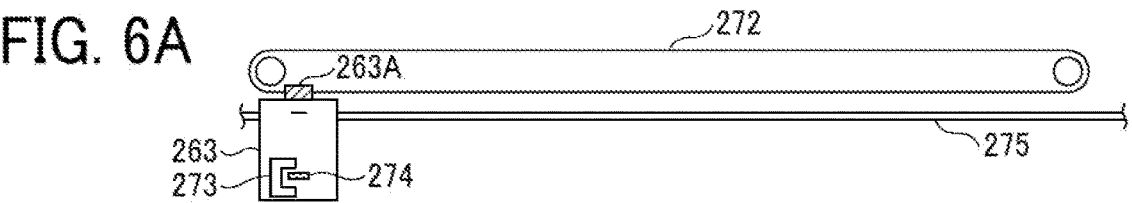
FIG. 6A to 6G are diagrams each illustrating behaviors of a stapler when the stapler is moved to a binding position at a stapling position moving speed V1 and a reference speed V2, according to an embodiment of the present disclosure.

First, the stapler moving motor 271 rotates in a direction in which the stapler 263 is moved out of the home position (HP) that is a standby position and drives the timing belt 272 to rotate. Then, the driven portion 263A, which is the attachment portion of the timing belt 272 illustrated in FIG. 6A, is moved, and the stapler 263 starts moving.

Figure 6B:
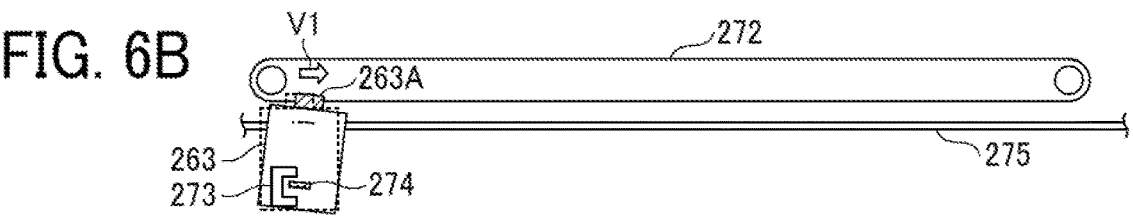
Figure 6C:
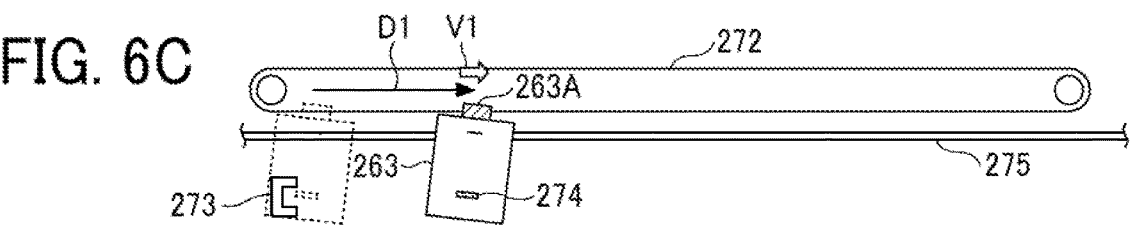
Figure 6D:
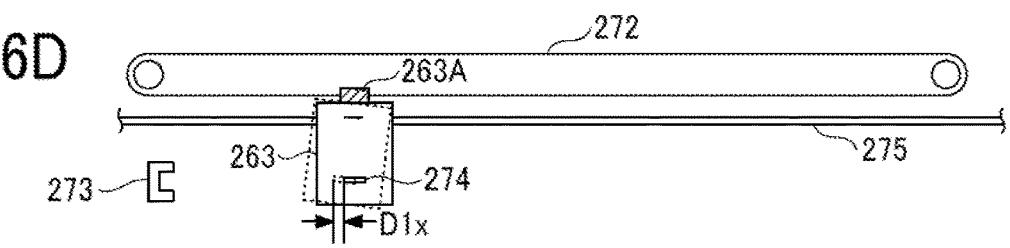
Figure 6E:
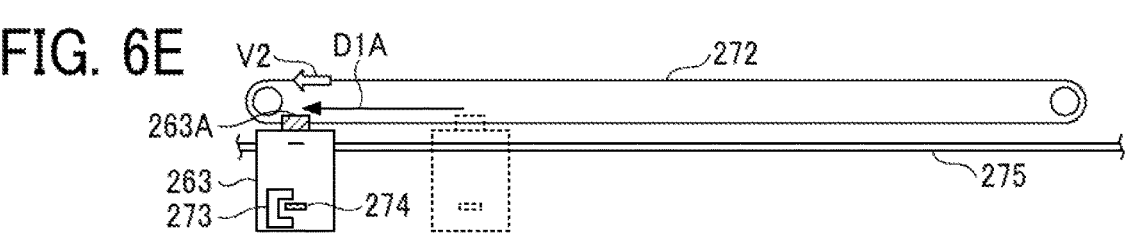

In the present embodiment, in order to increase the productivity of the post-processing apparatus 9, the controller 400 moves the stapler 263 at the stapling position moving speed V1 that is a high speed. When moving at such a high speed, the stapler 263 as an entirety cannot follow the movement of the attachment portion (driven portion) 263A of the timing belt 272 due to the inertia force applied to the stapler 263. As a result, as illustrated in FIG. 6B, the stapler 263 moves in a state in which the stapler 263 is inclined.

When the stapler 263 starts moving in the state in which the stapler 263 is inclined, an OFF timing at which the stapler HP sensor 273 does not detect the stapler 263 is delayed compared with the case where the stapler 263 starts moving in the state in which the stapler 263 is not inclined. This inclination is eliminated when the movement of the stapler 263 is stopped. Accordingly, when the stapler 263 is moved by a predetermined target amount-of-movement D1 for correction (see FIG. 6C) and stops moving after the OFF timing of the stapler HP sensor 273 (that is, after the stapler HP sensor 273 no longer detects the stapler 263), the stapler 263 is in a status of excessive movement. In other words, an excessive amount of movement D1x corresponding to the time period caused by the delay of the OFF timing of the stapler HP sensor 273 due to the inclination of the stapler 263 occurs (see FIG. 6D).

For this reason, in order to obtain the above-described excessive amount of movement D1x, the controller 400 starts moving the stapler 263 at the reference speed V2, which is set to be lower than the stapling position moving speed V1 so as not to cause the stapler 263 to incline, from the position to which the stapler 263 is moved by the predetermined target amount of movement D1 for correction at the stapling position moving speed V1. An amount of movement D1A (see FIG. 6E) from the start of the movement to the time when the stapler HP sensor 273 detects the stapler 263 and returns to the standby position (home position) is obtained.

In the present embodiment, the "reference speed" V2 is the moving speed of the stapler 263 set to be low so as not to cause inclination of the stapler 263 at the time of starting the movement of the stapler 263. In other words, the "reference speed" V2 is a moving speed set to be low so that a delay time from the start of the movement of the stapler 263 to the time point at which the stapler 263 is no longer detected by the stapler HP sensor 273 does not occur. When the stapler 263 is moved at the reference speed V2, the actual amount of movement of the stapler 263 (i.e., the amount of movement D1A in the case of FIG. 6E) is obtained from, for example, the product of the moving time of the stapler 263 and the reference speed V2.

Figure 6F:
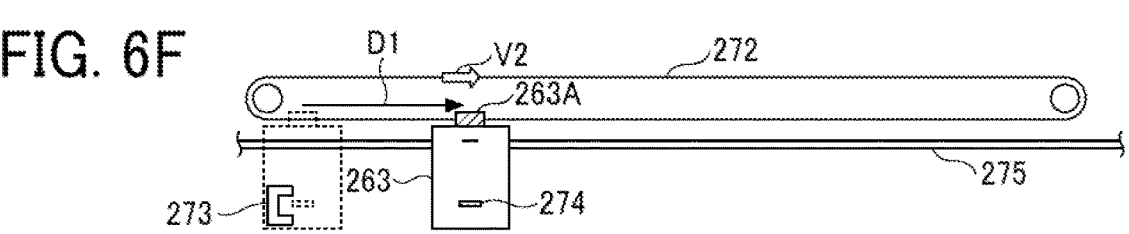
Figure 6G:
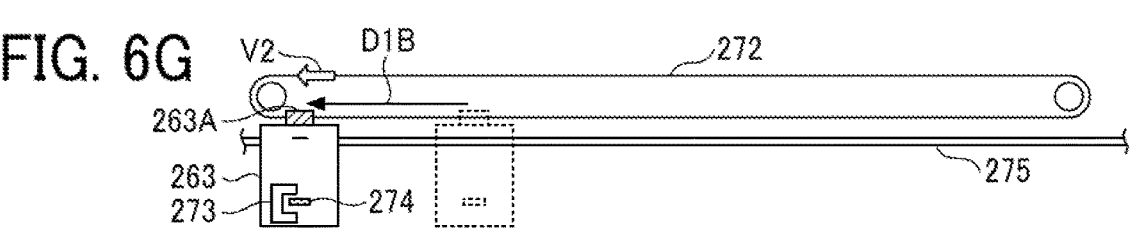

Subsequently, in order to obtain a reference amount of movement used to calculate the excessive amount of movement D1x caused by the delay of the sensing timing, the controller 400 operates to move the stapler 263 at the reference speed V2 by the predetermined target amount-of-movement D1 for correction from the position of the OFF timing of the stapler HP sensor 273 (see FIG. 6F). The controller 400 obtains the amount of movement when the stapler 263 is returned to the home position at the reference speed V2 from the position to which the stapler 263 moves at the reference speed V2 by the predetermined target amount-of-movement D1 for correction. The controller 400 determines the amount of movement calculated in the above method to be a reference movement amount D1B (FIG. 6G).

Figure 7:
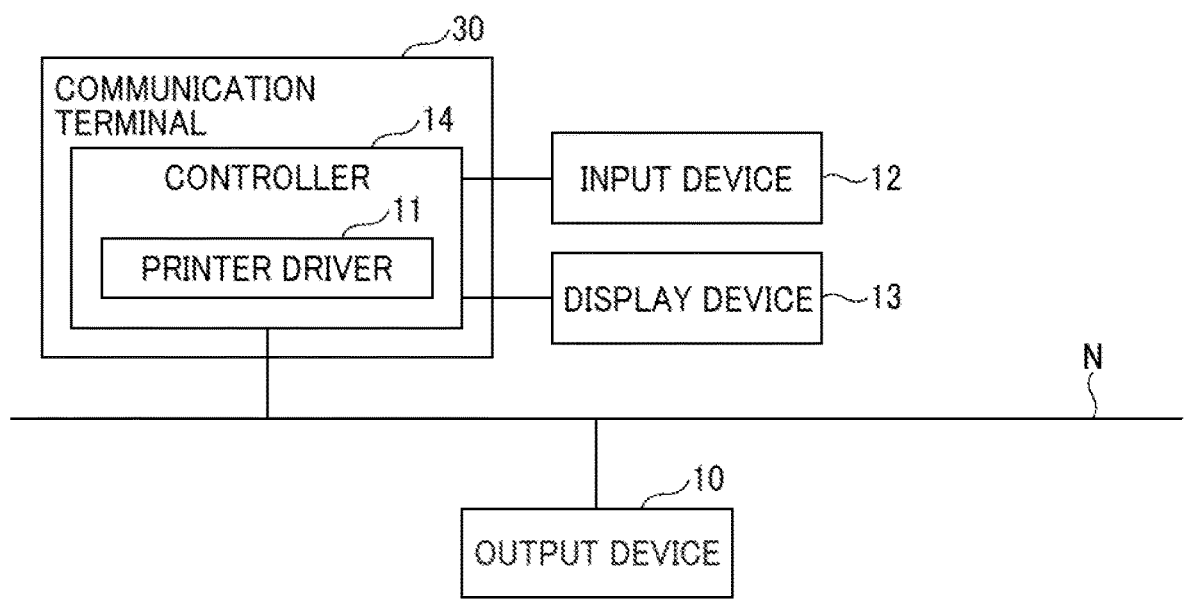
FIG. 7 is a block diagram illustrating a configuration of an output system according to an embodiment of the present disclosure.

FIG. 7 is a block diagram illustrating a configuration of an output system 100 according to an embodiment of the present disclosure.

The output system 100 includes communication terminals 30 and output devices 10 that are connected to each other via a network N. The communication terminals 30 can use the output devices 10 on the network N to execute printing. In FIG. 7, only one communication terminal 30 and one output device 10 are illustrated. The other communication terminals 30 and output devices 10 are omitted.

Figure 8:
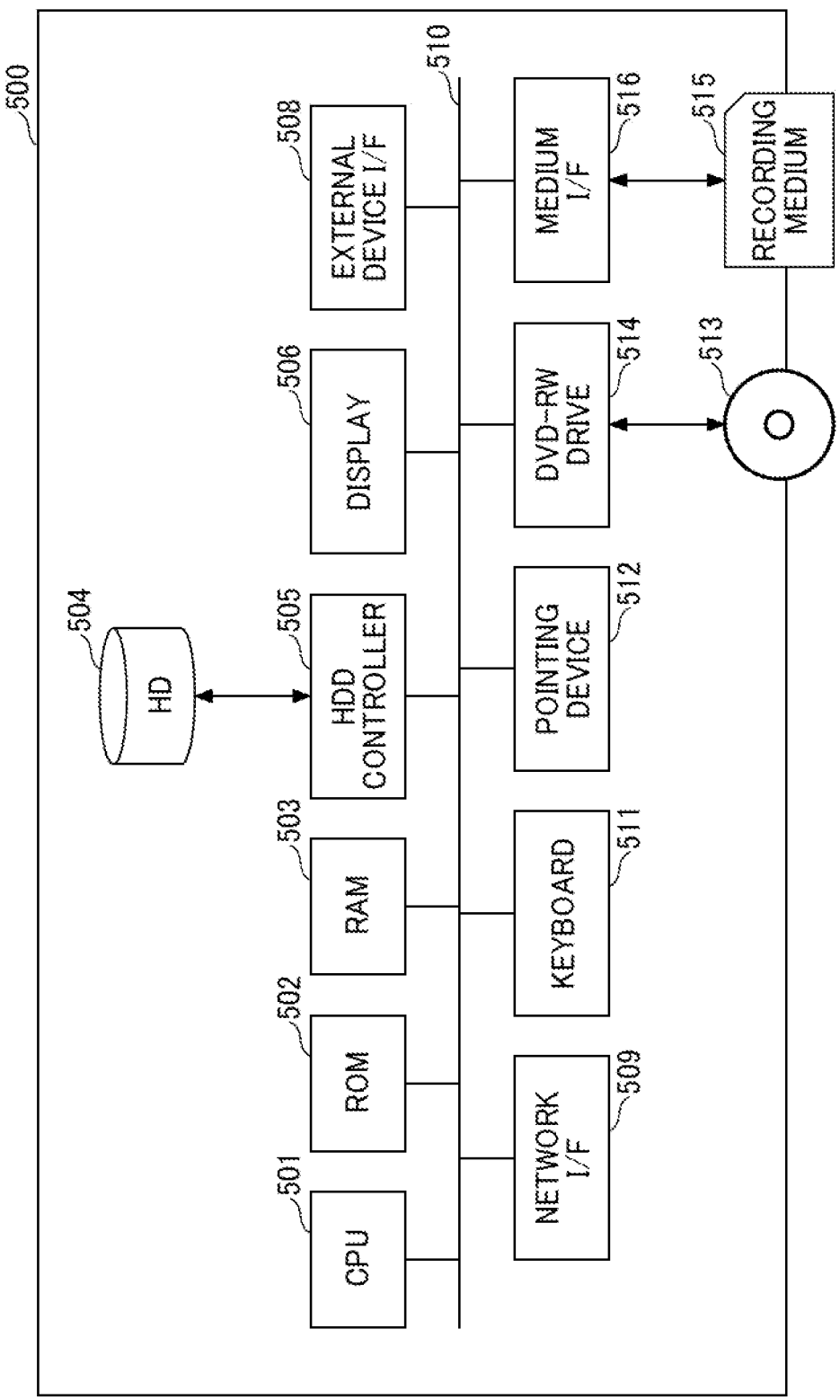
FIG. 8 is a block diagram illustrating a hardware configuration of a communication terminal according to an embodiment of the present disclosure.

The communication terminal 30 includes a controller 14 that is implemented by a microcomputer including, for example, a CPU, a ROM, a RAM, and a hard disk drive (HDD) illustrated in FIG. 8. To the controller 14, an input device 12 and a display device 13 are connected. While the input device 12 and the display device 13 are illustrated as separate devices in FIG. 7, the input device 12 and the display device 13 may be incorporated into the communication terminal 30 as illustrated in FIG. 8.

The controller 14 is implemented by the CPU executing various control programs stored in the ROM or the HDD, and controls the entire operation of the communication terminal 30. Similarly, the functional units are implemented by the CPU executing a printer driver 11 stored in the ROM or the HDD, and control the printing executed by the output device 10. More specific example structure of the controller 14 is described below referring to FIG. 8.

The input device 12 is implemented by, for example, a keyboard and a mouse, and is a device with which the operator inputs various operation information (for example, a print setting) to the communication terminal 30. The operation information input with the input device 12 is transmitted to the controller 14. The controller 14 executes various processing based on the various operation information.

The display device 13 is, for example, a display 506 illustrated in FIG. 8, and displays various operation screens and various information to the operator. The display is performed by the controller 14 executing the control processing.

The output device 10 is a printing device that performs a print job transmitted from the communication terminal 30 based on a print setting instructed by the communication terminal 30. The output device 10 may be a monochrome printer or a color printer. Any of various printing methods including an ink jet system and an electrophotographic method is employed as a printing method of the output device 10. In the present embodiment, the output device 10 may be any device that has a printing function. The output device 10 is applicable to any device including a facsimile machine, a copying machine, or a multifunction peripheral as long as the device has a printing function. The communication terminal 30 may store the print job in a print server, and the output device 10 may acquire the print job from the print server and perform the print job. As described above, examples of the output device 10 include the image forming apparatus 8, which is communicably connected with the post-processing apparatus 9.

The network N is any of various communication networks including the Internet and a local area network, and may be wired or wireless. The network N may include a mobile phone network such as the third generation (3G), the fourth generation (4G), the fifth generation (5G), or the sixth generation (6G).

Some hardware configurations of the communication terminal 30 and the image forming apparatus 8 according to the present embodiment are described below with reference to FIGS. 8 and 9.

FIG. 8 is a block diagram illustrating a hardware configuration of the communication terminal 30 according to an embodiment of the present disclosure.

As illustrated in FIG. 8, the communication terminal 30 is implemented by a computer 500. The computer 500 includes a CPU 501, a ROM 502, a RAM 503, a hard disk (HD) 504, an HDD controller 505, the display 506, an external device interface (I/F) 508, a network interface (I/F) 509, a bus line 510, a keyboard 511, a pointing device 512, a digital versatile disc rewritable (DVD-RW) drive 514, and a medium interface (I/F) 516.

The CPU 501 controls the entire operation of the communication terminal 30. The ROM 502 stores a program such as an initial program loader (IPL) to boot the CPU 501. The RAM 503 is used as a work area for the CPU 501. The HD 504 stores various data such as a control program. The HDD controller 505 controls the reading and writing of various data from and to the HD 504 under the control of the CPU 501. The display 506 displays various information such as a cursor, a menu, a window, characters, and images. The external device I/F 508 is an interface for connection with various external devices. Examples of the external devices include, but are not limited to, a USB memory and a printer. The network I/F 509 is an interface for data communication through the communication network N. The bus line 510 is, for example, an address bus or a data bus, which electrically connects the components or elements such as the CPU 501 illustrated in FIG. 8 to each other.

The keyboard 511 serves as an input device (for example, the input device 12) provided with a plurality of keys used for, for example, inputting characters, numerical values, and various instructions. The pointing device 512 serves as an input device (for example, the input device 12) used for, for example, selecting or executing various instructions, selecting an object to be processed, and moving a cursor being displayed. The DVD-RW drive 514 controls the reading and writing of various data from and to a DVD-RW 513, which serves as a removable storage medium according to the present embodiment. The removable recording medium is not limited to the DVD-RW. For example, the removable recording medium may be a digital versatile disc recordable (DVD-R). The medium I/F 516 controls the reading and writing (storing) of data from and to a recording medium 515 such as a flash memory.

Figure 9:
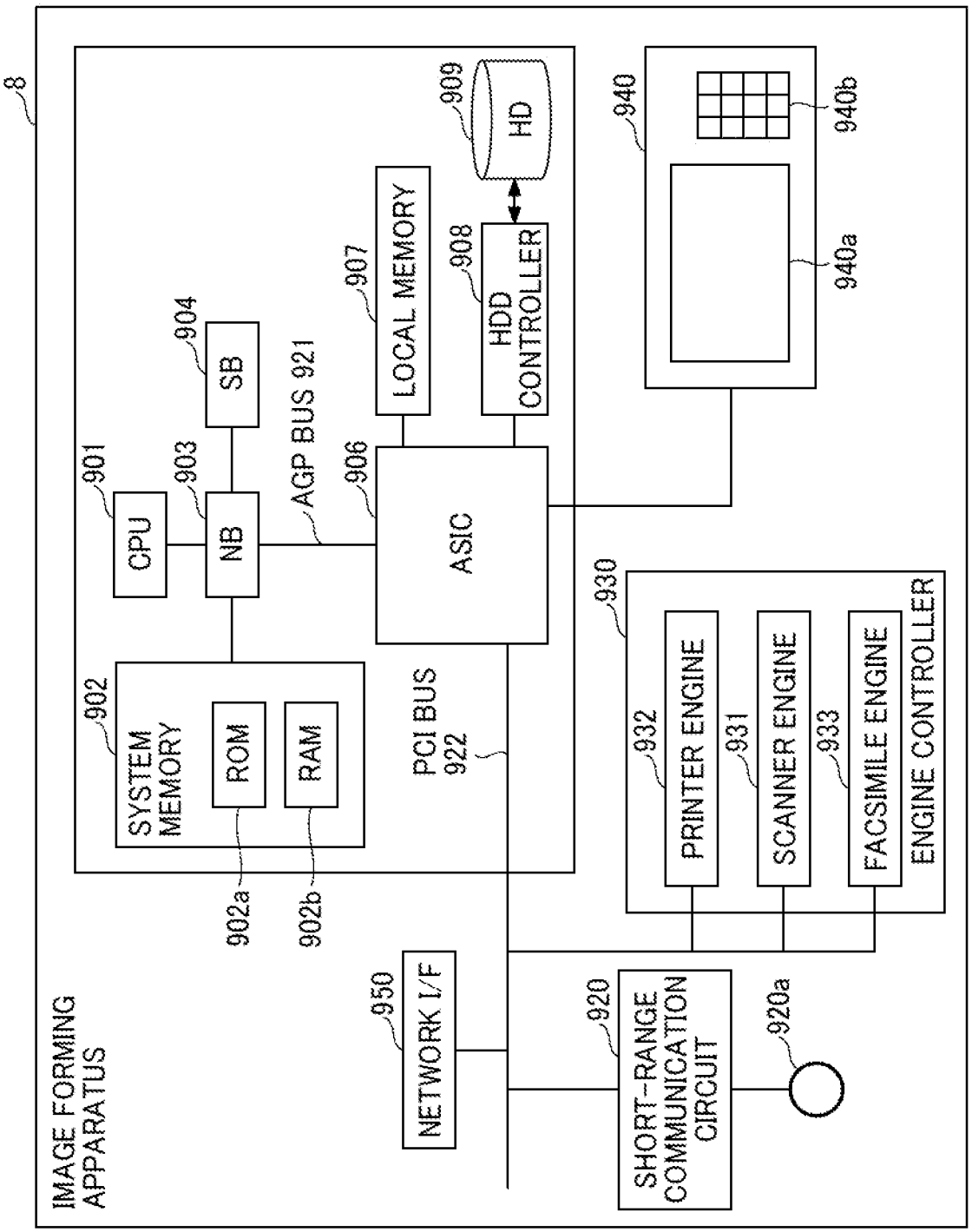
FIG. 9 is a block diagram illustrating a hardware configuration of a control section of an image forming apparatus according to an embodiment of the present disclosure.

FIG. 9 is a block diagram illustrating a hardware configuration of a control section of the image forming apparatus 8 according to an embodiment of the present disclosure.

As illustrated in FIG. 9, the image forming apparatus 8 includes a controller 910, a short-range communication circuit 920, an engine controller 930, an operation panel 940, and a network I/F 950.

The controller 910 includes a CPU 901 as a processor of a computer, a system memory 902, a north bridge (NB) 903, a south bridge (SB) 904, an application-specific integrated circuit (ASIC) 906, a local memory 907 as a storage area, an HDD controller 908, and an HD 909 as a storage area. In the controller 910, the NB 903 and the ASIC 906 are connected via an Accelerated Graphics Port (AGP) bus 921.

The CPU 901 is a processor that controls the entire operation of the image forming apparatus 8. The NB 903 is a bridge that connects the CPU 901 to the system memory 902, the SB 904, and the AGP bus 921. The NB 903 includes a memory controller to control the reading from and writing to the system memory 902, a peripheral component interconnect (PCI) master, and an AGP target.

The system memory 902 includes a ROM 902a and a RAM 902b. The ROM 902a stores programs and data for implementing various functions of the controller 910. The RAM 902b is used to load the programs and the data. The RAM 902b is used as, for example, a drawing memory to store drawing data for printing. The programs stored in the ROM 902a may be stored in any computer-readable recording medium, such as a compact disc read-only memory (CD-ROM), a compact disc-recordable (CD-R), or a digital versatile disc (DVD), in an installable or executable file format and provided as a computer program product.

The SB 904 is a bridge that connects the NB 903 to a PCI device and a peripheral device. The ASIC 906 is an integrated circuit (IC) dedicated to image processing and includes hardware elements for image processing. The ASIC 906 serves as a bridge that connects the AGP bus 921, a PCI bus 922, the HDD controller 908, and the local memory 907 to each other. The ASIC 906 includes a PCI target, an AGP master, an arbiter (ARB) as a central processor of the ASIC 906, a memory controller to control the local memory 907, a plurality of direct memory access controllers (DMACs), and a PCI unit. For example, the DMACs convert coordinates of image data with hardware logic to rotate an image based on the image data. The PCI unit transfers data between a scanner engine 931, a printer engine 932, and a facsimile engine 933 through the PCI bus 922. The ASIC 906 may be configured to connect to a USB interface, the Institute of Electrical and Electronics Engineers 1394 (IEEE 1394) interface, or both.

The local memory 907 is a memory used as a buffer for image data to be copied or a code buffer. The HD 909 is a storage that stores image data, font data for printing, and form data. The HDD controller 908 controls the reading and writing of data from and to the HD 909 under the control of the CPU 901. The AGP bus 921 is a bus interface for a graphics accelerator card, which has been proposed to accelerate graphics processing. The AGP bus 921 directly accesses the system memory 902 with high throughput to accelerate the graphics accelerator card.

The short-range communication circuit 920 is provided with a short-range communication circuit antenna 920a. The short-range communication circuit 920 is a communication circuit in compliance with, for example, the near field communication (NFC) or BLUETOOTH.

The engine controller 930 includes the scanner engine 931, the printer engine 932, and the facsimile engine 933. The operation panel 940 includes a display panel 940a and a hard keypad 940b. The display panel 940a is, for example, a touch panel that displays current settings or a selection screen and receives user input. The hard keypad 940b includes, for example, a numeric keypad and a start key. The numeric keypad receives assigned values of image forming parameters such as an image density parameter. The start key receives an instruction to start copying, for example. The controller 910 controls the entire operation of the image forming apparatus 8. For example, the controller 910 controls, for example, drawing, communication, and input through the operation panel 940. The scanner engine 931 or the printer engine 932 includes an image processor to perform, for example, error diffusion and gamma conversion.

The image forming apparatus 8 may sequentially switch to select a document server function, a copying function, a printing function, and a facsimile communication function by an application switching key of the operation panel 940. When the document server function is selected, an operation mode switches to a document box mode. With the selection of the copying function, the operation mode switches to a copy mode. With the selection of the printing function, the operation mode switches to a printer mode. With the selection of the facsimile communication function, the operation mode switches to a facsimile mode.

The network I/F 950 is an interface for data communication through the communication network N. The short-range communication circuit 920 and the network I/F 950 are electrically connected to the ASIC 906 via the PCI bus 922.

Figure 10:
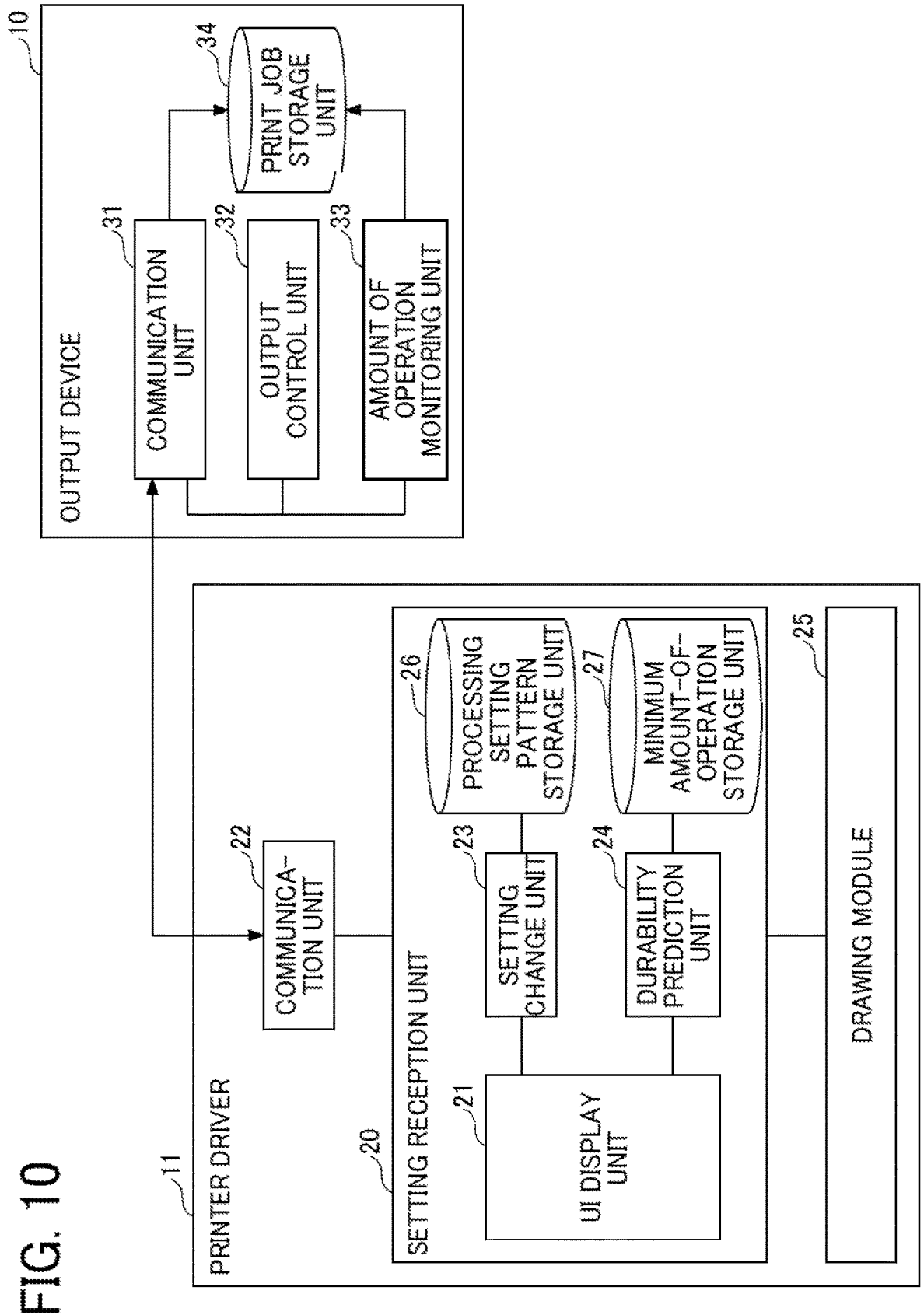
FIG. 10 is a block diagram illustrating functional configurations of a printer driver and an output device, according to an embodiment of the present disclosure.

FIG. 10 is a block diagram illustrating functional configurations of the printer driver 11 and the output device 10 illustrated in FIG. 7, according to an embodiment of the present disclosure.

The printer driver 11 includes a communication unit 22, a setting reception unit 20, and a drawing module 25. These units and module are implemented by the CPU of the controller 14 executing programs stored in the ROM or the HDD of the controller 14.

The setting reception unit 20 performs the functions of a UI display unit 21, a setting change unit 23, a durability prediction unit 24, a processing setting pattern storage unit 26, and a minimum amount-of-operation storage unit 27, which are implemented by the CPU executing programs. The UI display unit 21 displays, for example, a print setting screen on the display device 13 of the communication terminal 30, and receives the changes in the print setting operated by the operator through the print setting screen. In the present embodiment, the UI display unit 21 receives a setting of a "stapler operation minimum mode" to be described later.

When the setting change unit 23 is notified by the UI display unit 21 that the setting of the "stapler operation minimum mode" is turned on, the setting change unit 23 changes the print setting based on the processing setting pattern, which is associated with the print setting, stored in the processing setting pattern storage unit 26. The processing setting pattern is a setting for controlling image processing such as the determination of the orientation of the front face of a sheet and the rotation of image data so that the moving range of the stapler 263 is minimized. Accordingly, the load on the stapler 263 is minimized as well. The term "minimum" is not strictly used in the present embodiment. The term "minimum" can be used for an operation in which the load on the stapler 263 is controlled to be less than the load on the stapler 263 in the output device 10 based on the normal setting in the actual operation. The term "the setting is turned on" indicates a setting in which the "stapler operation minimum mode" is performed according to the present embodiment. In other words, the term "the setting is turned on" may be referred to in various ways, such as "the setting is not set to be turned off," "the setting is valid (or is not invalid)," or "the setting to execute is selected (the setting not to execute is not selected)."

The durability prediction unit 24 predicts the durability based on the actual amount of operation of the stapler 263 acquired from the output device 10 and a minimum amount of operation set in advance. For this reason, the durability prediction unit 24 refers to the minimum amount-of-operation storage unit 27. The durability prediction unit 24, for example, determines whether the current amount of operation approaches a reference amount of operation for replacement, or compares the actual amount of operation of the stapler 263 with the amount of operation in the case where the setting of the "stapler operation minimum mode" is to be turned on.

The drawing module 25 draws the print data based on the print setting. Since this is a known technique, a detailed description thereof is omitted.

The communication unit 22 transmits a print setting (including a processing setting pattern) that the setting reception unit 20 receives and the setting change unit 23 changes and a print job (i.e., the image data drawn by the drawing module) to the output device 10. The communication unit 22 serves as a first communication device.

FIGS. 11A and 11B are diagrams each illustrating a table of processing setting patterns stored in the processing setting pattern storage unit 26, according to an embodiment of the present disclosure.

A process setting pattern is a part of a print setting that allows the load on the stapler 263 to be minimized. The processing setting pattern is associated with a print setting relating to the stapler 263. In other words, the processing setting pattern is also a part of the print setting. As illustrated in FIG. 11, as parts of the print setting that affect the amount of operation of the stapler 263, the sheet feeding direction, single-sided printing or double-sided printing (whether an image is printed on a single face or both faces of a sheet), the staple position (an upper left or an upper right), and the binding direction of the stapler 263 (long-edge binding or short-edge binding) are considered. The processing setting patterns associated with the individual print settings are processing setting patterns that allow the amount of operation of the stapler 263 to be minimized. The process setting pattern is a pattern of a print setting in which the amount of operation of the stapler 263 is reduced when the setting of the "stapler operation minimum mode" is turned on in the print condition, compared with a case where the setting of the "stapler operation minimum mode" is turned off. This is the case where the setting is not set. A detail of the processing setting pattern will be described later.

The sheet feeding direction refers to the landscape direction (long-edge feed (LEF)) and the portrait direction (short-edge feed (SEF)). In the present embodiment, the sheet feeding direction means a direction of image data based on which an image is printed in each sheet feeding direction (the orientation of the image printed based on the image data).

FIG. 12 is a diagram illustrating a table of minimum amounts of operation stored in the minimum amount-of-operation storage unit 27 according to an embodiment of the present disclosure.

The minimum amount of operation is an amount of operation when the stapling is executed in a certain print setting regarding the stapler 263 under the setting of the "stapler operation minimum mode" being turned on. In other words, the minimum amount of operation is an amount of operation when the stapling is executed according to the processing setting pattern that allows the decrease in durability of the stapler to be minimized, as in the present embodiment. Accordingly, the minimum amount of operation may be measured or estimated in advance by the person in charge and stored in the minimum amount-of-operation storage unit 27.

Referring back to FIG. 10, the description continues. The output device 10 includes a communication unit 31, an output control unit 32, an amount of operation monitoring unit 33, and a print job storage unit 34. These functional units that the output device 10 has are functions implemented by the CPU 901 illustrated in FIG. 9 executing instructions included in one or more programs installed on the output device 10 in cooperation with the operations and the control performed by the hardware components illustrated in FIG. 9. The print job storage unit 34 is implemented by, for example, the HD 909 or the RAM 902b illustrated in FIG. 9.

The communication unit 31 receives a print request with the designation of the print setting and the print job from the communication terminal 30, and stores the print setting and the print job in the print job storage unit 34. The communication unit 31 serves as a second communication device. The communication unit 31 associates the print job with, for example, a job identification (ID) and a date and time. The job ID is the identification information of the job.

The output control unit 32 performs the print jobs stored in the print job storage unit 34 in the order in which the print jobs are stored (in the order in which the print jobs are registered). In other words, the output control unit 32 controls the output of image data based on the processing setting pattern and the output condition that are changed by the printer driver 11. The output control unit 32 performs the print job in the print setting that allows the decrease in durability of the stapler 263 to be minimized. The print job refers to the printing of image data and stapling where printed matters are bound.

The amount of operation monitoring unit 33 monitors the amount of operation of the stapler 263. The amount of operation refers to at least one of the number of times of stapling and the amount of movement of the stapler 263. The amount of movement of the stapler 263 is the amount by which the stapler 263 is driven along the timing belt 272 by the stapler moving motor 271. The amount of movement may be an actual measurement value or an amount driven by the stapler moving motor 271.

The number of times of stapling is the sum of the number of binding positions in each print job. In the present embodiment, since stapling involves movement of the stapler 263, only the number of times of stapling is considered as the amount of operation in the description. In other words, the amount of operation may be at least one of the number of times of stapling and the amount of movement of the stapler 263.

The amount of operation monitoring unit 33 may weigh the number of times of stapling thin sheets or a small number of sheets and the number of times of stapling thick sheets or a large number of sheets to calculate the amount of operation. The amount of operation monitoring unit 33 may weigh the number of times of the execution of the stapling (the number of times of stapling) by 1.2 times to calculate the amount of operation when the stapler 263 staple thick sheets that causes a greater mechanical load on the stapler 263 compared to, for example, thin sheets. In other words, when the stapling is executed under a condition that a mechanical load on the stapler 263 is large, the amount of operation monitoring unit 33 calculates the amount of operation by multiplying the actual number of times of stapling by a weighting coefficient exceeding one. The amount of operation monitoring unit 33 stores the amount of operation in association with the print job.

FIG. 13 is a diagram illustrating a table of print job information stored in the print job storage unit 34 according to an embodiment of the present disclosure.

With reference to FIG. 13, the print setting related to the stapler 263 is described, and other information is omitted. As illustrated in FIG. 13, the print job information includes, as data items, a file name, a date and time, a print setting, and an amount of operation of a stapler (stapler amount of operation), which are associated with a job ID. In the data item of the print setting, parts of the print setting associated with the processing setting pattern are indicated among all parts of the print setting set by the operator. In the data item of the amount of operation of a stapler, the amount of operation of the stapler 263 monitored by the amount of operation monitoring unit 33 is indicated. The amount of operation in the table may be, for example, the amount of movement of the stapler, the number of times of stapling, or the amount of movement of the stapler weighted by the number of times of stapling.

FIG. 14 is a diagram illustrating a print setting screen 300 displayed by the printer driver 11 according to an embodiment of the present disclosure.

The print setting screen 300 includes various settings related to printing. With reference to FIG. 14, primary items of a print setting are described. The print setting screen 300 includes a staple setting field 302. When the staple setting field 302 is set to "ON," the stapling is set for the print job. When the stapling is set to "ON", the operator can designate the staple position and the binding direction.

When the staple setting field 302 is set to "ON", the operator can set a check box 303 for the "stapler operation minimum mode." Before the staple setting field 302 is set to "ON", the check box 303 for the "stapler operation minimum mode" is not displayed or is grayed out. When the check box 303 is checked, the setting of the "stapler operation minimum mode" is turned on.

In FIG. 14, a document orientation 301 is a print setting that can be changed depending on a processing setting pattern. In this way, the print setting (document orientation 301, 180 degree rotation, front face up) that can be changed depending on the processing setting pattern is grayed out (a mode in which the setting of the output condition cannot be received) so as not to be set, for example, by the operator when the setting of the "stapler operation minimum mode" is turned on. It is assumed that the print setting that the operator can change in the processing setting pattern is already set. In this case, when the setting of the "stapler operation minimum mode" is turned on, the printer driver 11 disregards the print setting set by the operator.

Figure 15:
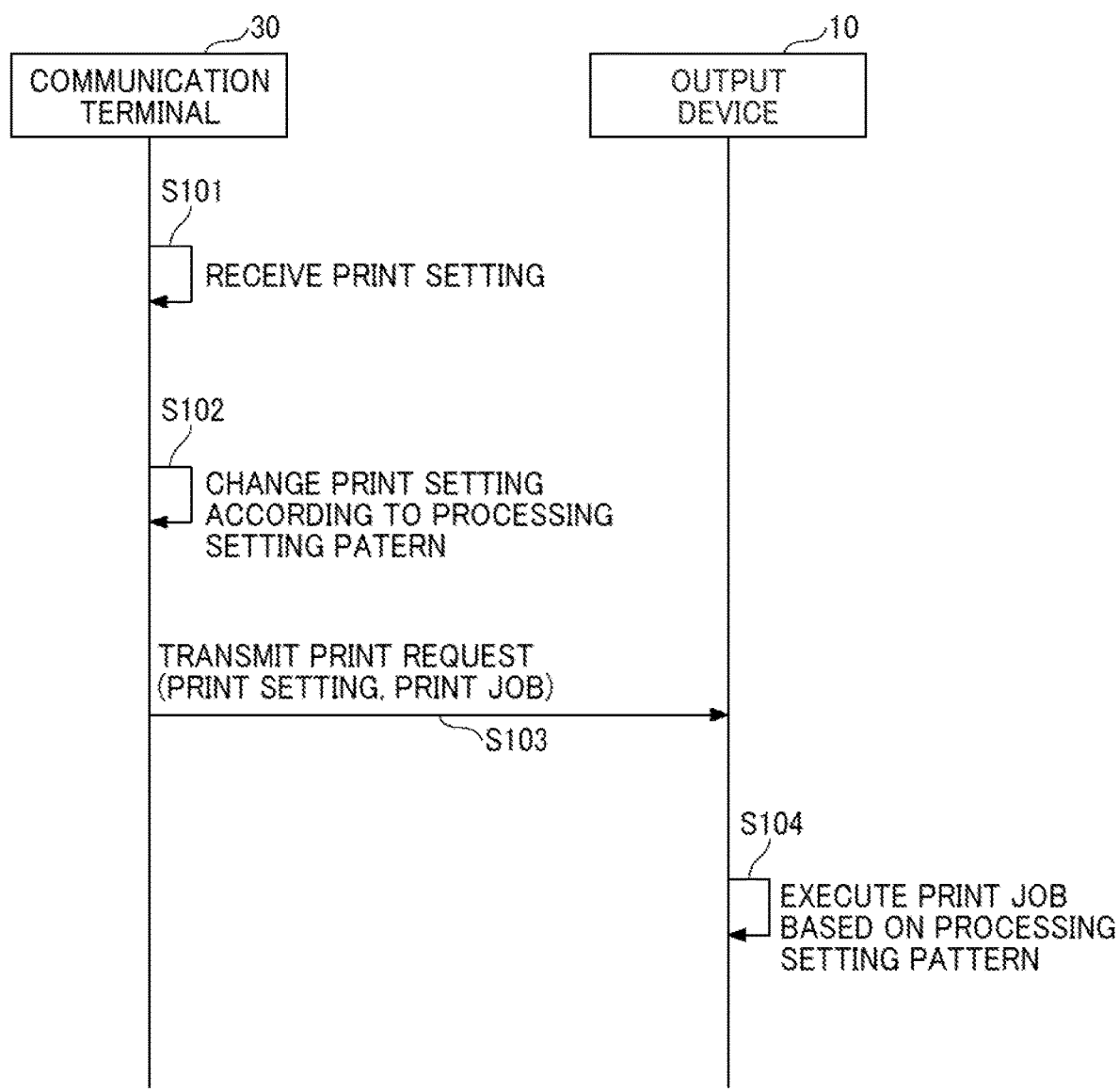
FIG. 15 is a sequence chart illustrating the processing of a print job performed by a communication terminal and an output device communicating with each other, according to an embodiment of the present disclosure.

FIG. 15 is a sequence chart illustrating the processing of a print job performed by the communication terminal 30 and the output device 10 communicating with each other, according to an embodiment of the present disclosure.

S101: The operator configures a print setting on the print setting screen 300. The setting reception unit 20 receives the print setting.

S102: The staple setting field 302 is set to "ON", and the check box 303 for the "stapler operation minimum mode" is checked. In this case, the setting change unit 23 changes parts of the print setting according to the processing setting pattern associated with the print setting in the processing setting pattern storage unit 26.

S103: The communication unit 22 transmits a print request together with the print setting and the print job to the output device 10.

S104: The communication unit 31 of the output device 10 receives the print request together with the print setting and the print job, and stores the print setting and the print job in the print job storage unit 34. The output control unit 32 controls the output of image data or performs the print job based on the processing setting pattern and the print setting. In other words, the output control unit 32 prints pieces of image data corresponding to the number of pages of the original document on sheets, and staples the sheets.

The processing of step S102 is described below in detail.

Figure 16:
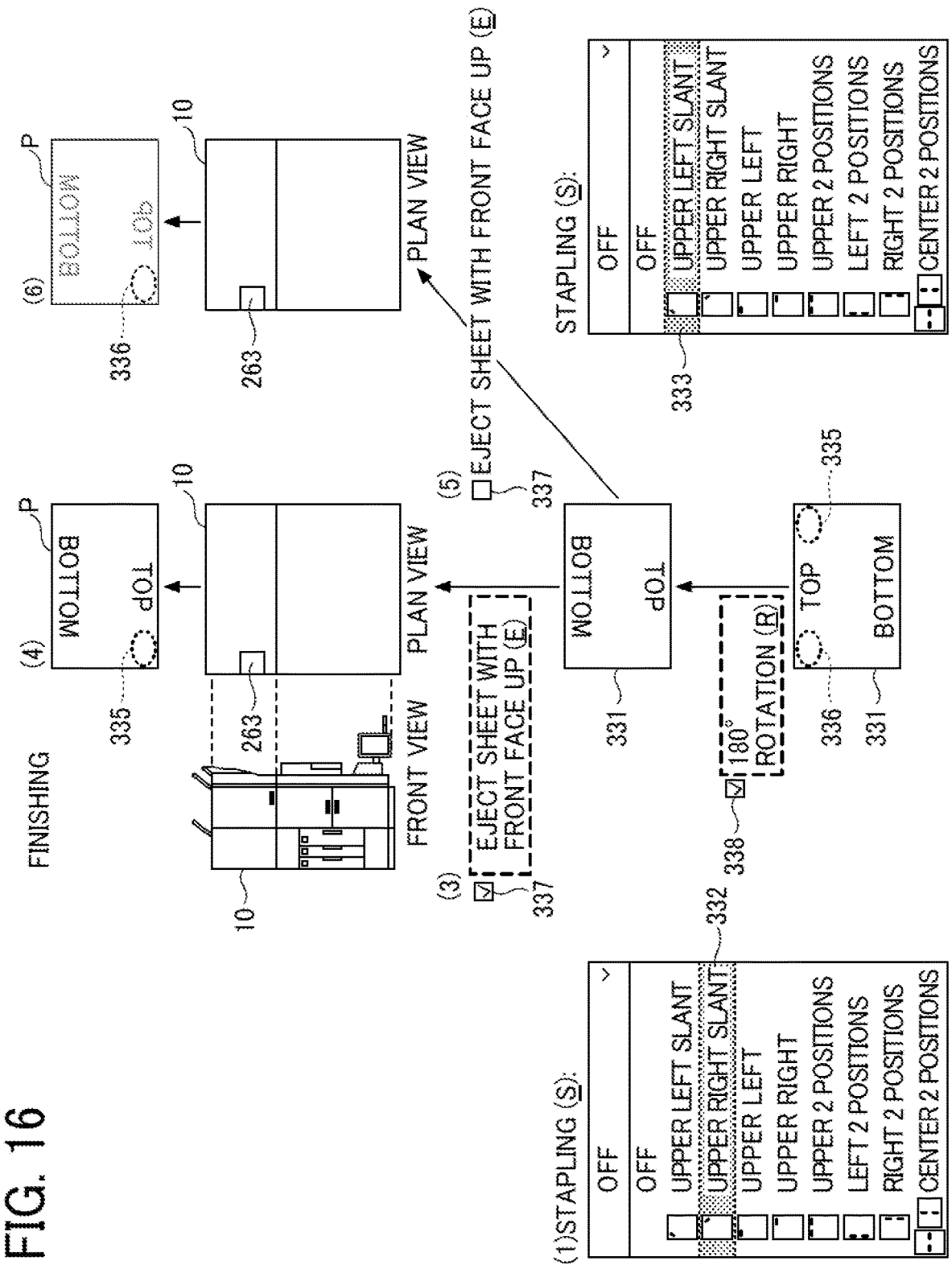
FIG. 16 is a diagram illustrating a processing setting pattern in the case of a long-edge feed of a sheet feeding direction and staple positions at upper right and lower left, according to an embodiment of the present disclosure.

The processing setting pattern is described in detail with reference to FIGS. 16 to 26. FIG. 16 is a diagram illustrating a processing setting pattern in the case of the long-edge feed of the sheet feeding direction and the staple positions at the upper right and at the lower left, according to an embodiment of the present disclosure.

In FIG. 16, the finishing in the case where the staple position is at an upper right 335 or an upper left 336 is described from the bottom to the top. In FIG. 16, a plan view (top view) and a front view of the output device 10 are illustrated to indicate the moving direction of a sheet and the position of the stapler 263. A setting 338 for "180 degree rotation" and a setting 337 for "eject a sheet with the front face up" in, for example, FIG. 16 are parts of a processing setting pattern corresponding to a print setting illustrated in FIG. 11.

A description is given below in the case where the sheet feeding direction is set to the long-edge feed and a setting 332 for the staple position is set to an upper right.

(1) The setting change unit 23 turns on the setting 338 for "180 degree rotation." When the setting 338 for "180 degree rotation" is turned off in the initial setting or by an operation by the operator, the setting is discarded.

(2) Accordingly, the output device 10 rotates image data 331 to be printed on a sheet by 180 degrees.

(3) The setting change unit 23 turns on the setting 337 for "eject a sheet with the front face up." When the setting 337 for "eject a sheet with the front face up" is turned off in the initial setting or by an operation by the operator, the setting is discarded.

(4) The sheet is ejected from the side face of the output device 10.

Since the setting 338 for "180 degree rotation" and the setting 337 for "eject a sheet with the front face up" are turned on, the stapler 263 can execute the stapling at the upper right 335 of the sheet with a small amount of movement. In other words, assuming that the setting 338 for "180 degree rotation" or the setting 337 for "eject a sheet with the front face up" is turned off, since the home position of the stapler 263 is at the left end in the plan view, the amount of movement of the stapler 263 increases by the height of the sheet for the stapler 263 to execute the stapling at the upper right 335 of the sheet.

A description is given below in the case where the sheet feeding direction is set to the long-edge feed and the setting 333 for the staple position is set to an upper left.

(1) The setting change unit 23 turns on the setting 338 for "180 degree rotation." When the setting 338 for "180 degree rotation" is turned off in the initial setting or by an operation by the operator, the setting is discarded.

(2) Accordingly, the output device 10 rotates image data 331 to be printed on a sheet by 180 degrees.

(5) The setting change unit 23 leaves the setting 337 for "eject a sheet with the front face up" to be turned off. When the setting 337 for "eject a sheet with the front face up" is turned on in the initial setting or by an operation by the operator, the setting is discarded.

(6) The sheet is ejected from the side face of the output device 10.

Since the setting 338 for "180 degree rotation" is turned on and the setting 337 for "eject a sheet with the front face up" is turned off, the stapler 263 can staple the sheets at the upper left 336 of the sheets with a small amount of movement. In other words, assuming that the setting 338 for "180 degree rotation" is turned off and the setting 337 for "eject a sheet with the front face up" is turned on, since the home position of the stapler 263 is at the left end in the plan view, the amount of movement of the stapler 263 increases by the height of the sheet for the stapler 263 to execute the stapling at the upper left 336 of the sheet.

In FIG. 16, since the position of the stapler 263 is at the left end in the plan view, the processing setting patterns described above are effective. If the position of the stapler 263 is at the right end of the plan view, the processing setting pattern is set so as to allow the amount of operation to be minimized for the stapler 263 whose position is at the right end of the plan view accordingly. The same applies to the case where the position of the stapler 263 is at another place, such as the center in the plan view.

Figure 17:
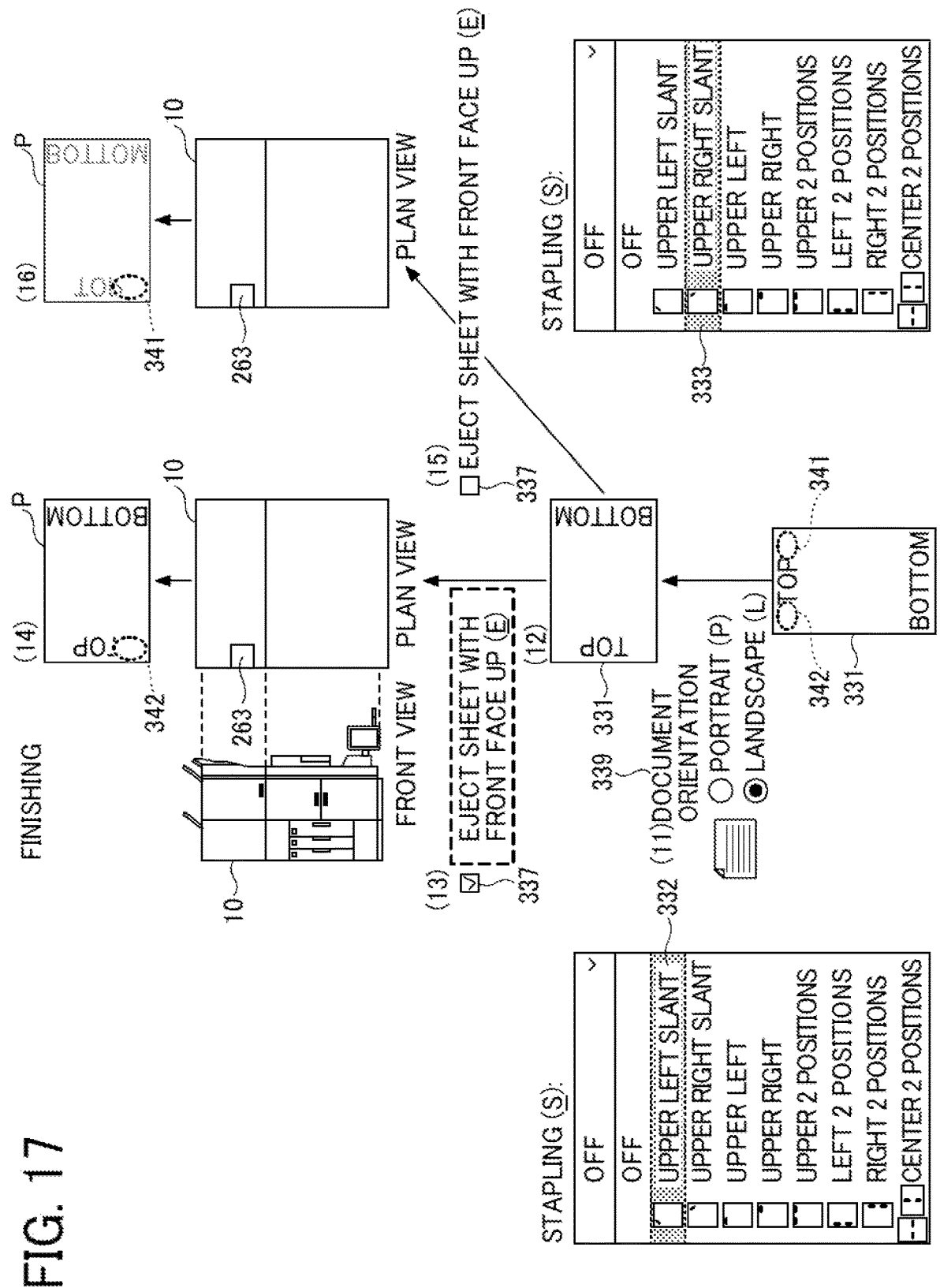
FIG. 17 is a diagram illustrating a processing setting pattern in the case of a short-edge feed of a sheet feeding direction and staple positions at an upper right and at a lower left, according to an embodiment of the present disclosure.

FIG. 17 is a diagram illustrating a processing setting pattern in the case of the short-edge feed of the sheet feeding direction and the staple positions at the upper right and at the lower left, according to an embodiment of the present disclosure.

In FIG. 17, the finishing in the case where the staple position is set to an upper right 341 or an upper left 342 is described from the bottom to the top. In FIG. 17, the plan view (top view) and the front view of the output device 10 are illustrated to indicate the moving direction of a sheet and the position of the stapler 263. Like reference signs are given to elements in FIG. 17 similar to those illustrated in FIG. 16 as those elements operate similarly and provide the same or similar effects, and redundant descriptions may be omitted in the following description.

A description is given below in the case where the sheet feeding direction is set to the short-edge feed and the setting 333 for the staple position is set to an upper left.

(11) The setting change unit 23 sets a setting 339 for "document orientation" to the landscape. When the setting 339 for "document orientation" is set to the portrait in the initial setting or by an operation by the operator, the setting is discarded. The setting 339 for "document orientation" being set to the landscape or the portrait means that the image data is to be rotated by 90 degrees in a predetermined direction (not the processing to rotate the sheet to be fed).

(12) Accordingly, the output device 10 rotates the orientation of the image data by 90 degrees (in the present embodiment, the rotation direction is counterclockwise).

(13) The setting change unit 23 turns on the setting 337 for "eject a sheet with the front face up." When the setting 337 for "eject a sheet with the front face up" is turned off in the initial setting or by an operation by the operator, the setting is discarded.

(14) The sheet is ejected from the side face of the output device 10.

Since the setting 339 for "document orientation" is set to the landscape and the setting 337 for "eject a sheet with the front face up" is turned on, the stapler 263 can execute the stapling at the upper left 342 of the sheet with a small amount of movement.

A description is given below in the case where the sheet feeding direction is set to the short-edge feed and the setting 332 for the staple position is set to an upper right.

(11) The setting change unit 23 sets a setting 339 for "document orientation" to the landscape. When the setting 339 for "document orientation" is set to the portrait in the initial setting or by an operation by the operator, the setting is discarded.

(15) The setting change unit 23 leaves the setting 337 for "eject a sheet with the front face up" to be turned off. When the setting 337 for "eject a sheet with the front face up" is turned on in the initial setting or by an operation by the operator, the setting is discarded.

(16) The sheet is ejected from the side face of the output device 10.

Since the setting 339 for "document orientation" is set to the landscape and the setting 337 for "eject a sheet with the front face up" is turned off, the stapler 263 can execute the stapling at the upper right 341 of the sheet with a small amount of movement.

Figure 18A:
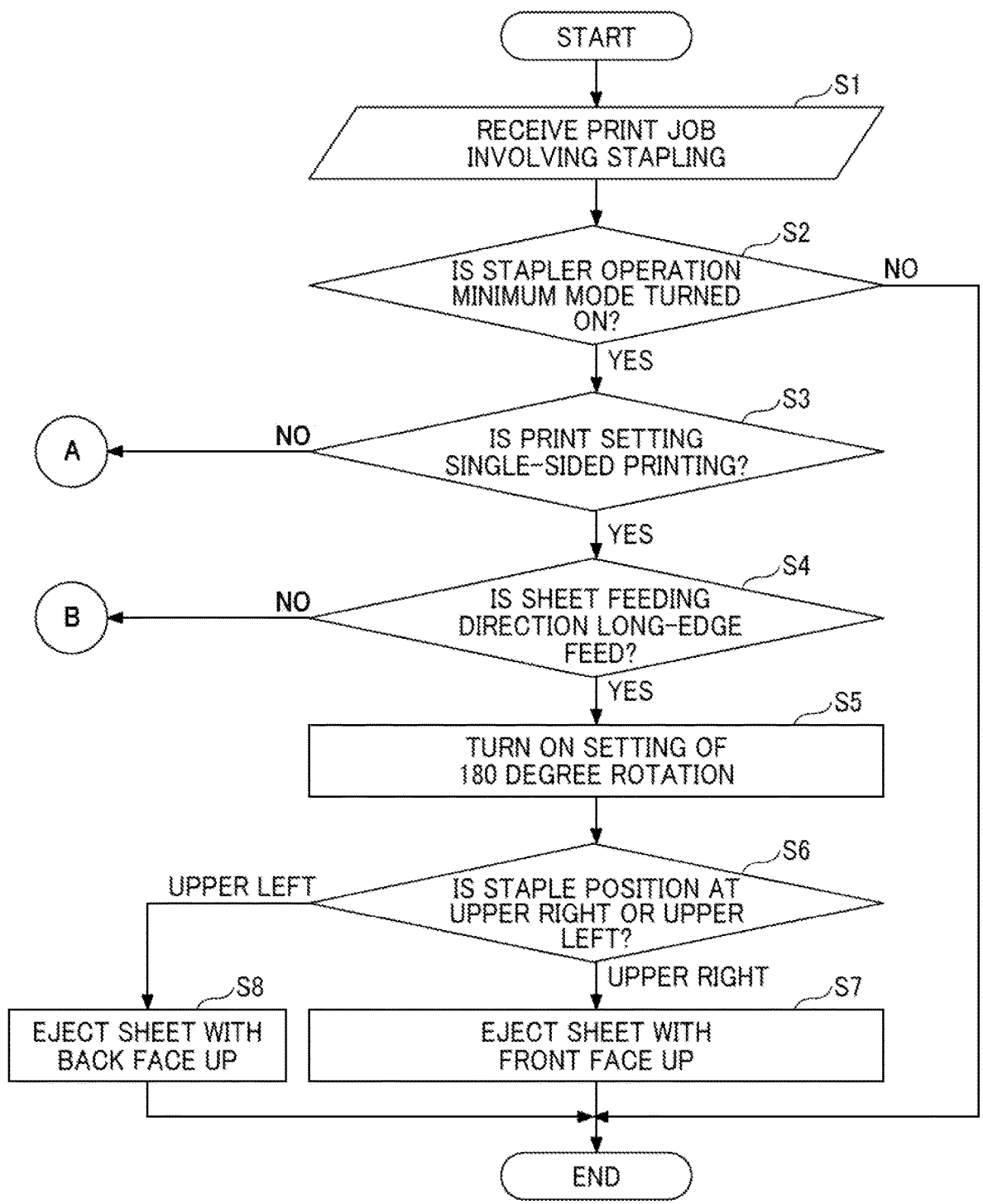
FIG. 18A is a flowchart of the processing in which a setting change unit changes a print setting according to the processing setting pattern of FIG. 16, according to an embodiment of the present disclosure.
Figure 18B:
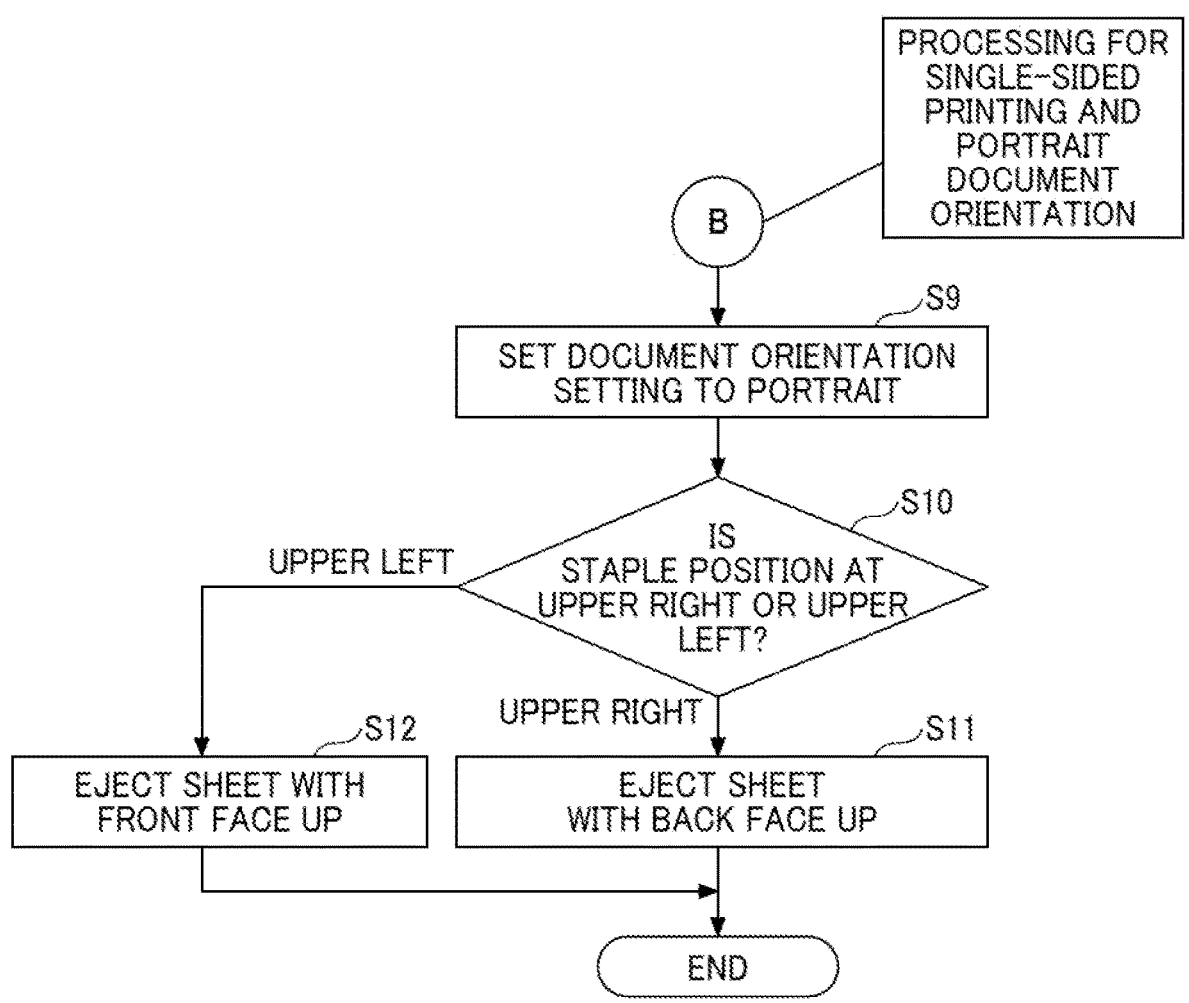
FIG. 18B is a flowchart of the processing in which a setting change unit changes a print setting according to the processing setting pattern of FIG. 17, according to an embodiment of the present disclosure.

FIGS. 18A and 18B are flowcharts of the processing in which the setting change unit 23 changes a print setting according to the processing setting pattern of FIG. 16 or 17, according to an embodiment of the present disclosure.

The setting change unit 23 determines a processing setting pattern associated with a print setting stored in the processing setting pattern storage unit 26 as follows.

First, the processing is described below with reference to FIG. 18A. The setting reception unit 20 receives an input of a print job that involves the execution of the stapling (S1).

The setting change unit 23 determines whether the setting of the "stapler operation minimum mode" is turned on by the operator (S2).

When the result of the determination in step S2 is Yes, the setting change unit 23 determines whether the print setting is set to the single-sided printing (S3). When the result of the determination in step S3 is No, the processing proceeds to the circle "A" in FIG. 20A.

When the result of the determination in step S3 is Yes, the setting change unit 23 determines whether the sheet feeding direction is set to the long-edge feed (S4). When the result of the determination in step S4 is No, the processing proceeds to the circle "B" in FIG. 18B.

When the result of the determination in step S4 is Yes, the setting change unit 23 turns on the setting 338 for "180 degree rotation" (S5).

The setting change unit 23 determines whether the staple position is set to an upper right or an upper left (S6). When the staple position is set to the upper right, the setting change unit 23 turns on the setting 337 for "eject a sheet with the front face up" (S7).

When the staple position is set to the upper left, the setting change unit 23 turns off the setting 337 for "eject a sheet with the front face up" (S8).

The processing in the case where the print setting is the single-sided printing and the short-edge feed of the sheet feeding direction is described below with reference to FIG. 18B.

First, the setting change unit 23 sets the setting 339 for "document orientation" to the landscape (S9).

The setting change unit 23 determines whether the staple position is set to an upper right or an upper left (S10). When the staple position is set to the upper right, the setting change unit 23 turns off the setting 337 for "eject a sheet with the front face up" (S11).

When the staple position is set to the upper left, the setting change unit 23 turns on the setting 337 for "eject a sheet with the front face up" (S12).

Figure 19A:
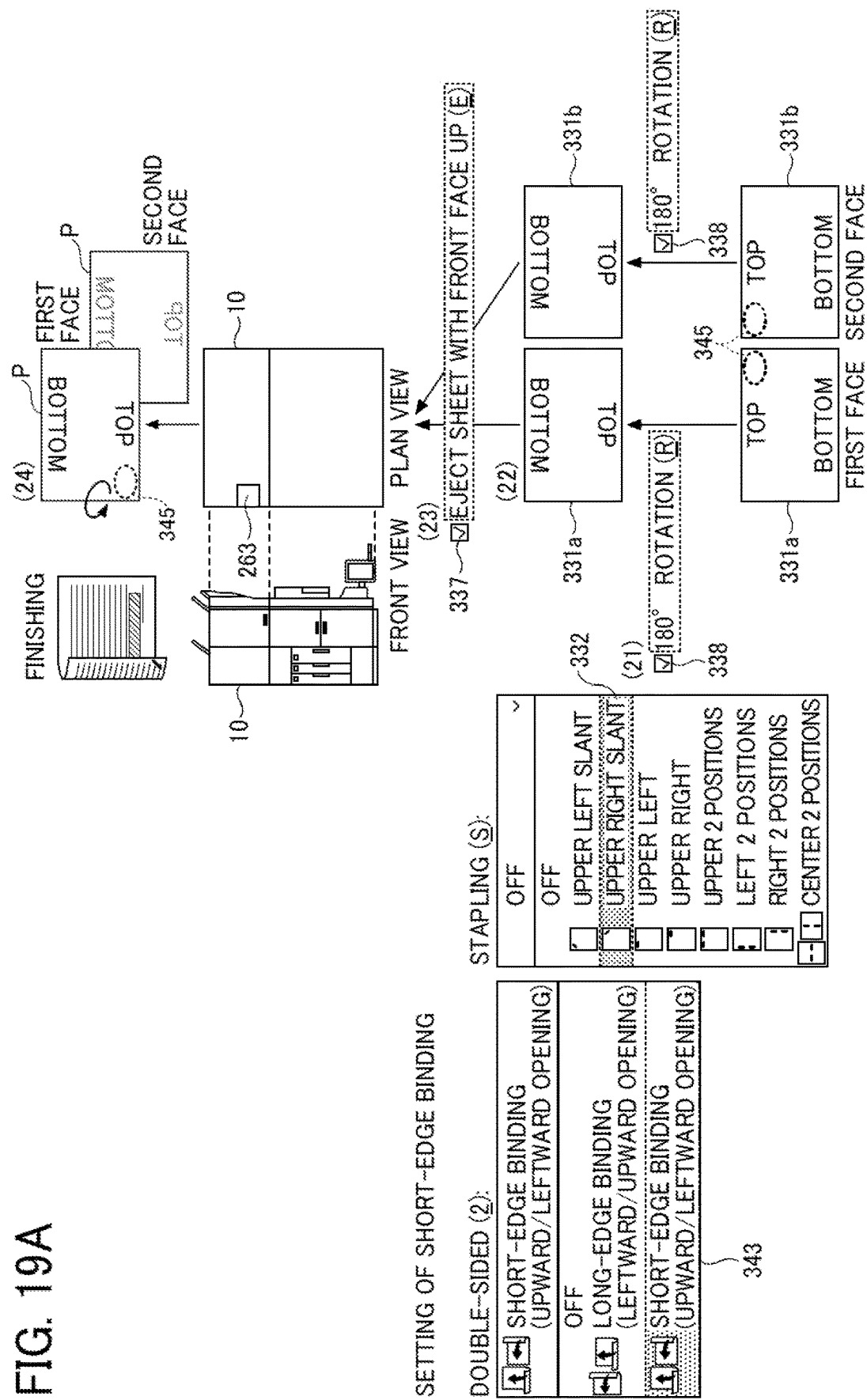
FIG. 19A is a diagram illustrating a processing setting pattern in the case of a long-edge feed of a sheet feeding direction, double-sided printing, a staple position at an upper right, and short-edge biding, according to an embodiment of the present disclosure.
Figure 19B:
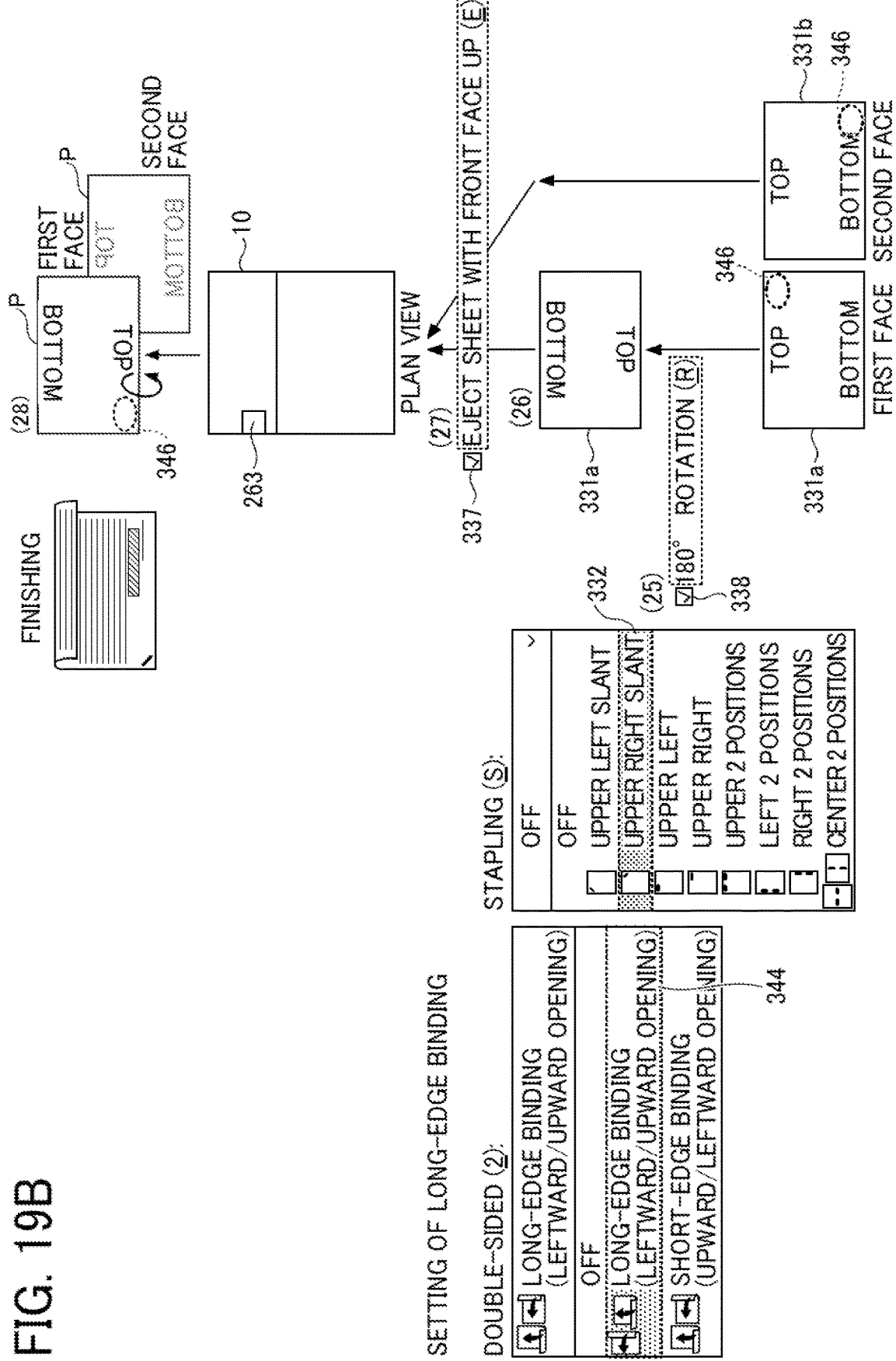
FIG. 19B is a diagram illustrating a processing setting pattern in the case of a long-edge feed of a sheet feeding direction, double-sided printing, a staple position at an upper right, and long-edge biding, according to an embodiment of the present disclosure.

FIGS. 19A and 19B are diagrams each illustrating a processing setting pattern in the case of the long-edge feed of the sheet feeding direction, double-sided printing, the staple position at the upper right, and the short-edge biding or the long-edge biding, according to an embodiment of the present disclosure.

An upper right 345 in FIG. 19A in the case of the short-edge binding and an upper right 346 in FIG. 19B in the case of the long-edge binding are at the upper right when the "top and bottom" of the first face of the image data to be printed is viewed from the front.

A description is given below in the case of the long-edge feed of the sheet feeding direction, the double-sided printing, the setting 332 for the staple position set to an upper right, and a short-edge binding 343.

(21) The setting change unit 23 turns on the setting 338 for "180 degree rotation" for an image data 331*a* of the first face and an image data 331*b* of the second face. When the setting 338 for "180 degree rotation" is turned off in the initial setting or by an operation by the operator, the setting is discarded.

(22) Accordingly, the output device 10 rotates each piece of image data of both faces to be printed on a sheet by 180 degrees.

(23) The setting change unit 23 turns on the setting 337 for "eject a sheet with the front face up." When the setting 337 for "eject a sheet with the front face up" is turned off in the initial setting or by an operation by the operator, the setting is discarded.

(24) The sheet is ejected from the side face of the output device 10.

Since the "top and bottom" of the first face and the "top and bottom" of the second face are in the same orientation, the sheet is prepared for the short-edge binding. Since the setting 338 for "180 degree rotation" is turned on for both face and the setting 337 for "eject a sheet with the front face up" is turned on, the stapler 263 can execute the stapling at the upper right 345 of the sheet with a small amount of movement.

A description is given below in the case of the long-edge feed of the sheet feeding direction, the double-sided printing, the setting 332 for the staple position set to an upper right, and a long-edge binding 344.

(25) The setting change unit 23 turns on the setting 338 for "180 degree rotation" only for the image data 331a of the first face. When the setting 338 for "180 degree rotation" is turned off in the initial setting or by an operation by the operator, the setting is discarded.

(26) Accordingly, the output device 10 rotates the image data 331a of the first face to be printed on a sheet by 180 degrees and does not rotate the image data 331b of the second face.

(27) The setting change unit 23 turns on the setting 337 for "eject a sheet with the front face up." When the setting 337 for "eject a sheet with the front face up" is turned off in the initial setting or by an operation by the operator, the setting is discarded.

(28) The sheet is ejected from the side face of the output device 10.

Since the "top and bottom" of the first face and the "top and bottom" of the second face are reversed in the vertical direction, the sheet is prepared for the long-edge binding. Since the setting 338 for "180 degree rotation" is turned on only for a single face and the setting 337 for "eject a sheet with the front face up" is turned on, the stapler 263 can execute the stapling at the upper right 346 of the sheet with a small amount of movement.

Figure 20A:
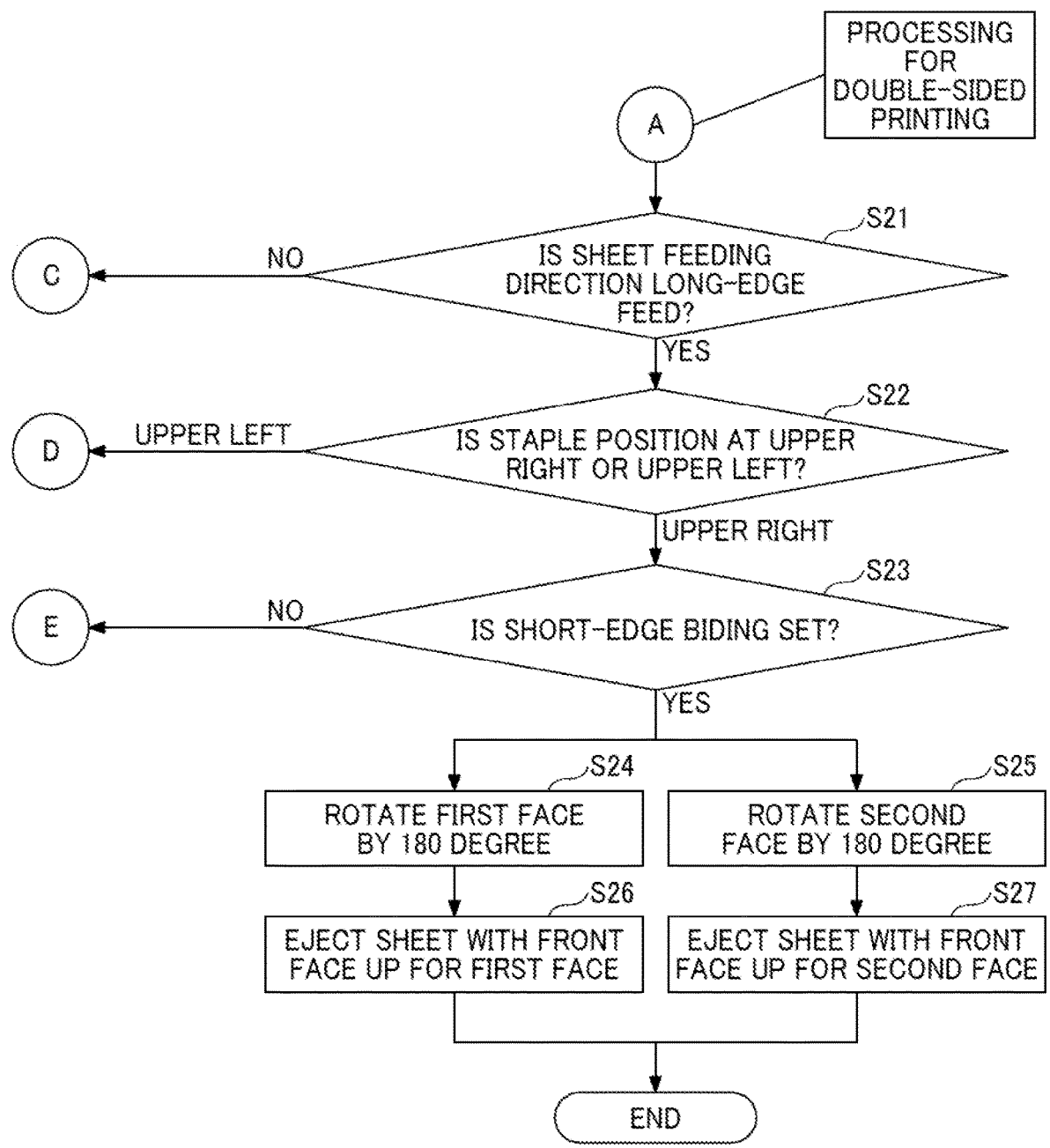
FIG. 20A is a flowchart of the processing in which a setting change unit changes a print setting according to the processing setting pattern of FIG. 19A, according to an embodiment of the present disclosure.

FIG. 20A is a flowchart of the processing in which the setting change unit 23 changes a print setting according to the processing setting pattern of FIG. 19A, according to an embodiment of the present disclosure.

First, subsequent to the result of the determination of "No" in step S3 in FIG. 18A, the setting reception unit 20 determines whether the sheet feeding direction is set to the long-edge feed (S21). In the case of the short-edge feed, the processing proceeds to the circle "C" in FIG. 24A.

In the case of the long-edge feed, the setting change unit 23 determines whether the staple position is set to an upper right or an upper left (S22). When the staple position is set to the upper left, the process proceeds to the circle "D" in FIG. 22A.

When the staple position is set to the upper right, the setting change unit 23 determines whether the short-edge binding is set (S23). In the case of the long-edge binding, the processing proceeds to the circle "E" in FIG. 20B.

In the case of the short-edge binding, the setting change unit 23 turns on the setting 338 for "180 degree rotation" for the first face and the second face (S24 and S25).

The setting change unit 23 turns on the setting 337 for "eject a sheet with the front face up" (S26 and S27). Since the setting 337 for "eject a sheet with the front face up" is a setting for one sheet, the settings for the first face and the second face are common.

The processing is described below with reference to FIG. 20B.

Figure 20B:
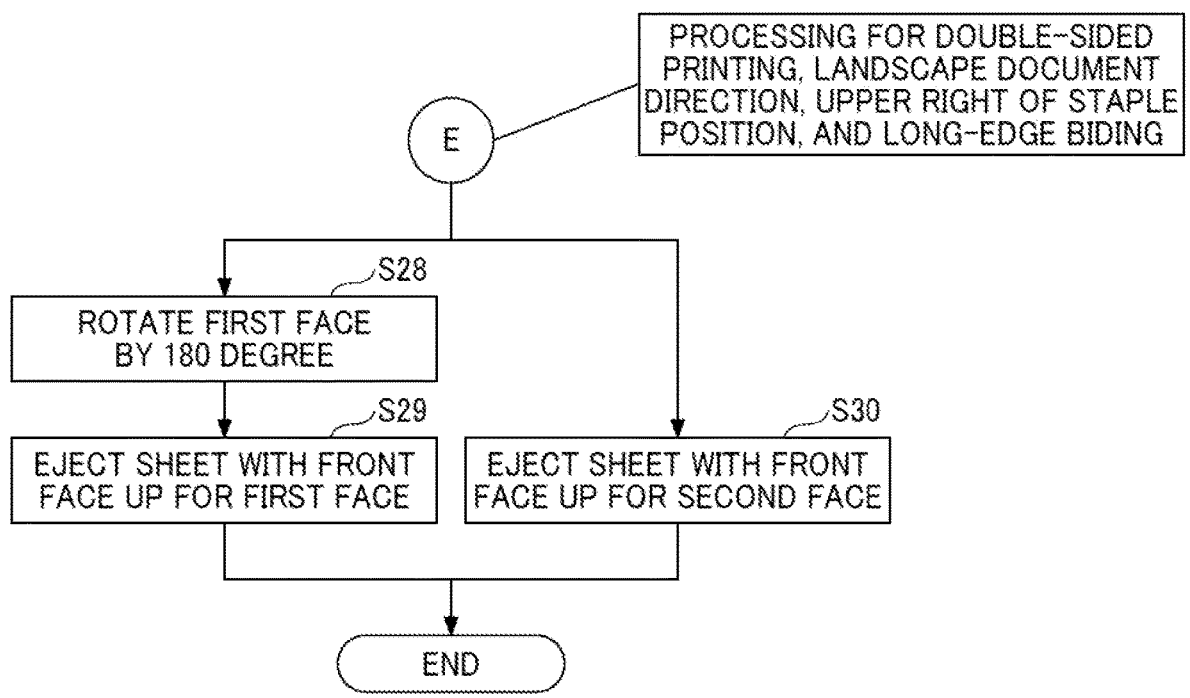
FIG. 20B is a flowchart of the processing in which a setting change unit changes a print setting according to the processing setting pattern of FIG. 19B, according to an embodiment of the present disclosure.

FIG. 20B is a flowchart of the processing in which the setting change unit 23 changes a print setting according to the processing setting pattern of FIG. 19B, according to an embodiment of the present disclosure.

The processing in the case where the print setting is set to the double-sided printing, the sheet feeding direction is set to the long-edge feed, the staple position is set to an upper right, and the long-edge binding is set is described below with reference to FIG. 20B.

The setting change unit 23 turns on the setting 338 for "180 degree rotation" only for the first face (S28).

The setting change unit 23 turns on the setting 337 for "eject a sheet with the front face up" (S29 and S30).

FIGS. 21A and 21B are diagrams each illustrating a processing setting pattern in the case of the long-edge feed of the sheet feeding direction, double-sided printing, the staple position at the upper left, and the short-edge biding or the long-edge binding, according to an embodiment of the present disclosure.

An upper left 347 in FIG. 21A in the case of the short-edge binding and an upper left 348 in FIG. 21B in the case of the long-edge binding are at the upper right when the "top and bottom" of the first face of the image data to be printed is viewed from the front.

A description is given below in the case of the long-edge feed of the sheet feeding direction, the double-sided printing, the setting 333 for the staple position set to an upper left, and the short-edge binding 343.

(31) The setting change unit 23 turns on the setting 338 for "180 degree rotation" for the image data 331a of the first face and the image data 331b of the second face. When the setting 338 for "180 degree rotation" is turned off in the initial setting or by an operation by the operator, the setting is discarded.

(32) Accordingly, the output device 10 rotates each piece of image data of both faces to be printed on a sheet by 180 degrees.

(33) The setting change unit 23 leaves the setting 337 for "eject a sheet with the front face up" to be turned off. When the setting 337 for "eject a sheet with the front face up" is turned on in the initial setting or by an operation by the operator, the setting is discarded.

(34) The sheet is ejected from the side face of the output device 10.

Since the "top and bottom" of the first face and the "top and bottom" of the second face are in the same orientation, the sheet is prepared for the short-edge binding. Since the setting 338 for "180 degree rotation" is turned on for both faces and the setting 337 for "eject a sheet with the front face up" is turned off, the stapler 263 can execute the stapling at the upper left 347 of the sheet with a small amount of movement. In FIG. 21A, the first face faces downward.

A description is given below in the case of the long-edge feed of the sheet feeding direction, the double-sided printing, the setting 333 for the staple position set to an upper left, and the long-edge binding 344.

(35) The setting change unit 23 turns on the setting 338 for "180 degree rotation" only for the image data 331a of the first face. When the setting 338 for "180 degree rotation" is turned off in the initial setting or by an operation by the operator, the setting is discarded.

(36) Accordingly, the output device 10 rotates only the image data 331a of the first face to be printed on a sheet by 180 degrees.

(37) The setting change unit 23 leaves the setting 337 for "eject a sheet with the front face up" to be turned off. When the setting 337 for "eject a sheet with the front face up" is turned on in the initial setting or by an operation by the operator, the setting is discarded.

(38) The sheet is ejected from the side face of the output device 10.

Since the "top and bottom" of the first face and the "top and bottom" of the second face are reversed in the vertical direction, the sheet is prepared for the long-edge binding. Since the setting 338 for "180 degree rotation" is turned on only for a single face and the setting 337 for "eject a sheet with the front face up" is turned off, the stapler 263 can execute the stapling at the upper left 348 of the sheet with a small amount of movement. In FIG. 21B, the first face faces downward.

Figure 22A:
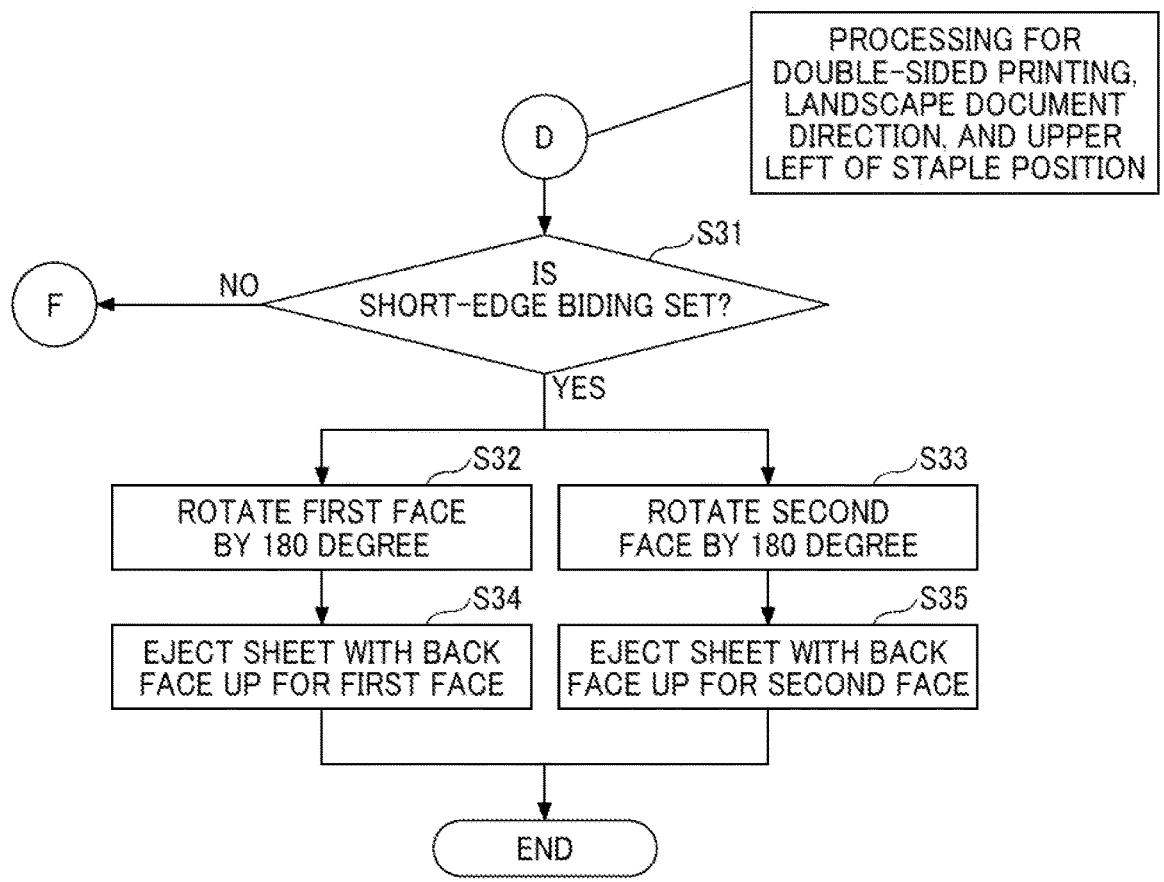
FIG. 22A is a flowchart of the processing in which a setting change unit changes a print setting according to the processing setting pattern of FIG. 21A, according to an embodiment of the present disclosure.

FIG. 22A is a flowchart of the processing in which the setting change unit 23 changes a print setting according to the processing setting pattern of FIG. 21A, according to an embodiment of the present disclosure.

The processing in the case where the print setting is the double-sided printing, the long-edge feed of the sheet feeding direction, and the staple position at an upper left is described below with reference to FIG. 22A.

The setting change unit 23 determines whether the short-edge binding is set (S31). In the case of the long-edge binding, the processing proceeds to the circle "F" in FIG. 22B.

In the case of the short-edge binding, the setting change unit 23 turns on the setting 338 for "180 degree rotation" for the first face and the second face (S32 and S33).

The setting change unit 23 turns off the setting 337 for "eject a sheet with the front face up" (S34 and S35). Accordingly, the sheet is ejected with the first face facing downward.

Figure 22B:
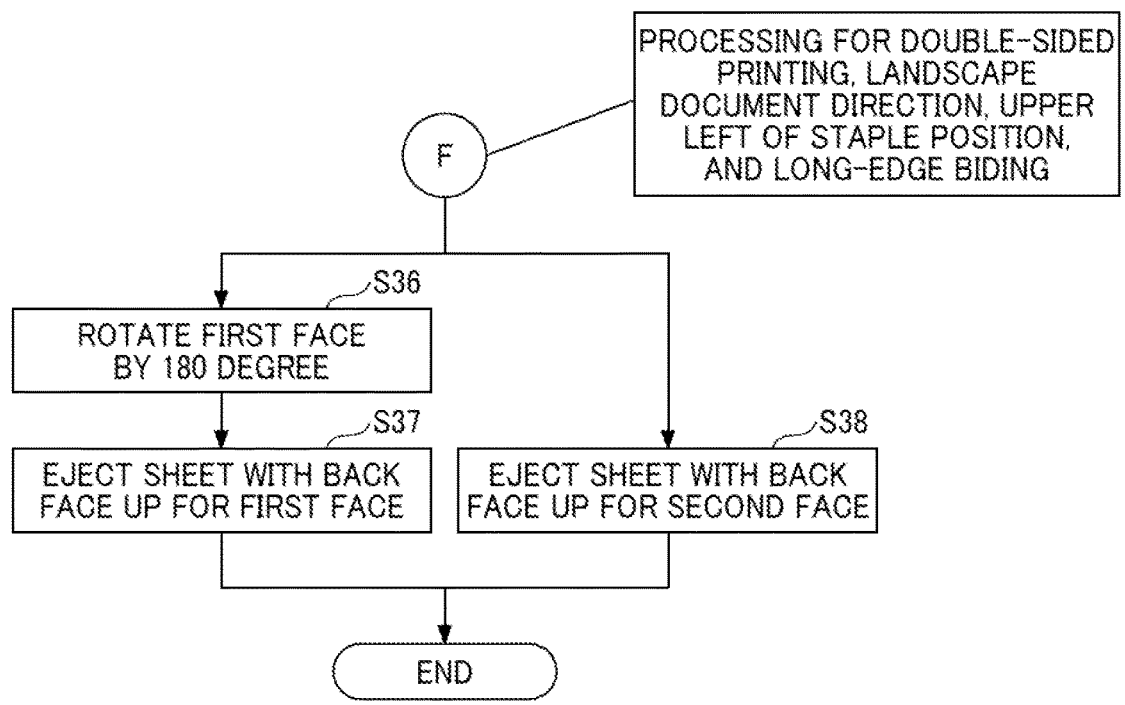
FIG. 22B is a flowchart of the processing in which a setting change unit changes a print setting according to the processing setting pattern of FIG. 21B, according to an embodiment of the present disclosure.

FIG. 22B is a flowchart of the processing in which the setting change unit 23 changes a print setting according to the processing setting pattern of FIG. 21B, according to an embodiment of the present disclosure.

The processing in the case where the print setting is the double-sided printing, the long-edge feed of the sheet feeding direction, the staple position at an upper left, and the long-edge binding is described below with reference to FIG. 22B.

In the case of the long-edge binding, the setting change unit 23 turns on the setting 338 for "180 degree rotation" only for the first face (S36).

The setting change unit 23 turns off the setting 337 for "eject a sheet with the front face up" (S37 and S38). Accordingly, the sheet is ejected with the first face facing downward.

Figure 23A:
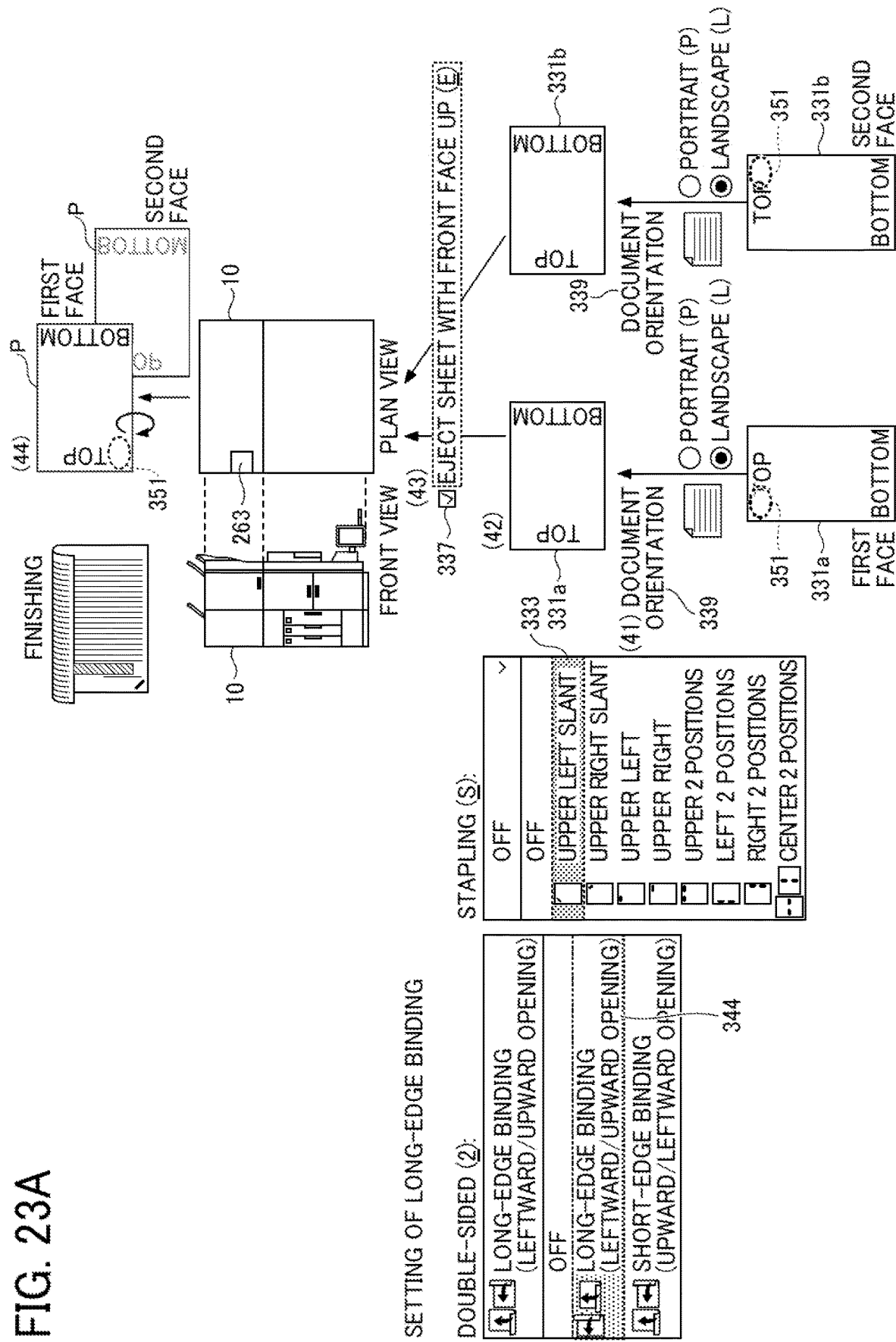
FIG. 23A is a diagram illustrating a processing setting pattern in the case of a short-edge feed of a sheet feeding direction, double-sided printing, a staple position at an upper left, and long-edge biding, according to an embodiment of the present disclosure.
Figure 23B:
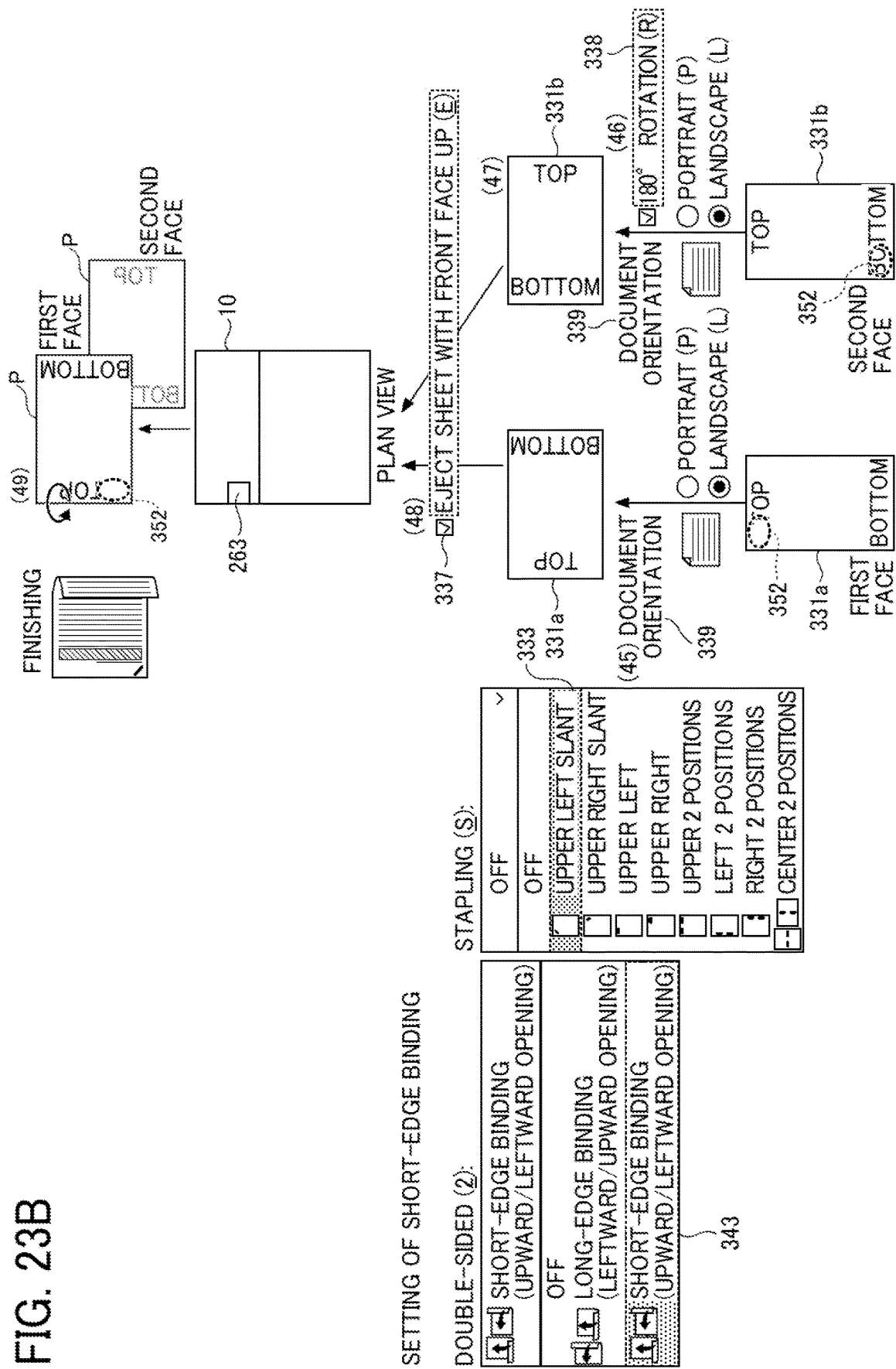
FIG. 23B is a diagram illustrating a processing setting pattern in the case of a short-edge feed of a sheet feeding direction, double-sided printing, a staple position at an upper left, and short-edge biding, according to an embodiment of the present disclosure.

FIGS. 23A and 23B are diagrams each illustrating a processing setting pattern in the case of the short-edge feed of the sheet feeding direction, double-sided printing, the staple position at the upper left, and the short-edge biding or the long-edge binding, according to an embodiment of the present disclosure.

An upper left 351 in FIG. 23A in the case of the long-edge binding and an upper left 352 in FIG. 23B in the case of the short-edge binding are at the upper right when the "top and bottom" of the first face of the image data to be printed is viewed from the front.

A description is given below in the case of the short-edge feed of the sheet feeding direction, the double-sided printing, the setting 333 for the staple position set to an upper left, and the long-edge binding 344.

(41) The setting change unit 23 sets the setting 339 for "document orientation" to the landscape for the image data 331a of the first face and the image data 331b of the second face. When the setting 339 for "document orientation" is set to the portrait in the initial setting or by an operation by the operator, the setting is discarded.

(42) Accordingly, the output device 10 rotates the orientation of each piece of image data by 90 degrees.

(43) The setting change unit 23 turns on the setting 337 for "eject a sheet with the front face up." When the setting 337 for "eject a sheet with the front face up" is turned off in the initial setting or by an operation by the operator, the setting is discarded.

(44) The sheet is ejected from the side face of the output device 10.

Since the "top and bottom" of the first face and the "top and bottom" of the second face are in the same orientation, the sheet is prepared for the long-edge binding. Since the setting 339 for "document orientation" is set to the landscape and the setting 337 for "eject a sheet with the front face up" is turned on, the stapler 263 can execute the stapling at the upper left 351 of the sheet with a small amount of movement.

A description is given below in the case of the short-edge feed of the sheet feeding direction, the double-sided printing, the setting 333 for the staple position set to upper left, and the short-edge binding 343.

(45) The setting change unit 23 sets the setting 339 for "document orientation" to the landscape for the image data 331a of the first face and the image data 331b of the second face. When the setting 339 for "document orientation" is set to the portrait in the initial setting or by an operation by the operator, the setting is discarded.

(46) The setting change unit 23 turns on the setting 338 for "180 degree rotation" only for the image data 331b of the second face. When the setting 338 for "180 degree rotation" is turned off in the initial setting or by an operation by the operator, the setting is discarded.

(47) Accordingly, the output device 10 rotates the orientation of each piece of image data by 90 degrees, and further rotates only the image data 331b of the second face by 180 degrees.

(48) The setting change unit 23 turns on the setting 337 for "eject a sheet with the front face up." When the setting 337 for "eject a sheet with the front face up" is turned off in the initial setting or by an operation by the operator, the setting is discarded.

(49) The sheet is ejected from the side face of the output device 10.

Since the "top and bottom" of the first face and the "top and bottom" of the second face are reversed in the vertical direction, the sheet is prepared for the short-edge binding. Since the setting 339 for "document orientation" is set to the landscape and the setting 338 for "180 degree rotation" is turned on only for the image data 331b of the second face, and the setting 337 for "eject a sheet with the front face up" is turned on, the stapler 263 can execute the stapling at the upper left 352 of the sheet with a small amount of movement.

Figure 24A:
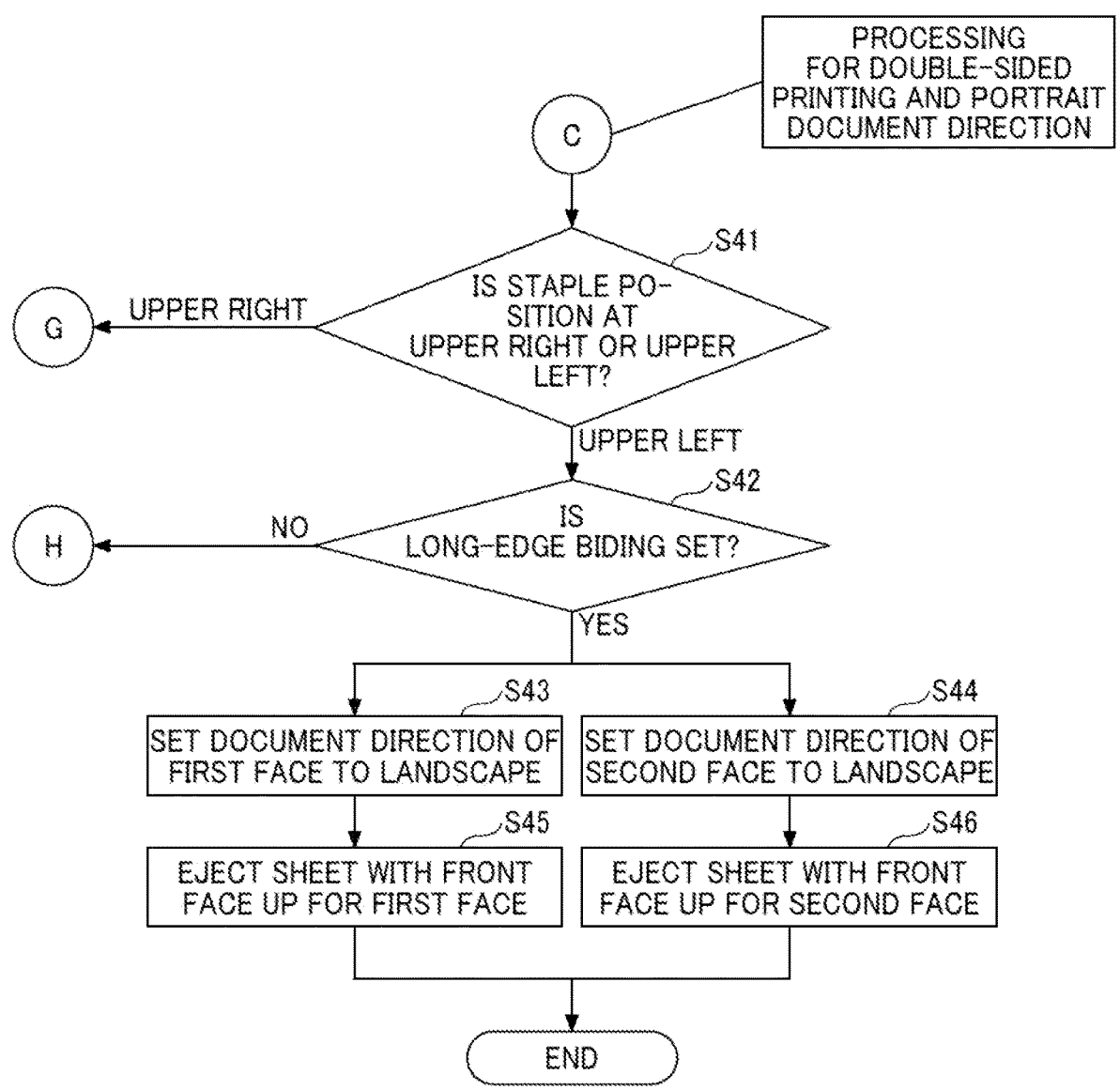
FIG. 24A is a flowchart of the processing in which a setting change unit changes a print setting according to the processing setting pattern of FIG. 23A, according to an embodiment of the present disclosure.

FIG. 24A is a flowchart of the processing in which the setting change unit 23 changes a print setting according to the processing setting pattern of FIG. 23A, according to an embodiment of the present disclosure.

The processing in the case where the print setting is the double-sided printing and the short-edge feed of the sheet feeding direction is described below with reference to FIG. 24A.

The setting change unit 23 determines whether the staple position is set to an upper right or an upper left (S41). When the staple position is set to the upper right, the process proceeds to the circle "G" in FIG. 26A.

When the staple position is set to the upper left, the setting change unit 23 determines whether the long-edge binding is set (S42). In the case of the short-edge binding, the processing proceeds to the circle "H" in FIG. 24B.

In the case of the long-edge binding, the setting change unit 23 sets the setting 339 for "document orientation" to the landscape for the first face and the second face (S43 and S44).

The setting change unit 23 turns on the setting 337 for "eject a sheet with the front face up" (S45 and S46). Accordingly, the sheet is ejected with the first face facing upward.

FIG. 24B is a flowchart of the processing in which the setting change unit 23 changes a print setting according to the processing setting pattern of FIG. 23B, according to an embodiment of the present disclosure.

The processing in the case where the print setting is the double-sided printing, the short-edge feed of the sheet feeding direction, the staple position at an upper left, and the short-edge binding is described below with reference to FIG. 24B.

In the case of the short-edge binding, the setting change unit 23 sets the setting 339 for "document orientation" to the landscape for the first face and the second face (S47 and S48).

The setting change unit 23 turns on the setting 338 for "180 degree rotation" only for the second face (S49).

The setting change unit 23 turns on the setting 337 for "eject a sheet with the front face up" (S50 and S51). Accordingly, the sheet is ejected with the first face facing upward.

Figure 25A:
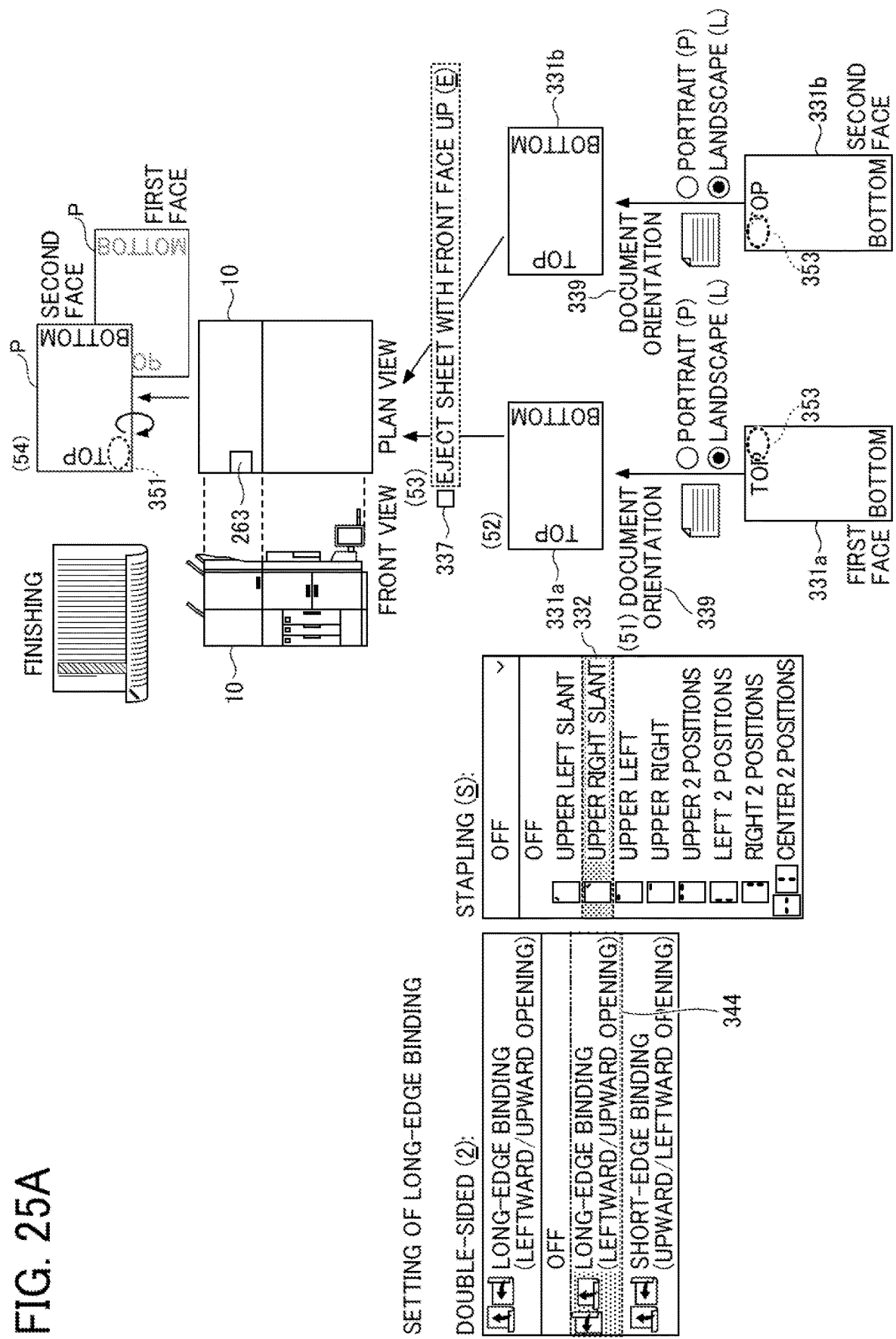
FIG. 25A is a diagram illustrating a processing setting pattern in the case of a short-edge feed of a sheet feeding direction, double-sided printing, a staple position at an upper right, and long-edge biding, according to an embodiment of the present disclosure.
Figure 25B:
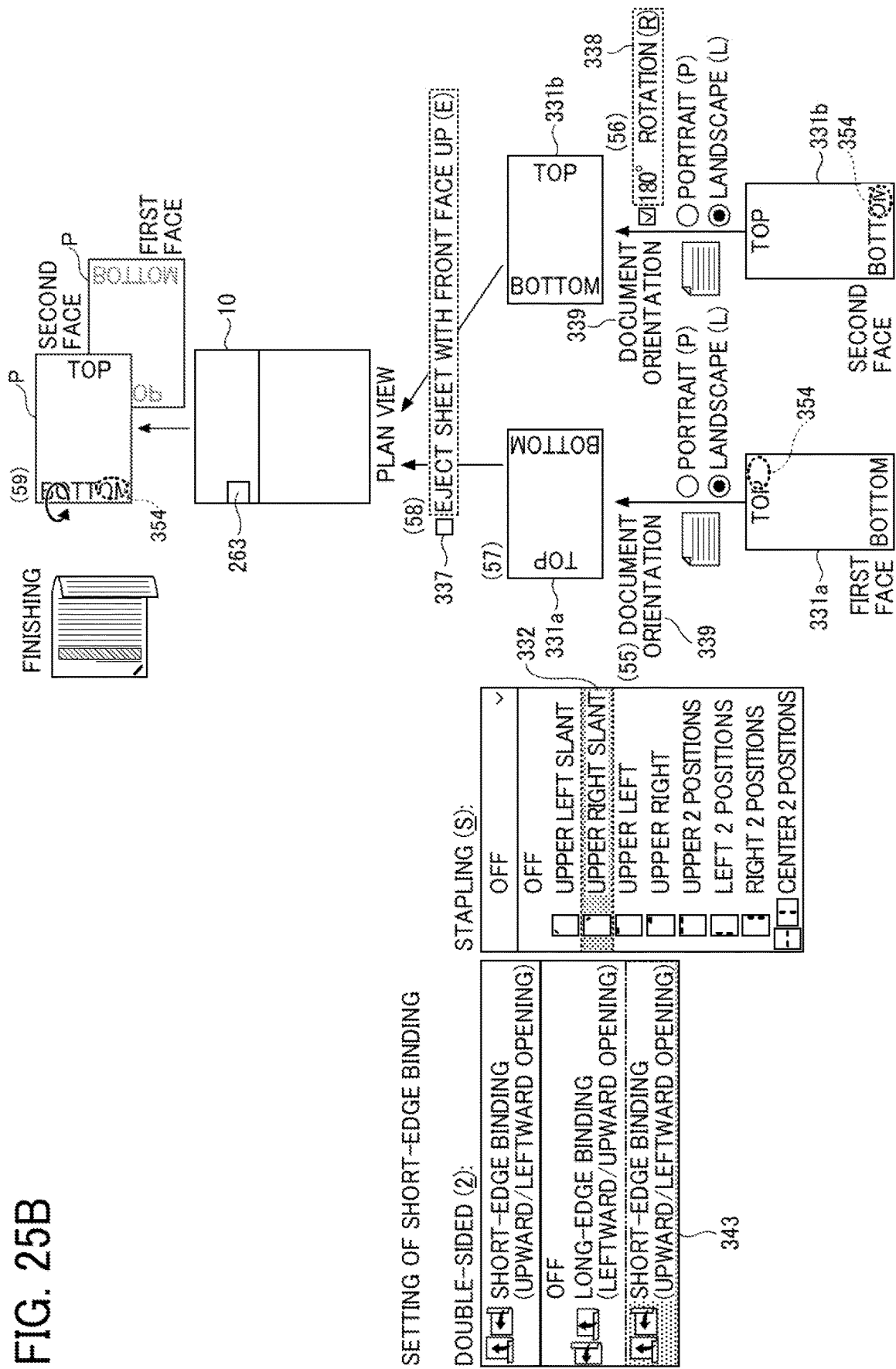
FIG. 25B is a diagram illustrating a processing setting pattern in the case of a short-edge feed of a sheet feeding direction, double-sided printing, a staple position at an upper right, and short-edge biding, according to an embodiment of the present disclosure.

FIGS. 25A and 25B are diagrams each illustrating a processing setting pattern in the case of the short-edge feed of the sheet feeding direction, double-sided printing, the staple position at the upper right, and the short-edge biding or the long-edge binding, according to an embodiment of the present disclosure.

An upper right 353 in FIG. 25A in the case of the long-edge binding and an upper right 354 in FIG. 25B in the case of the short-edge binding are at the upper right when the "top and bottom" of the first face of the image data to be printed is viewed from the front.

A description is given below in the case of the short-edge feed of the sheet feeding direction, the setting 332 for the staple position set to an upper right, and the long-edge binding 344.

(51) The setting change unit 23 sets the setting 339 for "document orientation" to the landscape for the image data 331a of the first face and the image data 331b of the second face.

(52) Accordingly, the output device 10 rotates the orientation of each piece of image data by 90 degrees.

(53) The setting change unit 23 leaves the setting 337 for "eject a sheet with the front face up" to be turned off. When the setting 337 for "eject a sheet with the front face up" is turned on in the initial setting or by an operation by the operator, the setting is discarded.

(54) The sheet is ejected from the side face of the output device 10.

Since the "top and bottom" of the first face and the "top and bottom" of the second face are in the same orientation, the sheet is prepared for the long-edge binding. Since the setting 339 for "document orientation" is set to the landscape and the setting 337 for "eject a sheet with the front face up" is turned off, the stapler 263 can execute the stapling at the upper right 353 of the sheet with a small amount of movement.

A description is given below in the case of the short-edge feed of the sheet feeding direction, the setting 332 for the staple position set to an upper right, and the short-edge binding 343.

(55) The setting change unit 23 sets the setting 339 for "document orientation" to the landscape for the image data 331a of the first face and the image data 331b of the second face.

(56) The setting change unit 23 turns on the setting 338 for "180 degree rotation" only for the image data 331b of the second face.

(57) Accordingly, the output device 10 rotates the orientation of each piece of image data by 90 degrees, and further rotates only the image data 331b of the second face by 180 degrees.

(58) The setting change unit 23 leaves the setting 337 for "eject a sheet with the front face up" to be turned off. When the setting 337 for "eject a sheet with the front face up" is turned on in the initial setting or by an operation by the operator, the setting is discarded.

(59) The sheet is ejected from the side face of the output device 10.

Since the "top and bottom" of the first face and the "top and bottom" of the second face are in the same orientation, the sheet is prepared for the short-edge binding. Since the setting 339 for "document orientation" is set to the landscape and the setting 338 for "180 degree rotation" is turned on only for the image data 331b of the second face, and the setting 337 for "eject a sheet with the front face up" is turned off, the stapler 263 can execute the stapling at the upper right 354 of the sheet with a small amount of movement.

FIG. 26A is a flowchart of the processing in which the setting change unit 23 changes a print setting according to the processing setting pattern of FIG. 25A, according to an embodiment of the present disclosure.

The processing in the case where the print setting is the double-sided printing, the short-edge feed of the sheet feeding direction, and the staple position at an upper right is described below with reference to FIG. 26A.

The setting change unit 23 determines whether the long-edge binding is set (S61). In the case of the short-edge binding, the processing proceeds to the circle "I" in FIG. 26B.

In the case of the long-edge binding, the setting change unit 23 sets the setting 339 for "document orientation" to the landscape for the first face and the second face (S62 and S63).

The setting change unit 23 turns off the setting 337 for "eject a sheet with the front face up" (S64 and S65). Accordingly, the sheet is ejected with the first face facing downward.

Figure 26B:
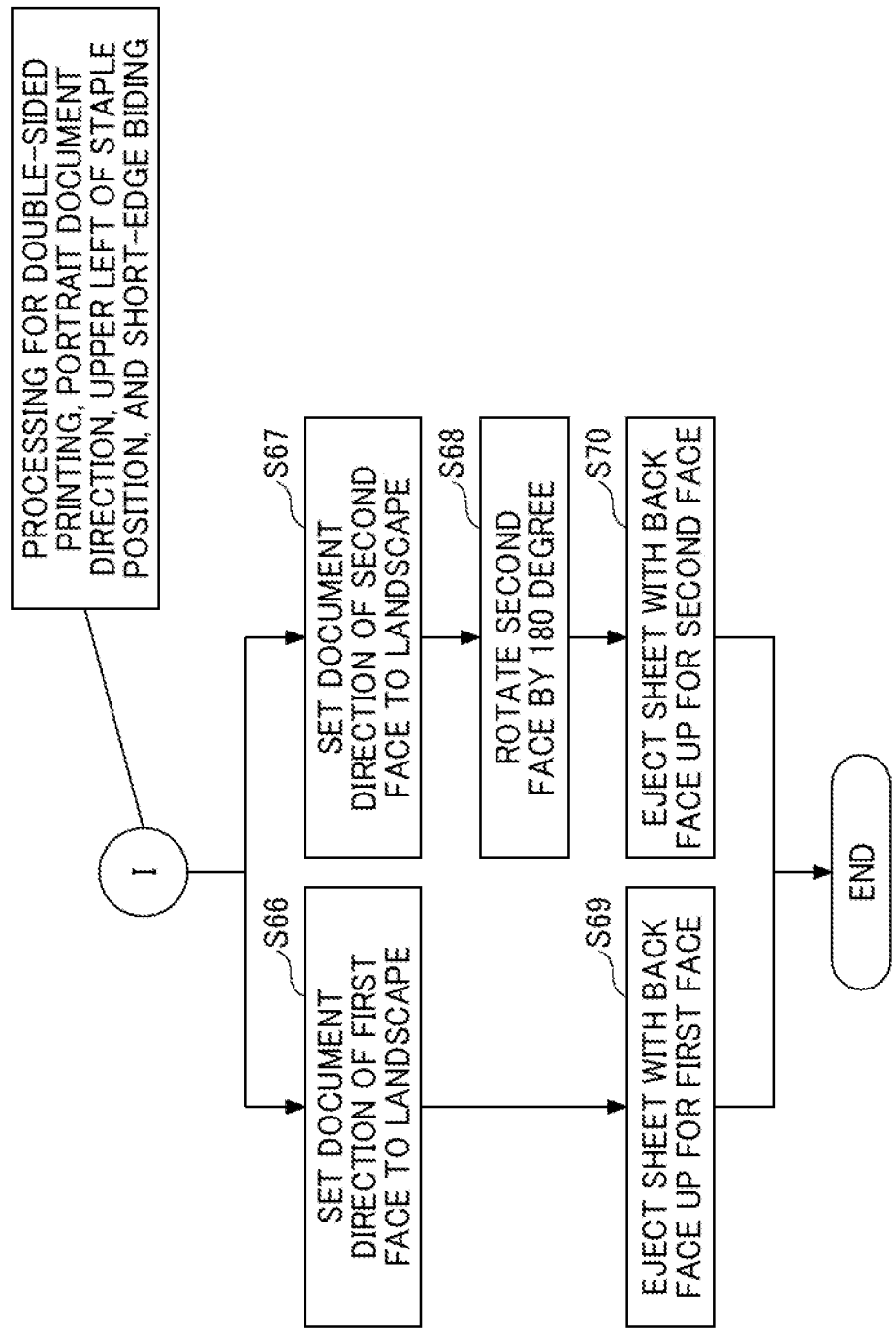
FIG. 26B is a flowchart of the processing in which a setting change unit changes a print setting according to the processing setting pattern of FIG. 25B, according to an embodiment of the present disclosure.

FIG. 26B is a flowchart of the processing in which the setting change unit 23 changes a print setting according to the processing setting pattern of FIG. 25B, according to an embodiment of the present disclosure.

The processing in the case where the print setting is the double-sided printing, the short-edge feed of the sheet feeding direction, the staple position at an upper left, and the short-edge binding is described below with reference to FIG. 26B.

In the case of the short-edge binding, the setting change unit 23 sets the setting 339 for "document orientation" to the landscape for the first face and the second face (S66 and S67).

The setting change unit 23 turns on the setting 338 for "180 degree rotation" only for the second face (S68).

The setting change unit 23 turns off the setting 337 for "eject a sheet with the front face up" (S69 and S70). Accordingly, the sheet is ejected with the first face facing downward.

When the operator desires stapling to be executed freely but knows that the durability of the stapler is to be reduced, the operator may desire to use the stapler with the "stapler operation minimum mode" of the present embodiment to be turned on. For example, by the printer driver 11 of the communication terminal 30 displaying a screen for visualizing the current operation status, the operator may manually turn on the setting of the "stapler operation minimum mode." Alternatively, it is assumed that the operator does not manually turn on the setting of the "stapler operation minimum mode." Even in such a case, when the maintenance (or replacement time) of the stapler 263 is to be advanced, the printer driver 11 may set the setting of the "stapler operation minimum mode" to be turned on as the initial setting.

Figure 27:
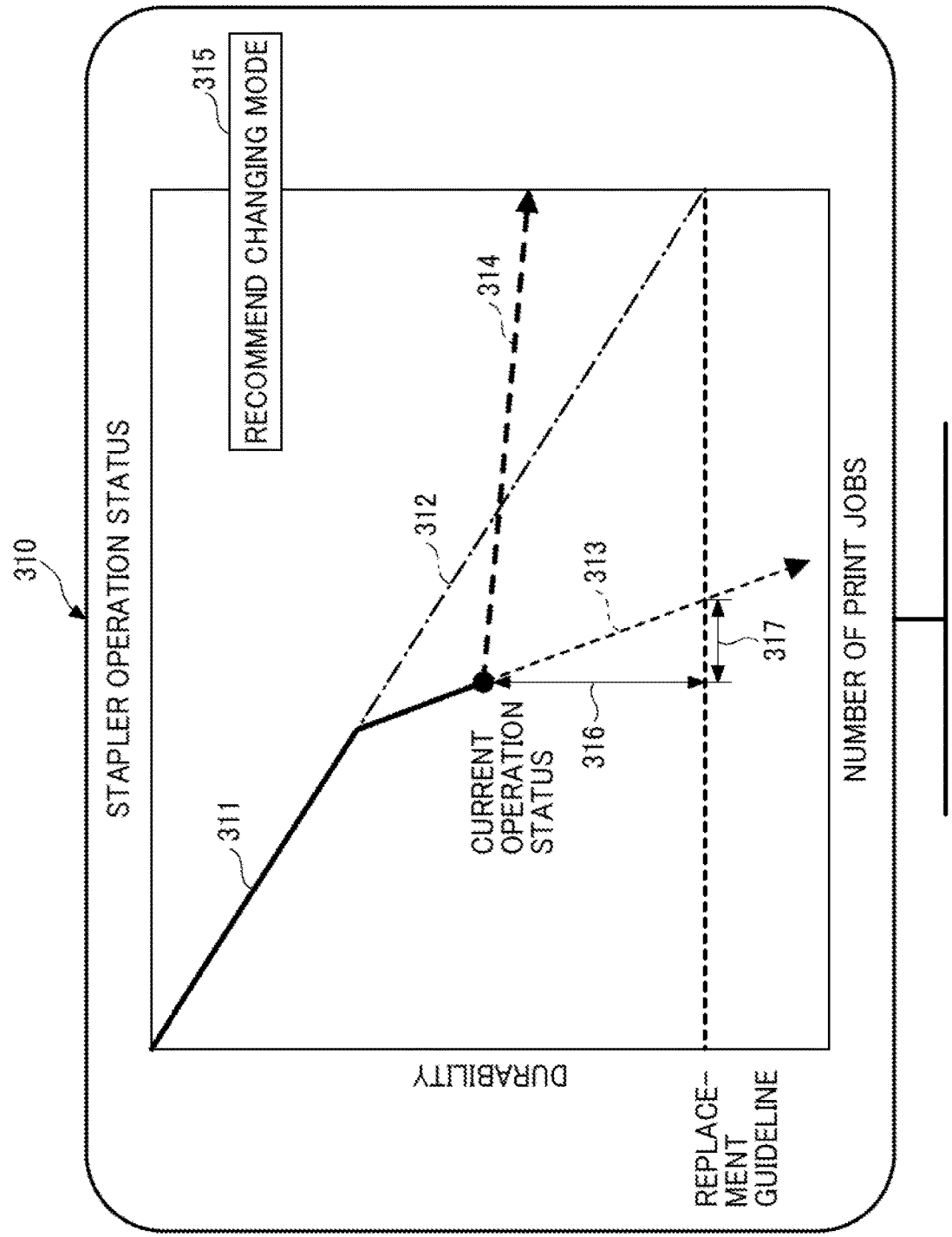
FIG. 27 is a diagram illustrating a durability prediction screen on which the correspondence between the operation status of a stapler and the durability, according to an embodiment of the present disclosure.

FIG. 27 is a diagram illustrating a durability prediction screen 310 on which the correspondence between an operation status of the stapler 263 and the durability, according to an embodiment of the present disclosure.

The durability prediction screen 310 is displayed by the printer driver of the communication terminal 30 communicating with the output device 10. As a simple method for predicting the time to replace the stapler 263, for example, a method based on the total number of times stapling is performed. When the total number of times of the execution exceeds a certain threshold value, the durability prediction unit 24 prompts the setting of the "stapler operation minimum mode" to be turned on, or sets the status in which the setting of the "stapler operation minimum mode" to be turned on as the initial setting. Alternatively, the durability prediction unit 24 may turn on the setting of the "stapler operation minimum mode" and restrict the setting from being changed to off.

In FIG. 27, the horizontal axis represents the number of print jobs involving stapling, and the vertical axis represents durability. The length from the maximum value to the replacement guideline on the vertical axis is the amount of operation of the stapler, at which a failure of the stapler is assumed not to occur in design. A history line 311 (that serves as a first line) indicates a decrease in durability due to the execution of print jobs in the past. The numerical value of the durability to be decreased is the sum of the amount of operation of the stapler stored in the print job storage unit 34.

A standard prediction line 312 (that serves as a second line) indicates the relationship between the number of print jobs involving stapling and durability, which is assumed at the time of design. The standard prediction line 312 is generated using a network in which a plurality of output devices 10 are connected to a monitoring server. The individual output device 10 has a function of notifying the monitoring server of, for example, the count value of the number of printed sheets and failure via the network N. Using this function, the individual output device 10 transmits the amount of operation of the stapler 263 to the monitoring server for each print job. The monitoring server aggregates the amount of operation in the past of the stapler (263) of the individual output device 10 connected to the network, and the durability prediction unit 24 generates the standard prediction line 312 based on the average of the amount of operation per one print job.

Alternatively, the median value between the maximum and minimum values of the amount of movement of the stapler 263 in the design is regarded as the average amount of operation of the stapler 263 per one print job. Then, the durability prediction unit 24 may use the median value to generate the standard prediction line 312.

In FIG. 27, the inclination of the history line 311 is approximately the same as that of the standard prediction lines 312 up to a certain number of print jobs. However, after a certain number of print jobs, the degree of the inclination of the history line 311 abruptly increases. The durability prediction unit 24 then determines that a difference 316 between the current durability and the replacement guideline (the remaining amount of operation that can be consumed without maintenance) is smaller than the threshold value. For this reason, the printer driver 11 displays a message 315 that indicates a recommendation to turn on the setting of the "stapler operation minimum mode." The operator can determine whether to turn on the setting of the "stapler operation minimum mode" by checking that the history line 311 approaches the replacement guideline or the message 315.

Instead of comparing the difference 316 between the current durability and the replacement guideline with the threshold value, the durability prediction unit 24 may compare a difference 317 with the threshold value. The difference 317 is the difference between the number of print jobs at which a straight line 313 extrapolated from the history line 311 intersects the reference amount of operation for replacement (i.e., the replacement guideline) and the current number of print jobs.

In FIG. 27, a prediction line after the mode setting 314 (that serves as a third line) is presented. The prediction line after the mode setting 314 indicates the changes in durability with respect to the number of print jobs when the setting of the "stapler operation minimum mode" is turned on. The change in durability indicates the durability that decreases with the increase of the amount of operation of the stapler 263. The amount of operation of the stapler 263 when the setting of the "stapler operation minimum mode" is turned on is the minimum amount of operation stored in the minimum amount-of-operation storage unit 27. In other words, the prediction line after the mode setting 314 is the amount of operation obtained by accumulating the minimum amount of operation associated with the print setting in the print job.

The operator can grasp the effect of the setting of the "stapler operation minimum mode" to be turned on from the prediction line after the mode setting 314 to determine whether to turn on the setting of the "stapler operation minimum mode."

The durability prediction unit 24 may detect that the inclination of the history line 311 is larger than that of the standard prediction line 312 by another threshold value or more. Then, the UI display unit 21 may display the message 315.

In FIG. 27, the horizontal axis on the durability prediction screen 310 is defined as the number of print jobs that involve stapling. Since the print jobs are associated with dates and times, the horizontal axis can be defined as the period of use.

Figure 28:
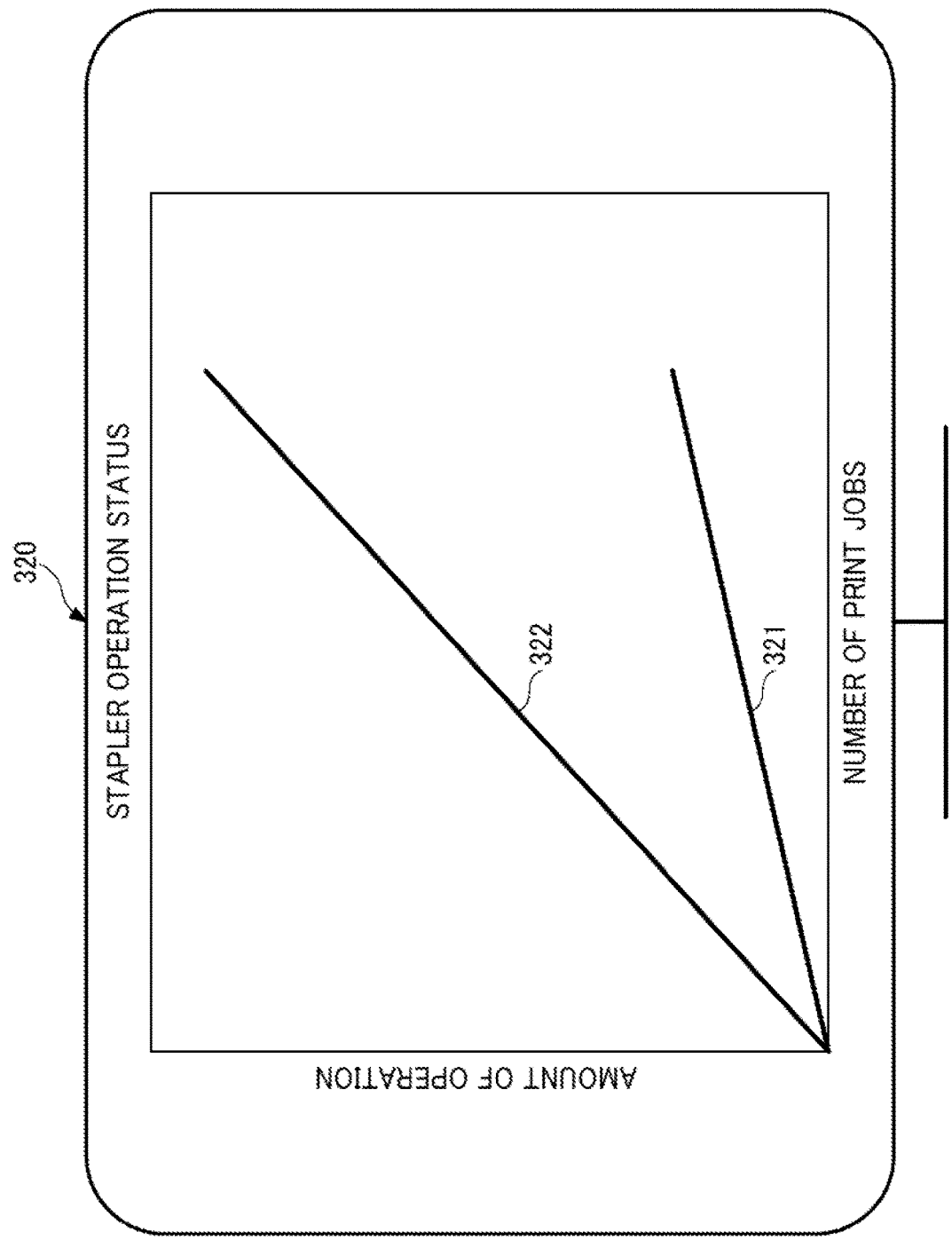
FIG. 28 is a diagram illustrating an amount-of-operation comparison screen on which an amount of operation for the number of print jobs when the setting of a "stapler operation minimum mode" is turned on and an actual amount of operation for the number of print jobs are compared, according to an embodiment of the present disclosure.

FIG. 28 is a diagram illustrating an amount-of-operation comparison screen 320 on which an amount of operation for the number of print jobs when the setting of the "stapler operation minimum mode" is turned on and an actual amount of operation for the number of print jobs are compared, according to an embodiment of the present disclosure.

In FIG. 28, the horizontal axis represents the number of print jobs, and the vertical axis represents the amount of operation. An actual amount of operation line 322 is an amount of operation obtained by accumulating the amount of operation of the stapler 263 stored in the print job storage unit 34. The amount of operation of the stapler 263 is estimated based on the print setting stored in the print job storage unit 34 and the minimum amount of operation stored in the minimum amount of operation storage unit 27, and an estimated amount-of-operation line 321 is an amount of operation obtained by accumulating the amounts of operation of the stapler 263. In other words, the estimated amount-of-operation line 321 is the amount of operation obtained by accumulating the minimum amount of operation associated with the print setting in the print job.

The operator can grasp the effect of the setting of the "stapler operation minimum mode" to be turned on the amount-of-operation comparison screen 320 to determine whether to turn on the setting of the "stapler operation minimum mode."

Figure 29:
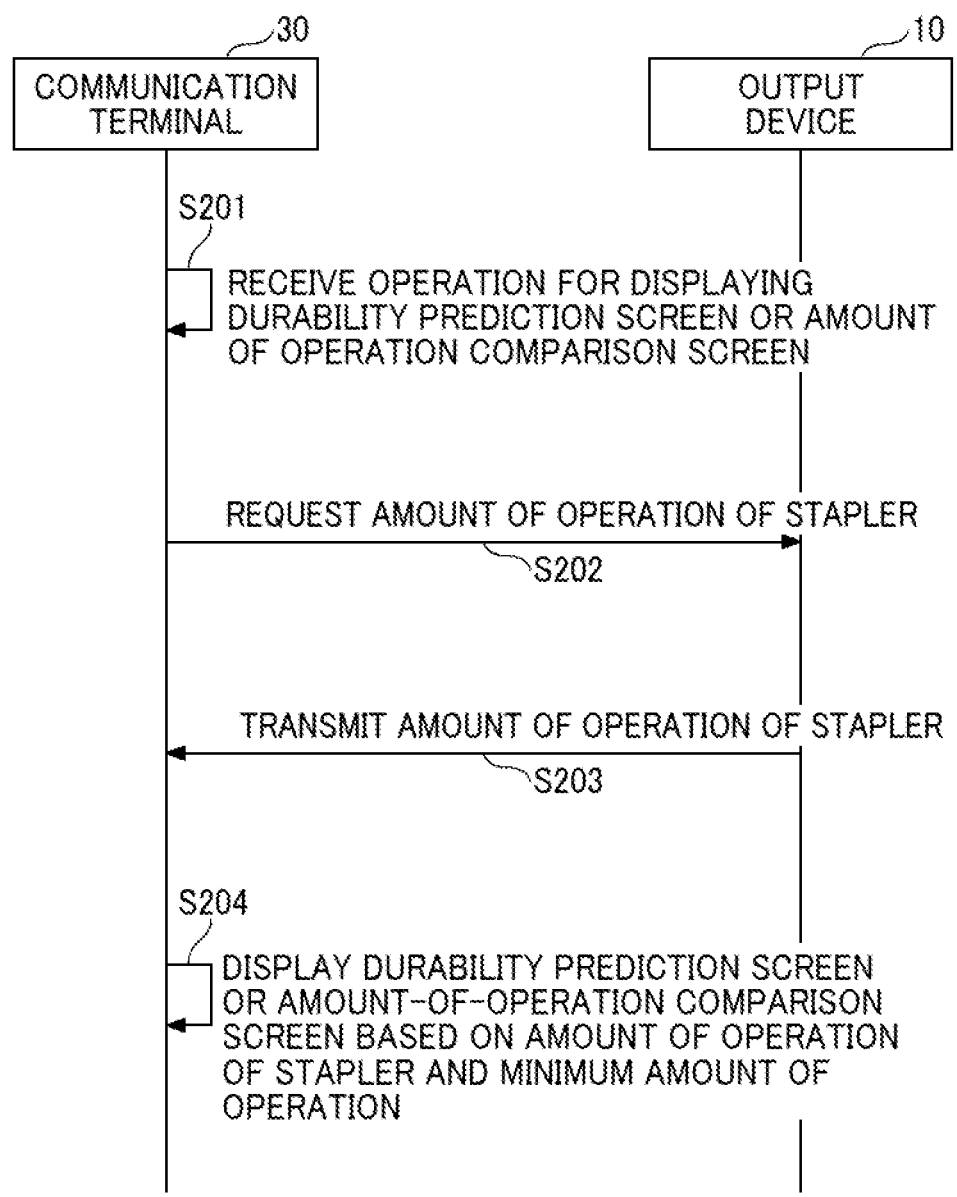
FIG. 29 is a sequence chart illustrating the processing in which a communication terminal displays a durability prediction screen or an amount-of-operation comparison screen, according to an embodiment of the present disclosure.

FIG. 29 is a sequence chart illustrating the processing in which the communication terminal 30 displays the durability prediction screen 310 or the amount-of-operation comparison screen 320, according to an embodiment of the present disclosure.

S201: First, the operator inputs an operation for displaying the durability prediction screen 310 or the amount-of-operation comparison screen 320 to the communication terminal 30. The setting reception unit 20 receives the input.

S202: The communication unit 22 requests the output device 10 to supply the amount of operation of the stapler 263 needed for one of these screens to be displayed.

S203: The communication unit 31 of the output device 10 receives the request and transmits the amount of operation of the stapler 263 stored in the print job storage unit 34 to the communication terminal 30.

S204: The communication unit 22 of the communication terminal 30 receives the amount of operation of the stapler 263. The UI display unit 21 displays the durability prediction screen 310 or the amount-of-operation comparison screen 320 based on, for example, the amount of operation and the minimum amount of operation of the stapler 263. The durability prediction unit 24 displays the message 315 when the difference between the current durability and the replacement guideline is smaller than the threshold value.

In FIG. 29, the printer driver 11 generates the durability prediction screen 310 or the amount-of-operation comparison screen 320. Alternatively, the output device 10 may generate these screens. In other words, in the case where the output device 10 has a function of a web server, the output device 10 generates the durability prediction screen 310 or the amount-of-operation comparison screen 320 in, for example, a hypertext markup language (HTML), and transmits the generated screen to the communication terminal 30. The communication terminal 30 displays the durability prediction screen 310 or the amount-of-operation comparison screen 320 on a web browser.

The "stapler operation minimum mode" is set by the operator in the printer driver 11. In addition, the "stapler operation minimum mode" can be set by an administrator for the individual output devices 10 via a server apparatus 600.

Figure 30:
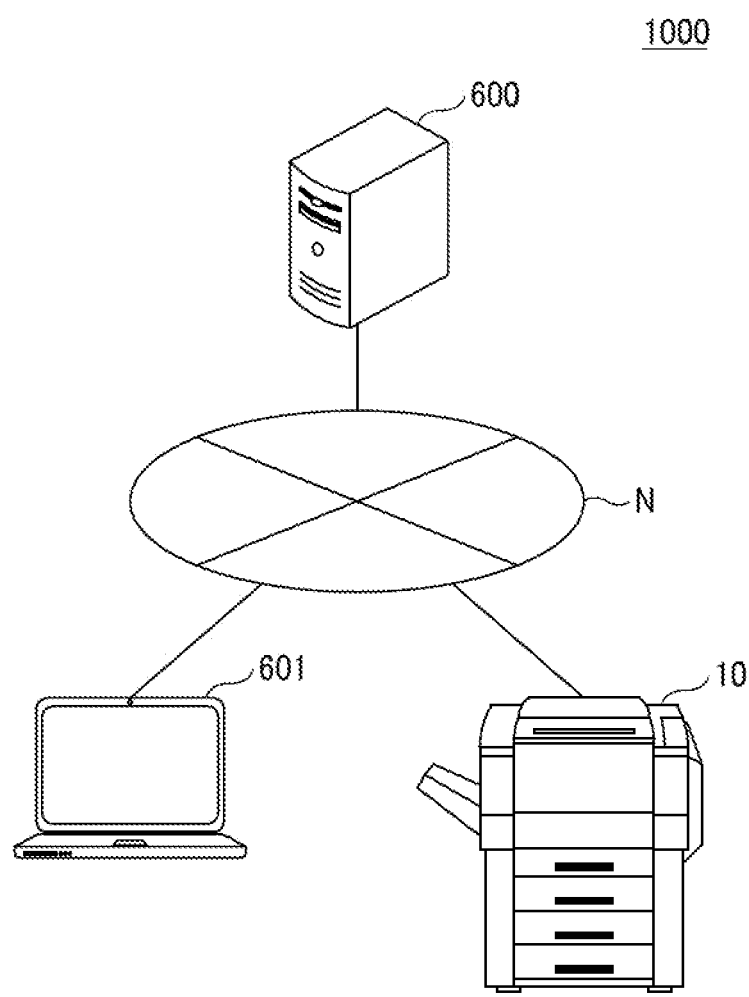
FIG. 30 is a schematic diagram illustrating a configuration of a network system in which an output device and a server apparatus are connected with each other via a network, according to an embodiment of the present disclosure.

FIG. 30 is a schematic diagram illustrating a configuration of a network system 1000 in which the output device 10 and the server apparatus 600 are connected with each other via the network N, according to an embodiment of the present disclosure.

The network system 1000 includes an administrator terminal 601, the server apparatus 600, and the output device 10. The server apparatus 600 and the output device 10, and the server apparatus 600 and the administrator terminal 601 are communicably connected to each other, via the network N that is a wide area network such as the Internet.

The server apparatus 600 can acquire the contents from the print job storage unit 34 of the output device 10 as needed. The server apparatus 600 includes the durability prediction unit 24 and the minimum amount-of-operation storage unit 27 described above. Accordingly, the server apparatus 600 can provide the administrator terminal 601 with web pages including the screens illustrated in FIGS. 27 and 28 in response to a request from the administrator terminal 601.

Figure 31:
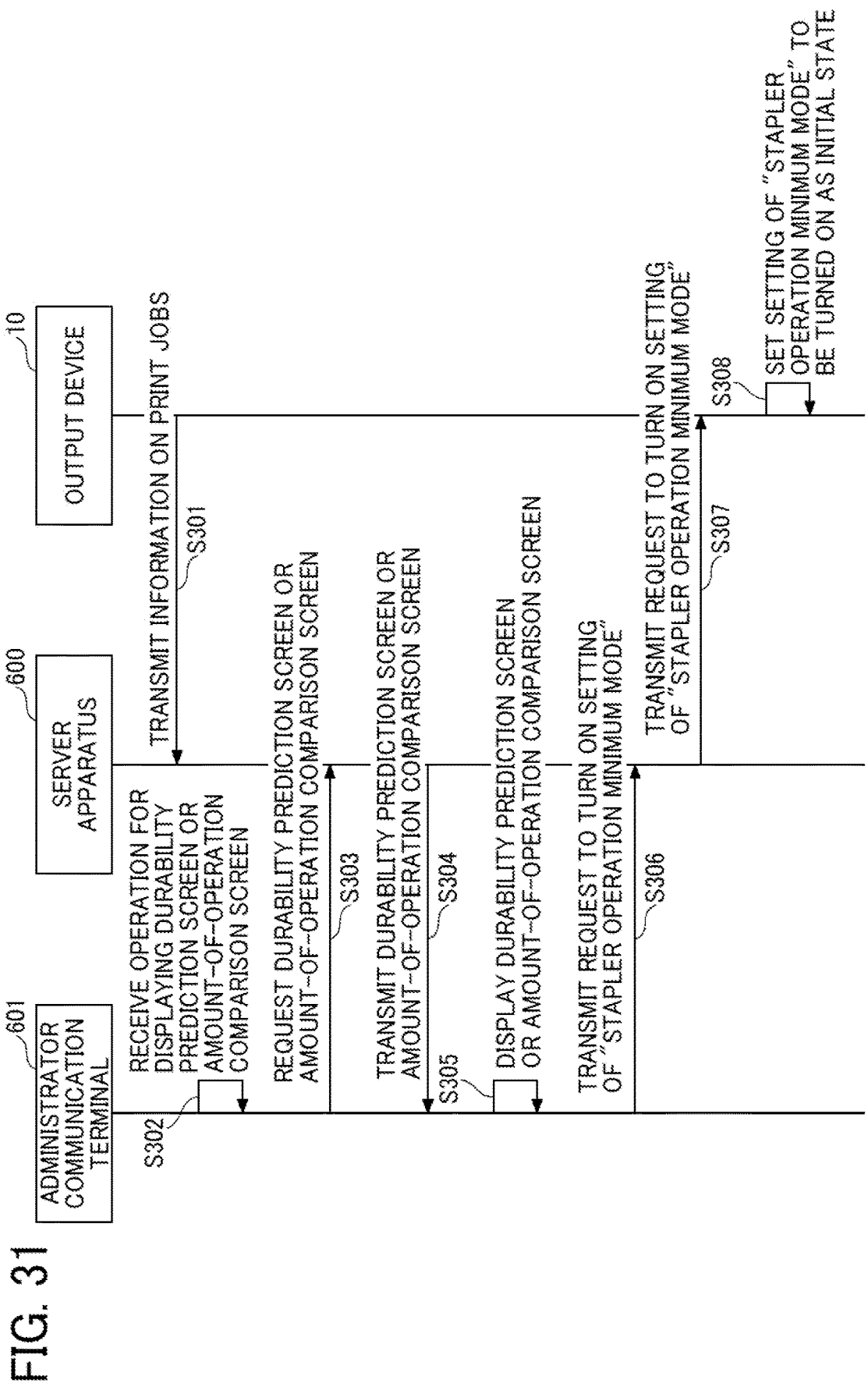
FIG. 31 is a sequence chart illustrating the processing in which an administrator terminal sets the setting of a "stapler operation minimum mode" to be turned on as an initial setting of an output device, according to an embodiment of the present disclosure.

FIG. 31 is a sequence chart illustrating the processing in which the administrator terminal 601 sets the setting of the "stapler operation minimum mode" to be turned on as the initial setting of the output device 10, according to an embodiment of the present disclosure.

S301: The communication unit 31 of the output device 10 transmits the contents of the print job storage unit 34 to the server apparatus 600 as needed.

S302: The administrator inputs an operation for displaying the durability prediction screen 310 or the amount-of-operation comparison screen 320 to the administrator terminal 601.

S303: The administrator terminal 601 requests one of these screens to be displayed from the server apparatus 600.

S304: The server apparatus 600 receives the request and generates the durability prediction screen 310 or the amount-of-operation comparison screen 320 using, for example, the contents of the print job storage unit 34 and the minimum amount of operation. The server apparatus 600 transmits the screen information of the durability prediction screen 310 or the amount-of-operation comparison screen 320 to the administrator terminal 601.

S305: The administrator terminal 601 receives the screen information of the durability prediction screen 310 or the amount-of-operation comparison screen 320, and displays one of these screens represented by the screen information. By the administrator terminal 601 displaying the screens illustrated in FIGS. 27 and 28, the administrator can determine that the setting of the "stapler operation minimum mode" should be turned on. The administrator operates the administrator terminal 601 to display the print setting screen 300 for the administrator. The administrator further operates the administrator terminal 601 to designate an individual output device 10 and turn on the setting of the "stapler operation minimum mode."

S306: The administrator terminal 601 transmits a request to turn on the setting of the "stapler operation minimum mode" to the server apparatus 600.

S307: The server apparatus 600 transmits, to the output device 10, a request for setting the status in which the setting of the "stapler operation minimum mode" is turned on as the initial setting.

S308: In response to the request from the server apparatus 600, the output device 10 sets the setting of the "stapler operation minimum mode" to be turned on as the initial setting.

As a result, when the communication terminal 30 communicates with the output device 10, the printer driver 11 displays the print setting screen 300 on which the setting of the "stapler operation minimum mode" is turned on.

As described above, in the present embodiment, the printer driver automatically changes a print setting so that the load on the stapler is minimized. In other words, the printer driver changes the print setting for changing the orientation (upward or downward) of the front face of a sheet at the time of sheet ejection or rotating image data so that the moving range of the stapler is minimized. Thus, the load on the stapler is reduced when the output device performs a print job that involves stapling to be executed by the stapler. In this way, the durability of the stapler is prevented from being decreased without imposing uniform restrictions on the operator or taking measures on the hardware.

The above-described embodiments are illustrative and do not limit the present disclosure. Thus, numerous additional modifications and variations are possible in light of the above teachings. For example, elements and/or features of different illustrative embodiments may be combined with each other and/or substituted for each other within the scope of the present disclosure. Any one of the above-described operations may be performed in various other ways, for example, in an order different from the one described above.

For example, in the present embodiment, the stapler 263 is described by way of example of the post-processing apparatus 9. Alternatively, the post-processing apparatus 9 may be a punching apparatus. The processing setting pattern of the present embodiment is applicable to post-processing apparatuses other than the post-processing apparatus 9.

In the present embodiment, the processing for reducing the amount of operation of the stapler in the output device 10 when the communication terminal 30 requests the output device 10 to perform printing is described. Alternatively, the processing may be applied to a case where the output device 10 is used as a copying machine.

In the present embodiment, the printer driver 11 determines the processing setting pattern associated with the print setting. Alternatively, the output device 10 may determine the processing setting pattern. In this case, the output device 10 includes the setting change unit 23 and the processing setting pattern storage unit 26. The output device 10 determines the processing setting pattern associated with the print setting received from the printer driver 11 from the process setting pattern storage unit 26.

Still, alternatively, the web server may determine the processing setting pattern. In this case, the printer driver 11 transmits the print setting to the web server, and the web server returns the processing setting pattern associated with the print setting to the printer driver 11.

The processing setting pattern of the present embodiment is also applicable to a case where the operator operates the operation panel of the output device 10 to perform a print job stored in the output device 10. A mode in which the operator transmits a print job to the output device 10 in advance and the operator operates the operation panel of the output device 10 to perform the print job stored in the output device 10 is referred to as pull printing. The operator can change the print setting of the print job using the operation panel. When changing the print setting, the operator can set the stapling and turn on the setting of the "stapler operation minimum mode." When the setting of the "stapler operation minimum mode" is turned on, the output device 10 determines a processing setting pattern associated with the print setting from the processing setting pattern storage unit 26.

In the present embodiment, the sheet ejection direction of the output product is the long-edge feed. When the output device 10 supports the sheet ejection directions of the long-edge feed and the short-edge feed, the sheet ejection direction of the output product may be further included in the processing setting pattern.

In the present embodiment, the setting of the document orientation to be portrait or landscape corresponds to the rotation by 90 degrees of the image data. However, the rotation by 90 degrees may be processed as a rotation by 270 degrees depending on the rotation direction. When the output device performs both 90 degree and 180 degree rotations, both rotations may be processed as a 270 degree rotation.

For example, the functional configurations according to the present embodiment illustrated in FIG. 10 are divided according to functions in order to facilitate understanding of the processing executed by the communication terminal 30 and the output device 10. No limitation to the scope of the present disclosure is intended by how the processing units are divided or by the names of the processing units. The processing units executed by the communication terminal 30 and the output device 10 may be divided into a greater number of processing units in accordance with the contents of the processing units. In addition, a single processing unit can be divided to include a greater number of processing units.

Each function of the embodiments of the present disclosure described above may be implemented by one processing circuit or a plurality of processing circuits. The "processing circuit or circuitry" herein includes a programmed processor to execute functions by software, such as a processor implemented by an electronic circuit, and devices, such as an application specific integrated circuit (ASIC), a digital signal processor (DSP), a field programmable gate array (FPGA), and circuit modules known in the art arranged to perform the recited functions.

Embodiments of the present disclosure can provide significant enhancements in computer capability and functionality. These enhancements allow the operators to take advantage of computers that provide more efficient and robust interaction with tables, which is a way to store and present information on information processing apparatuses. In addition, the embodiments of the present disclosure can provide a better operator experience through the use of a more efficient, powerful, and robust user interface. Such a user interface provides a better interaction between a human and a machine.

Aspect 1

An output device including a post-processing apparatus that executes post-processing on an output product includes a communication unit and an output control unit. The communication unit that receives a processing setting pattern, which is determined in accordance with an output condition of the output product, corresponding to an operation of the post-processing apparatus, the output condition, and image data to be output. The output control unit controls the output of the image data using the post-processing apparatus based on the processing setting pattern and the output condition.

Aspect 2

In the output device according to Aspect 1, when an amount of operation of the post-processing apparatus to be reduced is set in the output condition, the processing setting pattern is a print setting pattern in which the amount of operation of the post-processing apparatus is reduced as compared with a case where the amount of operation to be reduced is not set, or when the amount of operation of the post-processing apparatus not to be reduced is not set in the output condition, the processing setting pattern is a print setting pattern in which the amount of operation of the post-processing apparatus is reduced as compared with a case where the amount of operation not to be reduced is set.

In other words, in a case the output condition indicates to reduce an amount of operation of the post-processing apparatus, the processing setting pattern is determined to be a print setting pattern in which the amount of operation of the post-processing apparatus is reduced as compared with a case where the output condition indicates not to reduce the amount of operation.

Aspect 3

In the output device according to Aspect 1 or 2, the processing setting pattern includes a rotation of the image data to be output, determination of whether a front face of a sheet faces upward at a time of ejection of the sheet, or determination of whether a document orientation is landscape or portrait.

Aspect 4 In the output device according to any one of Aspects 1 to 3, the output condition includes a sheet feeding direction, determination of whether to print on both faces or one face of the sheet, or a position where the post-processing apparatus executes processing on the output product.

Aspect 5

In the output device according to Aspect 4, the post-processing apparatus is a stapler, and the output condition includes determination of whether a long edge is bound or a short edge is bound by the stapler.

Aspect 6

In the output device according to Aspect 5, according to whether the output condition includes the sheet feeding direction, determination of whether to print on both faces or the one face of the sheet, and determination of whether the long edge is bound or the short edge is bound by the stapler, the rotation of the image data to be output, whether the front face of the sheet faces upward at the time of ejection of the sheet, and whether the document orientation is landscape or portrait included in the processing setting pattern are determined.

Aspect 7

In the output device according to Aspect 5, in a case that the output condition includes a long-edge feed as the sheet feeding direction, determination of printing on the one face of the sheet, and a staple position set to upper right, the processing setting pattern includes a rotation by 180 degrees of the image data to be output and the front face of the sheet facing upward at the time of ejection of the sheet.

Aspect 8

In the output device according to Aspect 5, in a case that the output condition includes a long-edge feed as the sheet feeding direction, determination of printing on both faces of the sheet, the staple position set to upper right, and determination that the short edge is bound by the stapler, the processing setting pattern includes a rotation by 180 degrees of the image data to be output and the front face of the sheet facing upward at the time of ejection of the sheet.

Aspect 9

An output system includes a communication terminal that executes a printer driver and an output device that outputs image data received from the printer driver. The printer driver causes the communication terminal to function as a setting reception unit that receives an output condition of an output product on a particular screen, a setting change unit that determines a processing setting pattern corresponding to an operation of a post-processing apparatus according to the output condition, and a first communication unit that transmits the processing setting pattern, the output condition, and the image data to be output to the output device. The output device includes the post-processing apparatus that executes post-processing on the output product, a second communication unit that receives the processing setting pattern, the output condition, and the image data to be output, and an output control unit that controls the output of the image data using the post-processing apparatus based on the processing setting pattern and the output condition.

Aspect 10

In the output system according to Aspect 9, the post-processing apparatus is a stapler, and in a case that the output condition includes stapling, the setting change unit determines the processing setting pattern.

Aspect 11

In the output system according to Aspect 10, in a case that the output condition includes a setting to reduce an amount of operation of the post-processing apparatus or in a case that the output condition does not include a setting not to reduce the amount of operation of the post-processing apparatus, the setting change unit determines the processing setting pattern.

Aspect 12

In the output system according to any one of Aspects 9 to 11, in a case that the setting reception unit receives the setting to reduce the amount of operation of the post-processing apparatus on the particular screen or in a case that the setting reception unit does not receive the setting not to reduce the amount of operation of the post-processing apparatus on the particular screen, the output condition is displayed on the particular screen in a mode in which the setting of the output condition included in the processing setting pattern is not received.

Aspect 13

In the output system according to any one of Aspects 9 to 12, the output device stores the amount of operation of the post-processing apparatus in association with the output condition. The printer driver causes the communication terminal to function as a durability prediction unit that estimates the amount of operation of the post-processing apparatus in a case that the amount of operation of the post-processing apparatus to be reduced is set or in a case that the amount of operation of the post-processing apparatus not to be reduced is not set, using the amount of operation of the post-processing apparatus in a case that the amount of operation of the post-processing apparatus associated with the output condition to be reduced is set or in a case that the amount of operation of the post-processing apparatus associated with the output condition not to be reduced is not set and a display device that displays the amount of operation of the post-processing apparatus acquired from the output device and the amount of operation of the post-processing apparatus estimated by the durability prediction unit.

Aspect 14

In the output system according to any one of Aspects 9 to 12, the output device stores the amount of operation of the post-processing apparatus in association with the output condition. The printer driver causes the communication terminal to function as a display device that displays, in association with a number of jobs in which the image data is output, a first line representing accumulation of the amount of operation of the post-processing apparatus in a past acquired from the output device, a second line representing a standard relationship between the number of jobs and a change in the amount of operation of the post-processing apparatus, and a third line representing a relationship between the number of jobs and the change in the amount of operation of the post-processing apparatus, which is predicted in the case that the amount of operation of the post-processing apparatus to be reduced is set or in the case that the amount of operation of the post-processing apparatus not to be reduced is not set.

Aspect 15

In the output system according to Aspect 13 or 14, when the amount of operation of the post-processing apparatus acquired from the output device exceeds a value set in advance, the display device displays a message recommending a setting in which the amount of operation of the post-processing apparatus to be reduced is set or another setting in which the amount of operation of the post-processing apparatus not to be reduced is not set.

Aspect 16

In the output system according to Aspect 13 or 14, when the amount of operation of the post-processing apparatus acquired from the output device exceeds a value set in advance, the setting reception unit sets, as an initial setting, a mode in which the amount of operation of the post-processing apparatus to be reduced is set or another mode in which the amount of operation of the post-processing apparatus not to be reduced is not set.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

The functionality of the elements disclosed herein may be implemented using circuitry or processing circuitry which includes general purpose processors, special purpose processors, integrated circuits, application specific integrated circuits (ASICs), digital signal processors (DSPs), field programmable gate arrays (FPGAs), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carries out or is programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

In another aspect, an output method performed by an output device including a post-processing apparatus to execute post-processing on an output product includes receiving a processing setting pattern that is determined in accordance with an output condition of the output product and corresponding to an operation to be performed by the post-processing apparatus, the output condition, and image data of an image to be formed on the output product and controlling output of the image data based on the processing setting pattern and the output condition.

In another aspect, a communication terminal that communicates, via a network, with an output device that performs a print job received from the communication terminal using a post-processing apparatus includes circuitry to receive an output condition of an output product on a screen, determine a processing setting pattern corresponding to an operation of the post-processing apparatus according to the output condition, and transmit the processing setting pattern, the output condition, and image data of an image to be formed on the output product to the output device.

In another aspect, an output method performed by an output system including a communication terminal that executes a printer driver and an output device that outputs image data received from the printer driver includes receiving an output condition of an output product on a screen, determining a processing setting pattern corresponding to an operation of a post-processing apparatus according to the output condition, transmitting the processing setting pattern, the output condition, and image data of an image to be formed on the output product to an output device, receiving the processing setting pattern, the output condition, and the image data of the image to be formed on the output product, and controlling output of the image data using the post-processing apparatus based on the processing setting pattern and the output condition.

The invention claimed is:

1. An output device communicably connected with a post-processing apparatus for executing post-processing on an output product output from the output device, the output device comprising:
   circuitry configured to:
      receive a processing setting pattern that is determined in accordance with an output condition of the output product and corresponding to an operation to be performed by the post-processing apparatus, the output condition, and image data of an image to be formed on the output product; and
      control output of the image data using the post-processing apparatus based on the processing setting pattern and the output condition, wherein
   in a case in which the output condition indicates to reduce an amount of operation of the post-processing apparatus from a home position,
   the processing setting pattern is determined to be a print setting pattern in which the amount of operation of the post-processing apparatus is reduced as compared with a case in which the output condition indicates not to reduce the amount of operation.

2. The output device according to claim 1, wherein the processing setting pattern includes at least one of a rotation of the image data to be output, indication of whether a front face of a sheet faces upward at a time of ejection of the sheet, or indication of whether a document orientation is landscape or portrait.

3. The output device according to claim 1, wherein the output condition includes at least one of a sheet feeding direction, indication of whether to print on both faces or one face of a sheet, or a position where the post-processing apparatus executes processing on the output product.

4. The output device according to claim 3, wherein the post-processing apparatus is a stapler, and the output condition includes indication of whether a long edge is bound or a short edge is bound by the stapler.

5. The output device according to claim 4, wherein, according to whether the output condition includes the sheet feeding direction, the indication of whether to print on both faces or the one face of the sheet, and the indication of whether the long edge is bound or the short edge is bound by the stapler, a rotation of the image data to be output, indication of whether a front face of the sheet faces upward at a time of ejection of the sheet, and indication of whether a document orientation is landscape or portrait included in the processing setting pattern are determined.

6. The output device according to claim 4, wherein, in a case in which the output condition includes a long-edge feed as the sheet feeding direction, the indication of printing on the one face of the sheet, and a staple position set to an upper right, the processing setting pattern includes a rotation by 180 degrees of the image data of the image to be formed on the output product and a front face of the sheet facing upward at a time of ejection of the sheet.

7. The output device according to claim 4, wherein, in a case in which the output condition includes a long-edge feed as the sheet feeding direction, the indication of printing on both faces of the sheet, a staple position set to an upper right, and the indication that the short edge is bound by the stapler, the processing setting pattern includes a rotation by 180 degrees of the image data of the image to be formed on the output product and a front face of the sheet facing upward at a time of ejection of the sheet.

8. An output system comprising:
a communication terminal comprising first circuitry;
an output device communicably connected with the post-processing apparatus, the output device comprising second circuitry configured to output an output product having an image, the image being formed based on image data received from the communication terminal; and
a post-processing apparatus to execute post-processing on the output product,
the first circuitry of the communication terminal being configured to execute a printer driver to:
receive an output condition of the output product via a screen;
determine a processing setting pattern corresponding to an operation to be performed by the post-processing apparatus according to the output condition; and
transmit the processing setting pattern, the output condition, and the image data to be output to the output device, and
the second circuitry of the output device being configured to:
receive the processing setting pattern, the output condition, and the image data of the image to be formed on the output product; and
control output of the image data using the post-processing apparatus based on the processing setting pattern and the output condition, wherein
the output device further includes a memory that stores an amount of operation of the post-processing apparatus in association with the output condition, and
the first circuitry is configured to execute the printer driver to:
estimate the amount of operation of the post-processing apparatus in a case in which the output condition indicates to reduce the amount of operation of the post-processing apparatus, using the amount of operation of the post-processing apparatus associated with the output condition indicating not to reduce the amount of operation; and
display the amount of operation of the post-processing apparatus acquired from the memory and an estimated amount of operation of the post-processing apparatus.

9. The output system according to claim 8, wherein the post-processing apparatus is a stapler, and in a case in which the output condition includes stapling, the first circuitry is configured to determine the processing setting pattern.

10. The output system according to claim 9, wherein, in a case in which the output condition indicates to reduce the amount of operation of the post-processing apparatus, the first circuitry is configured to determine the processing setting pattern.

11. The output system according to claim 8, wherein, in a case in which a setting indicating to reduce the amount of operation of the post-processing apparatus is received on the screen, the output condition is displayed on the screen in a mode in which a setting of the output condition included in the processing setting pattern is not received.

12. The output system according to claim 8, wherein the output device includes a memory that stores the amount of operation of the post-processing apparatus in association with the output condition, and the first circuitry is configured to execute the printer driver to display, in association with a number of jobs in which the image data is output,
a first line representing accumulation of the amount of operation of the post-processing apparatus in a past acquired from the memory,
a second line representing a standard relationship between the number of jobs and a change in the amount of operation of the post-processing apparatus, and
a third line representing a predicted relationship between the number of jobs and the change in the amount of operation of the post-processing apparatus, which is predicted in a case in which the amount of operation of the post-processing apparatus is to be reduced.

13. The output system according to claim 8, wherein, in a case in which the amount of operation of the post-processing apparatus acquired from the memory exceeds a value set in advance, the first circuitry is configured to display a message recommending a setting indicating to reduce the amount of operation of the post-processing apparatus.

14. The output system according to claim 8, wherein, in a case in which the amount of operation of the post-processing apparatus acquired from the output device exceeds a value set in advance, the first circuitry is configured to set, as an initial setting, a mode in which the amount of operation of the post-processing apparatus to be reduced is set or another mode in which the amount of operation of the post-processing apparatus not to be reduced is not set.

15. An output method performed by a communication terminal that executes a printer driver, the method comprising:
receiving an output condition of an output product via a screen;
determining a processing setting pattern corresponding to an operation to be performed on the output product by a post-processing apparatus according to the output condition;
transmitting, to an output device, the processing setting pattern, the output condition, and image data of an image to be formed on the output product; and
in a case in which the output condition indicates to reduce an amount of operation of the post-processing apparatus from a home position, determining the processing setting pattern to be a print setting pattern in which the amount of operation of the post-processing apparatus is reduced as compared with a case in which the output condition indicates not to reduce the amount of operation.

16. A non-transitory recording medium storing a plurality of program codes which, when executed by one or more processors, causes the one or more processors to perform the method according to claim 15.

* * * * *